US009316216B1

(12) United States Patent
Cook et al.

(10) Patent No.: US 9,316,216 B1
(45) Date of Patent: Apr. 19, 2016

(54) PROPORTIONING PUMP, CONTROL SYSTEMS AND APPLICATOR APPARATUS

(71) Applicants: James E. Cook, Anoka, MN (US); Steven T. Dorsey, Saint Joseph, MN (US); Stephen E. Babcock, Lakeville, MN (US); O. Harald Eriksen, Brooklyn Park, MN (US)

(72) Inventors: James E. Cook, Anoka, MN (US); Steven T. Dorsey, Saint Joseph, MN (US); Stephen E. Babcock, Lakeville, MN (US); O. Harald Eriksen, Brooklyn Park, MN (US)

(73) Assignee: Pumptec, Inc., Anoka, MN (US)

(*) Notice: Subject to any disclaimer, the term of this patent is extended or adjusted under 35 U.S.C. 154(b) by 236 days.

(21) Appl. No.: 13/853,047

(22) Filed: Mar. 28, 2013

Related U.S. Application Data

(60) Provisional application No. 61/617,015, filed on Mar. 28, 2012.

(51) Int. Cl.
| | |
|---|---|
| *F04B 35/04* | (2006.01) |
| *F04B 23/06* | (2006.01) |
| *B01F 15/00* | (2006.01) |
| *B01F 15/04* | (2006.01) |
| *F04B 17/03* | (2006.01) |
| *F04B 13/02* | (2006.01) |
| *B01F 15/02* | (2006.01) |
| *B05B 12/14* | (2006.01) |

(52) U.S. Cl.
CPC ............ *F04B 23/06* (2013.01); *B01F 15/0037* (2013.01); *B01F 15/0243* (2013.01); *B01F 15/042* (2013.01); *B05B 12/1418* (2013.01); *F04B 13/02* (2013.01); *F04B 17/03* (2013.01)

(58) Field of Classification Search
CPC ............ F04B 23/06; F04B 17/03; F04B 1/02; F04B 1/0413; F04B 9/025; F04B 53/14; F04B 9/042; F04B 13/02; F04B 9/04; B01F 15/042; B01F 15/0037; B01F 15/0243; B05B 12/1418
See application file for complete search history.

(56) References Cited

U.S. PATENT DOCUMENTS

| | | | | |
|---|---|---|---|---|
| 4,547,128 A | * | 10/1985 | Hayes ..................... | B01F 3/088 137/565.31 |
| 4,699,023 A | * | 10/1987 | Bajulaz ................... | F16H 25/06 475/162 |
| 4,789,100 A | * | 12/1988 | Senf ..................... | B01F 13/0042 222/134 |
| 4,886,190 A | * | 12/1989 | Kirschner ............. | B67D 1/0037 222/129.1 |
| 4,978,284 A | * | 12/1990 | Cook ....................... | F04B 1/02 417/415 |

(Continued)

*Primary Examiner* — Frederick C Nicolas
(74) *Attorney, Agent, or Firm* — Albert W. Watkins

(57) ABSTRACT

An absolute proportioning pumping system includes an electric motor assembly powering a first pump at a first flow rate and powering a second pump at a second flow rate. A proportioned fluid output includes a first fluid pumped by the first pump and a second fluid pumped by the second pump. The pumping system provides a desired ratio of the first fluid to the second fluid at the proportioned fluid output, relatively independently of pressure and flow rate at the output. In accord with further embodiments, a pump and motor assembly is mounted to and generally surrounded by a liquid tank. The pump and motor assembly may include a pair of fixed ratio outputs driven from a common motor, or may include a single variable output pump either slaved to a master pump or controlled through a timed bypass valve to control output flow rate.

16 Claims, 43 Drawing Sheets

(56) References Cited

U.S. PATENT DOCUMENTS

| | | | | |
|---|---|---|---|---|
| 5,183,396 A * | 2/1993 | Cook | ................ | F04B 1/02 417/415 |
| 5,388,761 A * | 2/1995 | Langeman | ........ | B01F 15/00285 222/138 |
| 6,257,843 B1 * | 7/2001 | Cook | ................ | F04B 17/03 417/360 |
| 6,921,001 B1 * | 7/2005 | Hunt | ................ | G05D 11/005 222/139 |
| 7,395,948 B2 * | 7/2008 | Kogan | ................ | F04C 15/06 222/1 |
| 8,511,516 B2 * | 8/2013 | Klopfenstein | ....... | B67D 1/0031 222/129.3 |
| 2003/0147755 A1 * | 8/2003 | Carter, III | ............. | B64D 41/00 417/53 |
| 2007/0000947 A1 * | 1/2007 | Lewis | ................ | B01F 15/042 222/132 |
| 2009/0068034 A1 * | 3/2009 | Cook | ................ | F04B 1/02 417/410.1 |

* cited by examiner

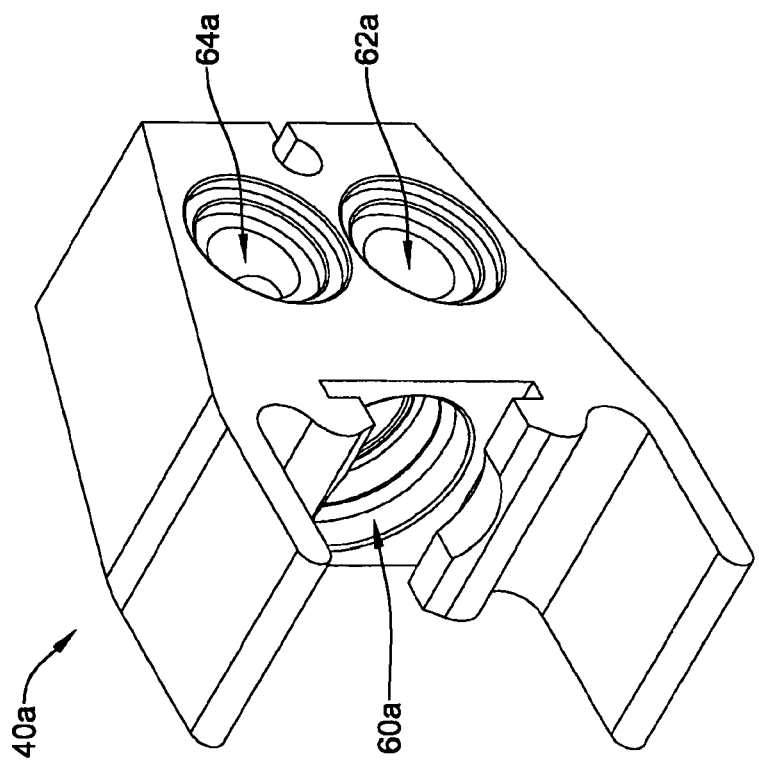

PROPORTIONING PUMP, CONTROL SYSTEMS AND APPLICATOR APPARATUS

CROSS REFERENCE TO RELATED APPLICATIONS

This application claims the benefit of U.S. provisional patent application Ser. No. 61/617,015 filed Mar. 28, 2012, the contents which are incorporated herein by reference in entirety.

BACKGROUND OF THE INVENTION

1. Field of the Invention

The present invention pertains generally to a proportioning pump, associated control systems and applicator apparatus incorporating the proportioning pump.

2. Description of the Related Art

In many fluid applications, such as chemical applications, one or more fluids must be mixed with one or more additional fluids to achieve a desired fluid mixture. Commonly, mixing one fluid with another fluid is performed by measuring out a quantity of a first fluid, measuring out a quantity of a second fluid, and combining the measured amounts in a container where the fluids are mixed together. This process is routinely performed by hand, and thus is subject to inaccuracies attributed to human error. Thus, the fluid mixture achieved may not in fact possess the precise desired proportions of the fluids. Additionally, as fluid mixtures are typically mixed in batches (i.e., discrete quantities of a fluid mixture), inconsistencies in the proportions of the mixed fluids from one batch to the next batch may be experienced.

Many artisans over the years have applied various technologies to improve various facets of pumps and to expand the applicability of pumps into industries and applications not previously well addressed. The following patents are incorporated herein by reference as exemplary of the state of the art in a variety of fields, various advances being made therein, and for the teachings and illustrations found therein which provide a foundation and backdrop for the technology of the present invention. The following list is not to be interpreted as determining relevance or analogy, but is instead in some instances provided solely to illustrate levels of skill in various fields to which the present invention pertains: U.S. Pat. No. 1,003,479 by Lucas, entitled "Pump valve"; U.S. Pat. No. 1,632,948 by Cardenas, entitled "Water pump"; U.S. Pat. No. 1,736,593 by Harm, entitled "Circulating device"; U.S. Pat. No. 1,827,811 by Derrick, entitled "Bearing for rotary pumps"; U.S. Pat. No. 1,970,251 by Rossman, entitled "Mechanical movement"; U.S. Pat. No. 2,002,783 by Long, entitled "Valve"; U.S. Pat. No. 2,054,009 by Thrush, entitled "Flexible coupling"; U.S. Pat. No. 2,367,135 by Moon et al, entitled "Tree spraying apparatus"; U.S. Pat. No. 2,739,537 by Sadler et al, entitled "Motor driven pump"; U.S. Pat. No. 2,881,338 by Banning, entitled "Variable speed alternating current motor"; U.S. Pat. No. 3,067,987 by Ballou et al, entitled "Two-component mixer"; U.S. Pat. No. 3,223,040 by Dinkelkamp, entitled "Two component pumping and proportioning system"; U.S. Pat. No. 3,338,171 by Conklin et al, entitled "Pneumatically operable diaphragm pumps"; U.S. Pat. No. 3,410,477 by Hartley, entitled "Vacuum pump"; U.S. Pat. No. 3,512,375 by Madarasz et al, entitled "Flexible coupling for shafts"; U.S. Pat. No. 3,653,784 by Leitermann et al, entitled "Proportionating feed pump"; U.S. Pat. No. 3,664,770 by Palmer, entitled "Diaphragm pumps"; U.S. Pat. No. 3,707,305 by Kinkelder, entitled "Automatic spray fluid control device"; U.S. Pat. No. 3,765,605 by Gusmer et al, entitled "Apparatus for ejecting a mixture of liquids"; U.S. Pat. No. 3,765,802 by Leitermann et al, entitled "Feed and proportioning pump"; U.S. Pat. No. 3,770,060 by Forsyth et al, entitled "Modular Firefighting unit"; U.S. Pat. No. 3,787,145 by Keyes et al, entitled "Mixing pump assembly"; U.S. Pat. No. 3,799,402 by Holmes et al, entitled "Liquid proportioning system"; U.S. Pat. No. 3,801,229 by Henderson, entitled "Combined motor and rotary fluid device"; U.S. Pat. No. 3,815,621 by Robinson, entitled "Proportioning pump"; U.S. Pat. No. 3,831,849 by Studinger, entitled "Mobile self contained pressure sprayer"; U.S. Pat. No. 3,894,690 by Hill, entitled "Horticulture spraying systems"; U.S. Pat. No. 3,910,497 by Manor, entitled "Hydraulic valve operator and remote control"; U.S. Pat. No. 3,963,038 by Jensen, entitled "Liquid proportioning pump"; U.S. Pat. No. 3,967,920 by Hill, entitled "Horticulture spraying systems"; U.S. Pat. No. 3,980,231 by Trondsen, entitled "Proportioning sprayer device"; U.S. Pat. No. 4,004,602 by Cordis et al, entitled "Self-metering dual proportioner"; U.S. Pat. No. 4,010,768 by Hechler IV, entitled "Two-stage jet pump proportioner"; U.S. Pat. No. 4,026,196 by Olofsson, entitled "Device for driving a pump piston"; U.S. Pat. No. 4,026,439 by Cocks, entitled "Precision fluid dispensing and mixing system"; U.S. Pat. No. 4,073,606 by Eller, entitled "Pumping installation"; U.S. Pat. No. 4,076,465 by Pauliukonis, entitled "Volumetric proportioning diluter"; U.S. Pat. No. 4,089,624 by Nichols et al, entitled "Controlled pumping system"; U.S. Pat. No. 4,119,113 by Meginniss III, entitled "Double-action proportioning pump"; U.S. Pat. No. 4,167,236 by Taubenmann, entitled "Apparatus for the feeding of liquid synthetic resin components"; U.S. Pat. No. 4,186,769 by Buyce, entitled "Liquid mixing and delivering aparatus"; U.S. Pat. No. 4,187,173 by Keefer, entitled "Reverse osmosis method and apparatus"; U.S. Pat. No. 4,191,309 by Alley et al, entitled "Product portioning in the continuous pumping of plastic materials"; U.S. Pat. No. 4,199,303 by Bairunas et al, entitled "Feeder for apparatus for ejecting a mixture of a plurality of liquids"; U.S. Pat. No. 4,200,426 by Linnert, entitled "Hermetic compressor assembly including torque reaction leaf spring means"; U.S. Pat. No. 4,234,007 by Titone et al, entitled "Automatic liquid flow control device"; U.S. Pat. No. 4,236,673 by Lake, entitled "Portable power operated chemical spray apparatus"; U.S. Pat. No. 4,243,523 by Pelmulder, entitled "Water purification process and system"; U.S. Pat. No. 4,273,261 by Krueger, entitled "Metering apparatus"; U.S. Pat. No. 4,278,205 by Binoche, entitled "Constant flow rate fluid supply device, particularly for a spray gun"; U.S. Pat. No. 4,288,326 by Keefer, entitled "Rotary shaft driven reverse osmosis method and apparatus"; U.S. Pat. No. 4,317,468 by Schwartz et al, entitled "Pressure relief valve"; U.S. Pat. No. 4,317,647 by Haeuser, entitled "Dosing system"; U.S. Pat. No. 4,341,327 by Zeitz, entitled "Digital proportional metering pumping system"; U.S. Pat. No. 4,350,179 by Bunn et al, entitled "Valve assembly with relief groove"; U.S. Pat. No. 4,360,323 by Anderson, entitled "Proportioning pumping system for dialysis machines"; U.S. Pat. No. 4,367,140 by Wilson, entitled "Reverse osmosis liquid purification apparatus"; U.S. Pat. No. 4,427,298 by Fahy et al, entitled "Method and system for accurately providing fluid blends"; U.S. Pat. No. 4,432,470 by Sopha, entitled "Multicomponent liquid mixing and dispensing assembly"; U.S. Pat. No. 4,434,056 by Keefer, entitled "Multi-cylinder reverse osmosis apparatus and method"; U.S. Pat. No. 4,436,493 by Credle, Jr., entitled "Self contained pump and reversing mechanism therefor"; U.S. Pat. No. 4,437,812 by Abu-Shumays et al, entitled "Single-pump multiple stroke proportioning for gradient elution liquid chromatography"; U.S. Pat. No. 4,440,314 by Vetter et al, entitled "Method and apparatus for the automatic dynamic dosing at least of one fluid component of a mixed fluid"; U.S. Pat. No. 4,445,470 by Chmielewski, entitled "Oil injection warning system"; U.S. Pat. No. 4,452,631 by Burow, Jr. et al, entitled "Urea herbicides"; U.S. Pat. No. 4,486,097 by Riley, entitled "Flow analysis"; U.S. Pat. No. 4,487,333 by Pounder et al, entitled "Fluid dispensing system"; U.S. Pat. No. 4,518,105 by Kuckens et al, entitled "Method of and device for dispensing viscous concentrates of variable viscosity in accurately metered quantities of variable volume"; U.S. Pat. No. 4,534,713 by Wanner, entitled "Pump apparatus"; U.S. Pat. No. 4,593,855 by Forsyth, entitled "Vehicle-mountable fire fighting apparatus"; U.S. Pat. No. 4,601,378 by Pierce et al, entitled "Supporting bracket for hydraulic pump and clutch"; U.S. Pat. No. 4,609,149 by Jessen, entitled "Injection gun system for lawn treatment"; U.S. Pat. No. 4,609,469 by Keoteklian, entitled "Method for treating plant effluent"; U.S. Pat. No. 4,629,568 by Ellis III, entitled "Fluid treatment system"; U.S. Pat. No. 4,645,599 by Fredkin, entitled "Filtration apparatus"; U.S. Pat. No. 4,648,854 by Redington, entitled "Variable speed drive"; U.S. Pat. No. 4,699,023 by Bajulaz, entitled "Mechanical reducer"; U.S. Pat. No. 4,705,461 by Clements, entitled "Two-component metering pump"; U.S. Pat. No. 4,708,674 by Matsumoto, entitled "Separate lubricating system for marine propulsion device"; U.S. Pat. No. 4,722,675 by Albarda, entitled "Piston proportioning pump"; U.S. Pat. No. 4,744,895 by Gales et al, entitled "Reverse osmosis water purifier"; U.S. Pat. No. 4,762,281 by Eberhardt, entitled "Drive arrangements for comminutor-pump assembly"; U.S. Pat. No. 4,773,993 by Yoda et al, entitled "Apparatus for purifying and dispensing water with stagnation preventing means"; U.S. Pat. No. 4,778,356 by Hicks, entitled "Diaphragm pump"; U.S. Pat. No. 4,778,597 by Bruzzi et al, entitled "Process for the separation and recovery of boron compounds from a geothermal brine"; U.S. Pat. No. 4,784,771 by Wathen et al, entitled "Method and apparatus for purifying fluids"; U.S. Pat. No. 4,789,100 by Senf, entitled "Multiple fluid pumping system"; U.S. Pat. No. 4,790,454 by Clark et al, entitled "Self-contained apparatus for admixing a plurality of liquids"; U.S. Pat. No. 4,804,474 by Blum, entitled "Energy efficient dialysis system"; U.S. Pat. No. 4,804,475 by Sirinyan et al, entitled "Metallized membrane systems"; U.S. Pat. No. 4,821,958 by Shaffer, entitled "Mobile pressure cleaning unit"; U.S. Pat. No. 4,850,812 by Voight, entitled "Integrated motor pump combination"; U.S. Pat. No. 4,887,559 by Hensel et al, entitled "Solenoid controlled oil injection system for two cycle engine"; U.S. Pat. No. 4,913,809 by Sawada et al, entitled "Concentrating apparatus with reverse osmosis membrane"; U.S. Pat. No. 4,921,133 by Roeser, entitled "Method and apparatus for precision pumping, ratioing and dispensing of work fluids"; U.S. Pat. No. 4,929,347 by Imai et al, entitled "Concentrating apparatus with reverse osmosis membrane"; U.S. Pat. No. 4,934,567 by Vahjen et al, entitled "Hybrid beverage mixing and dispensing system"; U.S. Pat. No. 4,941,596 by Marty et al, entitled "Mixing system for use with concentrated liquids"; U.S. Pat. No. 4,944,882 by Ray et al, entitled "Hybrid membrane separation systems"; U.S. Pat. No. 4,955,943 by Hensel et al, entitled "Metering pump controlled oil injection system for two cycle engine"; U.S. Pat. No. 4,999,209 by Gnekow, entitled "Low and non-alcoholic beverages produced by simultaneous double reverse osmosis"; U.S. Pat. No. 5,005,765 by Kistner, entitled "Method and apparatus for applying multicomponent materials"; U.S. Pat. No. 5,014,914 by Wallenas, entitled "Dose control apparatus for agricultural tube sprayers for spreading pesticides on fields and plants"; U.S. Pat. No. 5,027,978 by Roeser, entitled "Method and apparatus for precision pumping, ratioing, and dispensing of work fluid(s)"; Ser. No. 5,055,008 by Daniels et al, entitled "Proportionating pump for liquid additive metering"; U.S. Pat. No. 5,057,212 by Burrows, entitled "Water conductivity monitor and circuit with extended operating life"; U.S. Pat. No. 5,058,768 by Lichfield, entitled "Methods and apparatus for dispensing plural fluids in a precise proportion"; U.S. Pat. No. 5,089,124 by Mahar et al, entitled "Gradient generation control for large scale liquid chromatography"; U.S. Pat. No. 5,100,058 by Wei, entitled "Self-contained cleaning system for motor vehicles"; U.S. Pat. No. 5,100,699 by Roeser, entitled "Method and apparatus for precision pumping, ratioing, and dispensing of work fluid(s)"; U.S. Pat. No. 5,102,312 by Harvey, entitled "Pump head"; U.S. Pat. No. 5,108,273 by Romanyszyn, entitled "Helical metering pump having different sized rotors"; U.S. Pat. No. 5,114,241 by Morrison, entitled "Device for insulating motor stators"; U.S. Pat. No. 5,118,008 by Williams, entitled "Programmable additive controller"; U.S. Pat. No. 5,133,483 by Buckles, entitled "Metering system"; U.S. Pat. No. 5,170,912 by Du, entitled "Proportioning pump"; U.S. Pat. No. 5,173,039 by Cook, entitled "Double acting simplex plunger pump"; U.S. Pat. No. 5,180,108 by Miyamoto, entitled "Truck with a power spray device"; U.S. Pat. No. 5,183,396 by Cook et al, entitled "Double acting simplex plunger pump"; U.S. Pat. No. 5,184,941 by King et al, entitled "Mounting support for motor-pump unit"; U.S. Pat. No. 5,192,000 by Wandrick et al, entitled "Beverage dispenser with automatic ratio control"; U.S. Pat. No. 5,207,916 by Goheen et al, entitled "Reverse osmosis system"; U.S. Pat. No. 5,221,192 by Heflin et al, entitled "Elastomeric compressor stud mount"; U.S. Pat. No. 5,228,594 by Aslin, entitled "Metered liquid dispensing system"; U.S. Pat. No. 5,235,944 by Adachi, entitled "Engine lubricating system"; U.S. Pat. No. 5,253,981 by Yang et al, entitled "Multichannel pump apparatus with microflow rate capability"; U.S. Pat. No. 5,255,819 by Peckels, entitled "Method and apparatus for manual dispensing from discrete vessels with electronic system control and dispensing data generation on each vessel, data transmission by radio or interrogator, and remote data recording"; U.S. Pat. No. 5,287,833 by Yashiro, entitled "Lubricating oil supplying system for two cycle engine"; U.S. Pat. No. 5,297,511 by Suzuki, entitled "Lubricating system for engine"; U.S. Pat. No. 5,303,866 by Hawks, entitled "Integrated modular spraying system"; U.S. Pat. No. 5,332,123 by Farber et al, entitled "Device for the measured dispensing of liquids out of a storage container and synchronous mixing with a diluent"; U.S. Pat. No. 5,344,291 by Antkowiak, entitled "Motor pump power end interconnect"; U.S. Pat. No. 5,354,182 by Niemiec et al, entitled "Unitary electric-motor/hydraulic-pump assembly with noise reduction features"; U.S. Pat. No. 5,355,851 by Kamiya, entitled "Lubricating oil supplying system for two cycle engine"; U.S. Pat. No. 5,368,059 by Box et al, entitled "Plural component controller"; U.S. Pat. No. 5,370,269 by Bernosky et al, entitled "Process and apparatus for precise volumetric diluting/mixing of chemicals"; U.S. Pat. No. 5,383,605 by Teague, entitled "Radio controlled spraying device"; U.S. Pat. No. 5,390,635 by Kidera et al, entitled "Lubricating oil supplying system for engine"; U.S. Pat. No. 5,403,490 by Desai, entitled "Process and apparatus for removing solutes from solutions"; U.S. Pat. No. 5,433,349 by Romanyszyn, entitled "Mixing and flushing device for juice dispensing tower"; U.S. Pat. No. 5,439,592 by Bellos et al, entitled "Method for removal of water soluble organics from oil process water"; U.S. Pat. No. 5,490,939 by Gerigk et al, entitled "Process for reconcentrating overspray from one-component coating compositions";

U.S. Pat. No. 5,494,414 by Steinhart et al, entitled "Vertical shaft pressure washer coupling assembly"; U.S. Pat. No. 5,511,524 by Kidera et al, entitled "Lubricating oil supplying system for engine"; U.S. Pat. No. 5,538,641 by Getty et al, entitled "Process for recycling laden fluids"; U.S. Pat. No. 5,542,578 by Buckles, entitled "Dispensing gun for ratio sensitive two-part material"; U.S. Pat. No. 5,558,435 by Marjo, entitled "System for mixing liquids"; U.S. Pat. No. 5,630,383 by Kidera et al, entitled "Lubricating oil supplying system for engine"; U.S. Pat. No. 5,636,648 by O'Brien et al, entitled "Mobile rotator jet sewer cleaner"; U.S. Pat. No. 5,647,973 by Desaulniers, entitled "Reverse osmosis filtration system with concentrate recycling controlled by upstream conductivity"; U.S. Pat. No. 5,707,219 by Powers, entitled "Diaphragm pump"; U.S. Pat. No. 5,779,449 by Klein, entitled "Separable, multipartite impeller assembly for centrifugal pumps"; U.S. Pat. No. 5,785,504 by Cote, entitled "Pump with separate pumping stages for pumping a plurality of liquids"; U.S. Pat. No. 5,823,752 by Hoenisch et al, entitled "Adapter for mechanically coupling a pump and a prime mover"; U.S. Pat. No. 5,829,401 by Masuda, entitled "Lubrication system for two-cycle engine"; U.S. Pat. No. 5,855,626 by Wiegner et al, entitled "Method for mixing and dispensing oxygen degradable hair dye concentrates"; U.S. Pat. No. 5,862,947 by Wiegner et al, entitled "Hair dye color selection system and method"; U.S. Pat. No. 5,878,708 by Ruman, entitled "Oil management system for a fuel injected engine"; U.S. Pat. No. 5,879,137 by Yie, entitled "Method and apparatus for pressurizing fluids"; U.S. Pat. No. 5,908,183 by Fury, entitled "Precision power coupling housing"; U.S. Pat. No. 5,975,152 by Kluge, entitled "Fluid container filling apparatus"; U.S. Pat. No. 5,975,863 by Mazzucato, entitled "High pressure water pump system"; U.S. Pat. No. 6,012,608 by Ridenour, entitled "Storage and metering system for supersaturated feed supplements"; U.S. Pat. No. 6,034,465 by McKee et al, entitled "Pump driven by brushless motor"; U.S. Pat. No. 6,050,756 by Buchholz et al, entitled "Method of cooling and lubricating a tool and/or workpiece and a working spindle for carrying out the method"; U.S. Pat. No. 6,055,831 by Barbe, entitled "Pressure sensor control of chemical delivery system"; U.S. Pat. No. 6,056,515 by Cuneo, entitled "Hydrocleaning machine with pump mounting closure lid"; U.S. Pat. No. 6,070,764 by Cline et al, entitled "Apparatus for dispensing liquids and solids"; U.S. Pat. No. 6,074,551 by Jones et al, entitled "Automatic cleaning system for a reverse osmosis unit in a high purity water treatment system"; U.S. Pat. No. 6,098,646 by Hennemann et al, entitled "Dispensing system with multi-port valve for distributing use dilution to a plurality of utilization points and position sensor for use thereon"; U.S. Pat. No. 6,110,375 by Bacchus et al, entitled "Process for purifying water"; U.S. Pat. No. 6,113,797 by Al-Samadi, entitled "High water recovery membrane purification process"; U.S. Pat. No. 6,120,682 by Cook, entitled "Portable pump-type reverse osmosis apparatus"; U.S. Pat. No. 6,139,748 by Ericson et al, entitled "Method and device for monitoring an infusion pump"; U.S. Pat. No. 6,162,023 by Newman, entitled "Reciprocating cam actuation mechanism for a pump"; U.S. Pat. No. 6,164,560 by Lehrke et al, entitled "Lawn applicator module and control system therefor"; U.S. Pat. No. 6,186,193 by Phallen et al, entitled "Continuous liquid stream digital blending system"; U.S. Pat. No. 6,190,556 by Uhlinger, entitled "Desalination method and apparatus utilizing nanofiltration and reverse osmosis membranes"; U.S. Pat. No. 6,247,838 by Pozniak et al, entitled "Method for producing a liquid mixture having a predetermined concentration of a specified component"; U.S. Pat. No. 6,254,779 by Jeffery et al, entitled "Treatment of effluent streams containing organic acids"; U.S. Pat. No. 6,257,843 by Cook et al, entitled "Self-aligning double-acting simplex plunger pump"; U.S. Pat. No. 6,284,171 by Nonomura et al, entitled "Blow molding process"; U.S. Pat. No. 6,293,756 by Andersson, entitled "Pump"; U.S. Pat. No. 6,305,169 by Mallof, entitled "Motor assisted turbocharger"; U.S. Pat. No. 6,328,388 by Mohr et al, entitled "Brake actuation unit"; U.S. Pat. No. 6,333,018 by Bianchi et al, entitled "Process for the industrial production of high purity hydrogen peroxide"; U.S. Pat. No. 6,336,794 by Kim, entitled "Rotary compressor assembly with improved vibration suppression"; U.S. Pat. No. 6,374,781 by Kato, entitled "Oil injection lubrication system for two-cycle engines"; U.S. Pat. No. 6,386,396 by Strecker, entitled "Mixing rotary positive displacement pump for micro dispensing"; U.S. Pat. No. 6,398,521 by Yorulmazoglu, entitled "Adapter for motor and fluid pump"; U.S. Pat. No. 6,409,375 by Knight, entitled "Precision injected liquid chemical mixing apparatus"; U.S. Pat. No. 6,422,183 by Kato, entitled "Oil injection lubrication system and methods for two-cycle engines"; U.S. Pat. No. 6,439,860 by Greer, entitled "Chambered vane impeller molten metal pump"; U.S. Pat. No. 6,464,107 by Brugger, entitled "Dosage dispenser"; U.S. Pat. No. 6,491,494 by Beckenbach et al, entitled "Direct drive water pump"; U.S. Pat. No. 6,527,524 by Cook, entitled "Double acting simplex plunger pump with bi-directional valves"; U.S. Pat. No. 6,554,577 by Park et al, entitled "Apparatus and method for controlling operation of linear compressor using pattern recognition"; U.S. Pat. No. 6,568,559 by Miller et al, entitled "Termite control system with multi-fluid proportion metering and batch signal metering"; U.S. Pat. No. 6,607,668 by Rela, entitled "Water purifier"; U.S. Pat. No. 6,696,298 by Cook et al, entitled "Multi-channel reagent dispensing apparatus"; U.S. Pat. No. 6,735,945 by Hall et al, entitled "Electric turbocharging system"; U.S. Pat. No. 6,739,845 by Woollenweber, entitled "Compact turbocharger"; U.S. Pat. No. 6,742,765 by Takano et al, entitled "Operating device and valve system"; U.S. Pat. No. 6,817,486 by Yang, entitled "Photoresist supply apparatus capable of controlling flow length of photoresist and method of supplying photoresist using the same"; U.S. Pat. No. 6,824,364 by Ross et al, entitled "Master/slave pump assembly employing diaphragm pump"; U.S. Pat. No. 6,841,076 by Wobben, entitled "Method and device for desalting water"; U.S. Pat. No. 6,857,543 by Kvam et al, entitled "Low volume dispense unit and method of using"; U.S. Pat. No. 6,863,036 by Kato, entitled "Lubrication system for two-cycle engine"; U.S. Pat. No. 6,893,569 by Zelechonok, entitled "Method and apparatus for high pressure liquid chromatography"; U.S. Pat. No. 6,896,152 by Pittman et al, entitled "Electronic plural component proportioner"; U.S. Pat. No. 6,974,052 by d'Hond et al, entitled "Dosing device adapted for dispensing a concentrate from a holder in a metered manner"; U.S. Pat. No. 6,997,683 by Allington et al, entitled "High pressure reciprocating pump and control of the same"; U.S. Pat. No. 7,050,886 by Oberg et al, entitled "Chemical dispensing system for a portable concrete plant"; U.S. Pat. No. 7,063,785 by Hiraku et al, entitled "Pump for liquid chromatography"; U.S. Pat. No. 7,066,353 by Hammonds, entitled "Fluid powered additive injection system"; U.S. Pat. No. 7,067,061 by Bosetto et al, entitled "Method and a device for preparing a medical liquid"; U.S. Pat. No. 7,141,161 by Ito, entitled "Gradient pump apparatus"; U.S. Pat. No. 7,147,827 by Balisky, entitled "Chemical mixing, replenishment, and waste management system"; U.S. Pat. No. 7,207,260 by Thierry et al, entitled "Reciprocating hydraulic machine, especially a motor, and dosing apparatus comprising such a motor"; U.S. Pat. No. 7,823,323 by Su, entitled "Remote monitoring system for detecting termites"; RE 18,303 by Harm, entitled "Circulating device"; RE 32,144 by Keefer, entitled "Reverse osmosis method and apparatus"; RE 33,135 by Wanner, Sr., deceased et al, entitled "Pump apparatus"; 2002/0157413 by Iwanami et al, entitled "Compressor driven selectively by first and second drive sources"; 2003/0103850 by Szulczewski, entitled "Axial piston pump/motor with clutch and through shaft"; 2003/0147755 by Carter, III et al, entitled "Dual drive for hydraulic pump and air boost compressor"; 2003/0160525 by Kimberlin et al, entitled "Motor pump with balanced motor rotor"; 2004/0033144 by Rush, entitled "Decoupling mechanism for hydraulic pump/motor assembly"; 2004/0136833 by Allington et al, entitled "High pressure reciprocating pump and control for the same"; 2004/0175278 by Dexter et al, entitled "Pressure washer having oilless high pressure pump"; 2004/0244372 by Leavesley, entitled "Turbocharger apparatus"; 2004/0247461 by Pflueger et al, entitled "Two stage electrically powered compressor"; 2004/0265144 by Fukanuma et al, entitled "Hybrid compressor"; 2005/0019187 by Whitworth et al, entitled "Internal screw positive rod displacement metering pump"; 2005/0254970 by Mayer et al, entitled "Quick connect pump to pump mount and drive arrangement"; 2006/0228233 by Cook, entitled "Pump and motor assembly"; 2007/0029255 by D'Amato et al, entitled "Desalination system powered by renewable energy source and methods related thereto"; 2008/0296224 by Cook et al, entitled "Reverse osmosis pump system"; 2009/0068034 by Cook, entitled "Pumping system with precise ratio output"; and 2010/0127410 by Drager, entitled "Method and device for the metered release of irritants".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

Disclosed is a precision pumping system whose fluid output includes desired proportions of two or more input fluids.

Accordingly, one illustrative embodiment is a pumping system that includes an electric motor assembly powering a first drive shaft driving a first pump at a first flow rate and powering a second drive shaft driving a second pump at a second flow rate. A proportioned fluid output includes a first fluid pumped by the first pump and a second fluid pumped by the second pump. The pumping system provides a desired ratio of the first fluid to the second fluid at the proportioned fluid output, relatively independently of pressure and flow rate at the output.

Another illustrative embodiment is a system for pumping a first fluid and a second fluid in a desired proportion. The system includes a first pump having an inlet in fluid communication with a first container for holding a quantity of the first fluid, and an outlet. The system further includes a second pump having an inlet in fluid communication with a second container for holding a quantity of the second fluid, and an outlet. The system further includes an electric motor assembly for driving the first pump at a first cycling rate and the second pump at a second cycling rate, wherein the outlet of the first pump and the outlet of the second pump are in fluid communication with an outlet of the system, sometimes through respective check valves to prevent backflow.

Yet another illustrative embodiment is a system for pumping a first fluid and a second fluid in a desired proportion. The system includes a first pump, a second pump, a third pump, a fourth pump, and an electric motor assembly. The first pump has an inlet in fluid communication with a first container for holding a quantity of the first fluid, and an outlet. The second pump has an inlet in fluid communication with a second container for holding a quantity of the second fluid, and an outlet. The outlet of the first pump and the outlet of the second pump are in fluid communication with a first stage outlet. The electric motor assembly drives the first pump at a first cycling rate and drives the second pump at a second cycling rate. The third pump has an inlet in fluid communication with the second container, and an outlet. The fourth pump has an inlet in fluid communication with the first stage outlet, and an outlet. The outlet of the third pump and the outlet of the fourth pump are in fluid communication with a second stage outlet. The third pump is driven at a third cycling rate and the fourth pump is driven at a fourth cycling rate. In some embodiments the third pump and the fourth pump are driven by another electric motor assembly.

The above summary of some example embodiments is not intended to describe each disclosed embodiment or every implementation of the invention.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 8 is a perspective view of a housing block of a pump of the pump assembly of FIG. 1;

DESCRIPTION OF THE PREFERRED EMBODIMENT

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result).

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Figure 1:
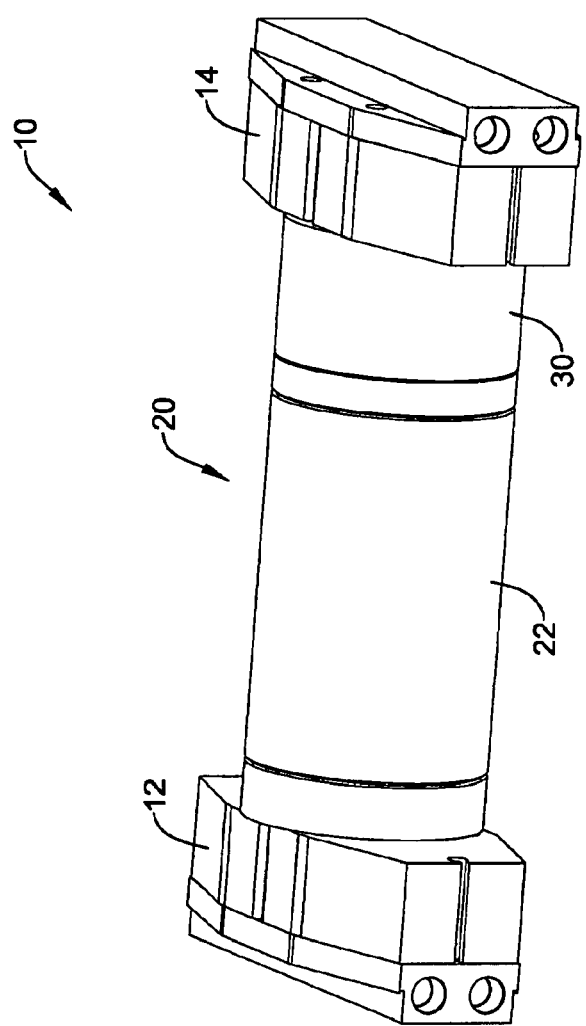
FIG. 1 is a perspective view of an exemplary pump assembly.
Figure 2:
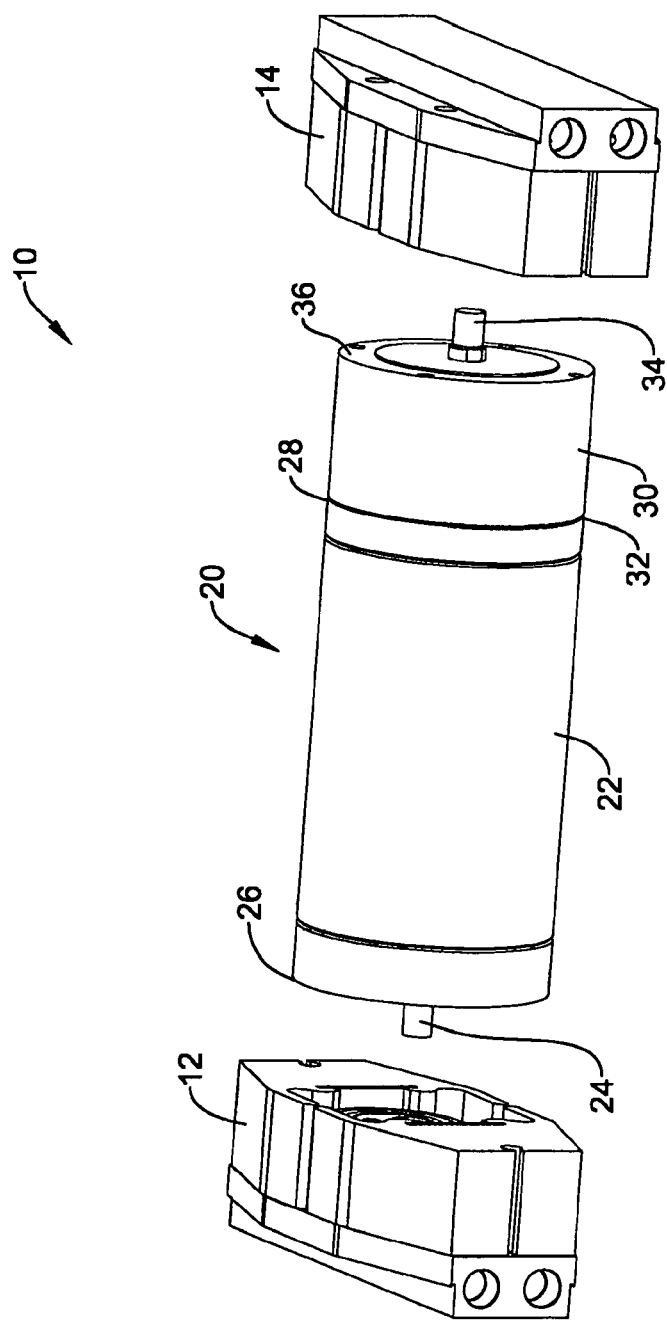
FIG. 2 is an exploded view of the exemplary pump assembly of FIG. 1.

An exemplary pump assembly 10 is shown in FIGS. 1 and 2. The pump assembly 10 may include a first pump 12, a second pump 14, and an electric motor assembly 20 powering the first pump 12 and the second pump 14. The electric motor assembly 20 is shown in FIG. 1 as being positioned between first pump 12 and second pump 14. As shown in FIG. 1, rotational power generated by electric motor assembly 20 is transmitted to each of the first pump 12 and the second pump 14 in order to actuate pumps 12, 14. However, in other embodiments electric motor assembly 20 may otherwise be connected to first pump 12 and/or second pump 14 such that power generated by the electric motor assembly is transmitted to first pump 12 and/or second pump 14.

Electric motor assembly 20 may include an electric motor 22 including a first drive shaft 24. In some embodiments, first drive shaft 24 may extend from the first end 26 of electric motor 22, and first drive shaft 24 may extend from the second end 28 of electric motor 22. The electric motor 22 may rotate first drive shaft 24 at a first rotational speed. For instance, in some embodiments electric motor 22 may rotate first drive shaft 24 at a rotational speed in the range of about 1600 Revolutions Per Minute (RPM) to about 3600 RPM, although other speeds are contemplated.

A transmission 30 may be connected to electric motor 22 to transmit power from electric motor 22. As shown in FIG. 1, the first end 32 of transmission 30 may be attached to the second end 28 of electric motor 22. First drive shaft 24 may extend into or otherwise be connected to transmission 30. A second drive shaft 34 may extend from the second end 36 of transmission 30. Thus, the first drive shaft 24 extending from the second end of 28 of the electric motor 22 may be the power input into transmission 30, and the second drive shaft 34 extending from the second end 36 of transmission 30 may be the power output from transmission 30. In some embodiments, the second drive shaft 34 may be axially aligned with the first drive shaft 24. In other embodiments, the second drive shaft 34 may be offset or otherwise not axially aligned with first drive shaft 24.

As used herein a transmission is an assembly of associated parts by which rotational power is converted from a first rotational speed or rate at the power input of the transmission to a second possibly different rotational speed or rate at the power output of the transmission. As used herein the terms "speed" or "rate" may refer to a fixed speed or rate or a variable speed or rate unless the content clearly dictates otherwise.

In some embodiments, the transmission may include one or more chains and sprockets, one or more belts and pulleys, one or more gears, etc. used to alter the output speed from the input speed. In some embodiments, the transmission may be a speed reduction, such as a gear reduction including one or more gears reducing the rotational rate of the output shaft from the rotational rate of the input shaft, while in other embodiments the transmission may be a speed accelerator, such as a gear accelerator including one or more gears increasing the rotational rate of the output shaft from the rotational rate of the input shaft.

Thus, transmission 30 may be present to control the rotational rate of second drive shaft 34 relative to first drive shaft 24. For instance, first drive shaft 24 may be rotated at a first rotational rate and second drive shaft 34 may be rotated at a second rotational rate. In some embodiments, the first rotational rate may be the same as the second rotational rate, or the first rotational rate may be different from the second rotational rate. For instance, in some embodiments the rotational rate of first drive shaft 24 may be greater than the rotational rate of second drive shaft 34, while in other embodiments the rotational rate of first drive shaft 24 may be less than the rotational rate of second drive shaft 34.

In some embodiments, transmission 30 may be configured such that first drive shaft 24 has a rotational rate of in the range of 2 to 100 times, in the range of 5 to 50 times, in the range of 10 to 40 times, or in the range of 20 to 30 times the rotational rate of second drive shaft 34. In some embodiments the rotational rate of first drive shaft 24 may be 2 times, 4 times, 8 times, 12 times, 24 times, 36 times, 40 times or 50 times the rotational rate of second drive shaft 34.

In some embodiments, transmission 30 may be configured such that the second drive shaft 34 has a rotational rate of in the range of 2 to 100 times, in the range of 5 to 50 times, in the range of 10 to 40 times, or in the range of 20 to 30 times the rotational rate of first drive shaft 24. In some embodiments the rotational rate of second drive shaft 34 may be 2 times, 4 times, 8 times, 12 times, 24 times, 36 times, 40 times or 50 times the rotational rate of first drive shaft 24.

It is noted, however, that these exemplary rates are for illustrative purposes only, and transmission 30 may rotate second drive shaft 34 at any desired rate relative to first drive shaft 24.

In some embodiments the rotational rate of first drive shaft 24 may be a fixed rate of rotation. However, in other embodiments the rotational rate of first drive shaft 24 may be a variable rate of rotation which may be selectively controlled. For example, in some embodiments a controller may be used to adjust the rotational rate of first drive shaft 24 to a desired rate of rotation. For instance, a controller may be used to vary the speed of motor 22 in order to adjust the rotational rate of first drive shaft 24. In such instances the rotational rate of first drive shaft 24 may be manually controlled by an operator, or the rotational rate of first drive shaft 24 may be electronically controlled with signals generated by a processor of the controller, for example signals generated from feedback response provided to the controller.

In some embodiments, motor 22 may be configured to run at variable speeds. Thus, the rotational rate of first drive shaft 24 may be varied by varying the speed of motor 22. In such embodiments, when transmission 30 is fixed or otherwise not varied, varying the rotational rate of first drive shaft 24 with speed control module 288 varies the rotational rate of second drive shaft 34 in proportion to the ratio dictated by transmission 30. Thus, varying the speed of motor 22 may vary the flow rate of fluid pumped through first pump 12 and the flow rate of fluid pumped through second pump 14, while maintaining a constant proportion or ratio of fluid pumped through first pump 12 to the fluid pumped through second pump 14.

In some embodiments the rotational rate of second drive shaft 34 may be a fixed rate of rotation. However, in other embodiments the rotational rate of second drive shaft 34 may be a variable rate of rotation which may be selectively controlled. For example, in some embodiments a controller may be used to adjust the rotational rate of second drive shaft 34 to a desired rate of rotation. For instance, a controller may be used send a signal to transmission 30 in order to adjust the rotational rate of second drive shaft 34. In such instances the rotational rate of second drive shaft 34 may be manually controlled by an operator, or the rotational rate of second drive shaft 34 may be electronically controlled with signals generated by a processor of the controller, for example signals generated from feedback response provided to the controller.

The first pump 12 may be driven by rotation of first drive shaft 24, while the second pump 14 may be driven by rotation of second drive shaft 34. In embodiments in which the rotational rate of first drive shaft 24 is different from the rotational rate of second drive shaft 34, first pump 12 may be actuated at a different rate from second pump 14. In embodiments in which the displacement of first pump 12 is the same as the displacement of second pump 14, the fluid output rate of first pump 12 may be different from the fluid output rate of second pump 14 when the drive shafts 24 and 34 are rotated at different rates. For instance, in some embodiments, the fluid output rate of first pump 12 may be greater than or less than the fluid output rate of second pump 14.

In some embodiments, the fluid output rate of first pump 12 may be different from the fluid output rate of second pump 14 when first pump 12 has a different displacement than second pump 14. In such embodiments, the rotational rate of first drive shaft 24 powering first pump 12 may be the same as or different than the rotational rate of second drive shaft 34.

In some embodiments the fluid output rate of first pump 12 may be proportional to the rotational rate of first drive shaft 24, while the fluid output rate of second pump 14 may be proportional to the rotational rate of second drive shaft 34. In some embodiments the fluid output from first pump 12 may be in the range of 2 to 100 times, in the range of 2 to 50 times, in the range of 10 to 40 times, in the range of 20 to 40 times, in the range of 20 to 50 times, or in the range of 50 to 100 times the fluid output of second pump 14. Thus, in some embodiments, the fluid output from first pump 12 may be 2 times, 4 times, 8 times, 12 times, 24 times, 36 times, 40 times or 50 times the fluid output from second pump 14. In other embodiments the fluid output from second pump 14 may be in the range of 2 to 100 times, in the range of 2 to 50 times, in the range of 10 to 40 times, in the range of 20 to 40 times, in the range of 20 to 50 times, or in the range of 50 to 100 times the fluid output of first pump 12. Thus, in other embodiments, the fluid output from the second pump 14 may be 2 times, 4 times, 8 times, 12 times, 24 times, 36 times, 40 times or 50 times the fluid output from first pump 12. It is noted, however, that these possible fluid output ratios are for illustrative purposes only, and any desired fluid ratio may be achieved.

Thus, it can be seen that the displacement of pumps 12, 14 and/or the input/output speed ratio of transmission 30 may be selected to achieve a desired fluid mixture having a desired proportion of a first fluid pumped by first pump 12 and a desired proportion of a second fluid pumped by second pump 14, relatively independently of pressure and flow rate at the output. Therefore, in some embodiments, the displacement of pumps 12, 14 and/or the input/output speed ratio of transmission 30 may be selected to attain a label dictated rate of a chemical mixed with a fluid such as water. Thus, regardless of the speed of motor 22 (and thus the flow rate of fluids through pumps 12, 14) the proportion or ratio of fluid pumped through first pump 12 to the fluid pumped through second pump 14 may be constant. Therefore, the ratios of fluids pumped through pumps 12, 14 may be accurately controlled.

The first pump 12 and/or the second pump 14 may be any desired pump. For example, first pump 12 and second pump 14 may be rotodynamic pumps or positive displacement pumps. In some embodiments pumps 12, 14 may be piston pumps, plunger pumps, gear pumps, impeller pumps, or the like. For illustrative purposes, both first pump 12 and second pump 14 are shown as double acting simplex positive displacement plunger pumps. Double acting means that each stroke of the plunger results in both suction and discharge of fluid. Simplex means that the pump utilizes a single plunger. Some examples of double acting simplex positive displacement plunger pumps are described in U.S. Pat. Nos. 4,978,284, 5,173,039, 5,183,396, 6,257,843 and 6,527,524 owned by the present assignee, the disclosures of which are incorporated herein by reference. In other embodiments, the positive displacement plunger pumps may be single acting and/or duplex or triplex pumps.

The first pump 12 and its components will now be described in greater detail while referring to FIGS. 3-10. Although discussion is directed to first pump 12, it is understood that the discussion of the construction, function and/or operation of first pump 12 may be equally applicable to the construction, function and/or operation of second pump 14.

Figure 3:
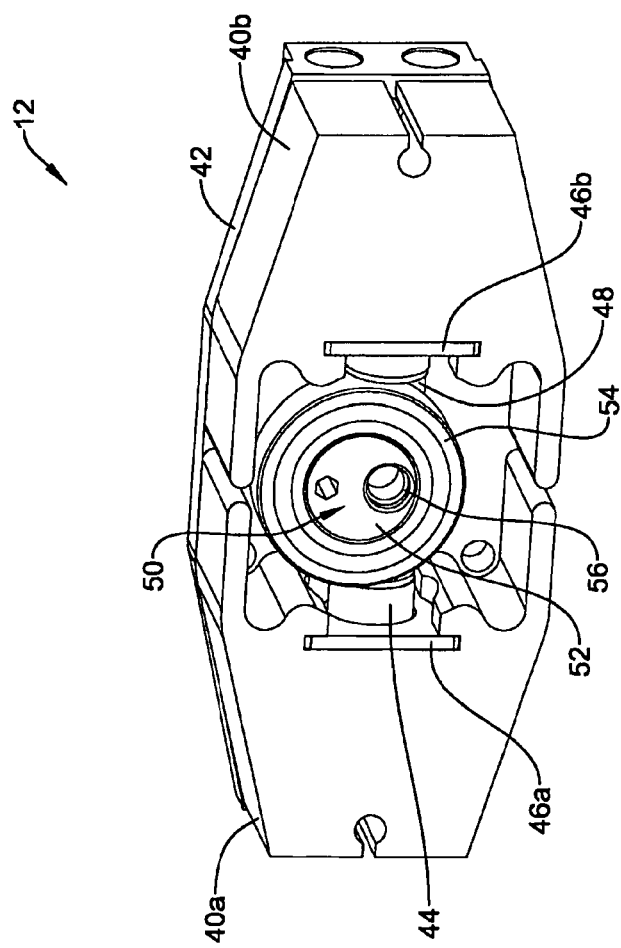
FIG. 3 is a view of a pump of the pump assembly of FIG. 1 illustrating the eccentric drive means of the pump.

FIG. 3 shows pump 12 in an assembled state. As shown in FIG. 3, pump 12 may include a first housing block 40a, a second housing block 40b, and a manifold 42. A piston 44 may extend between first housing block 40a and second housing block 40b. Piston 44 may extend through supports 46a and 46b, positioning piston 44 within piston bores of first housing block 40a and second housing block 40b.

An eccentric drive means 50 may be used to effectuate reciprocating movement of piston 44 within pump 12. The eccentric drive means 50 may include a cam 52 surrounded by a bearing 54. Cam 52 may be a cylindrical member with an offset opening 56 into which a drive shaft fits. For instance, first drive shaft 24 or second drive shaft 34 may extend into or through opening 56 of cam 52 in order to secure cam 52 to drive shaft 24 or 34.

The opening 56 of cam 52 is not centered on the central axis of cam 52. Thus, as drive shaft 24, 34 rotates cam 52, the outer periphery of cam 52 does not remain stationary. As cam 52 and bearing 54 are disposed in the recess 48 of piston 44, rotation of cam 52 results in reciprocating motion of piston 44. Thus, one revolution of drive shaft 24, 34 rotates cam 52 one revolution, which in turn results in one stroke of piston 44. A stroke of piston 44 is defined as a single back-and-forth cycle of the piston in which piston 44 travels from its furthest extent in a first direction (e.g., toward the first housing block 40a) to its furthest extent in the opposite direction (e.g., toward the second housing block 40b) and back to its furthest extent in the first direction.

The volume of fluid output by pump 12 during one stroke of piston 44 is considered the displacement of the pump 12. The displacement of pump 12 is a function of the diameter of piston 44 and the stroke length (e.g., longitudinal movement) of piston 44. Thus, in some embodiments the displacement of pump 12 may be changed by changing the diameter of piston 44 and/or the stroke length of piston 44. In some embodiments, a sleeve may be placed in the piston bore to accommodate a piston having a smaller diameter. Additionally and/or alternatively, in some embodiments cam 52 may be substituted with another cam having a different eccentricity, such as the opening of the cam being located at a different radial position from the center axis of the cam.

Figure 4:
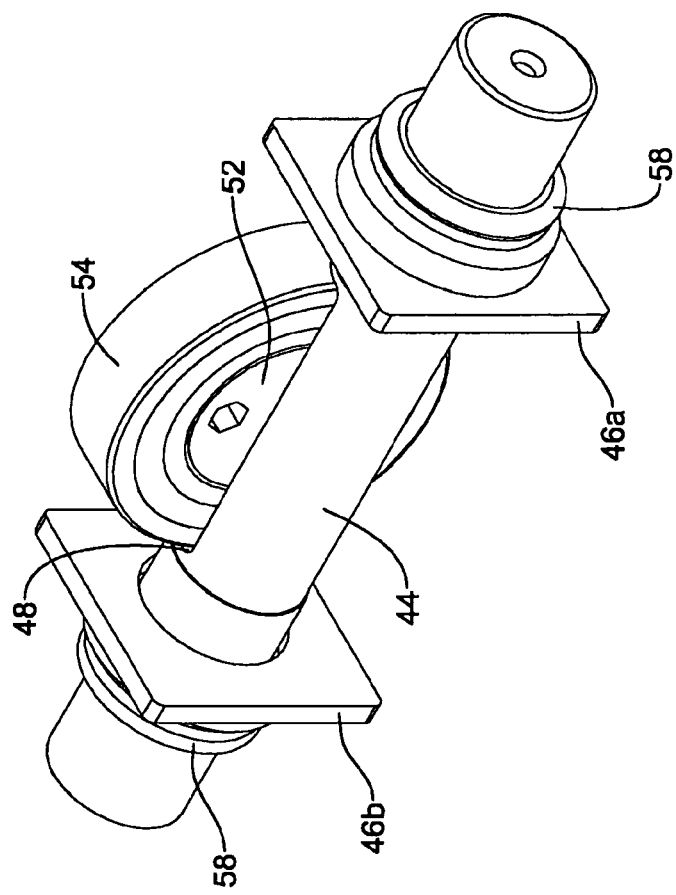
FIG. 4 is a view of the interaction of the eccentric drive means with the electric motor and the piston of the pump of the pump assembly of FIG. 1.

FIG. 4 more clearly shows the relationship between cam 52, bearing 54 and the recess 48 of piston 44. Additionally, the end portions of piston 44 are shown extending through supports 46a, 46b, with seals 58 positioned around piston 44 to prevent fluid from leaking past supports 46a, 46b. The outer periphery of bearing 54 may be in contact with the recess 48 of piston 44, and cam 52 may be positioned in the central opening of bearing 54. Thus, bearing 54 may surround cam 52.

Figure 5:
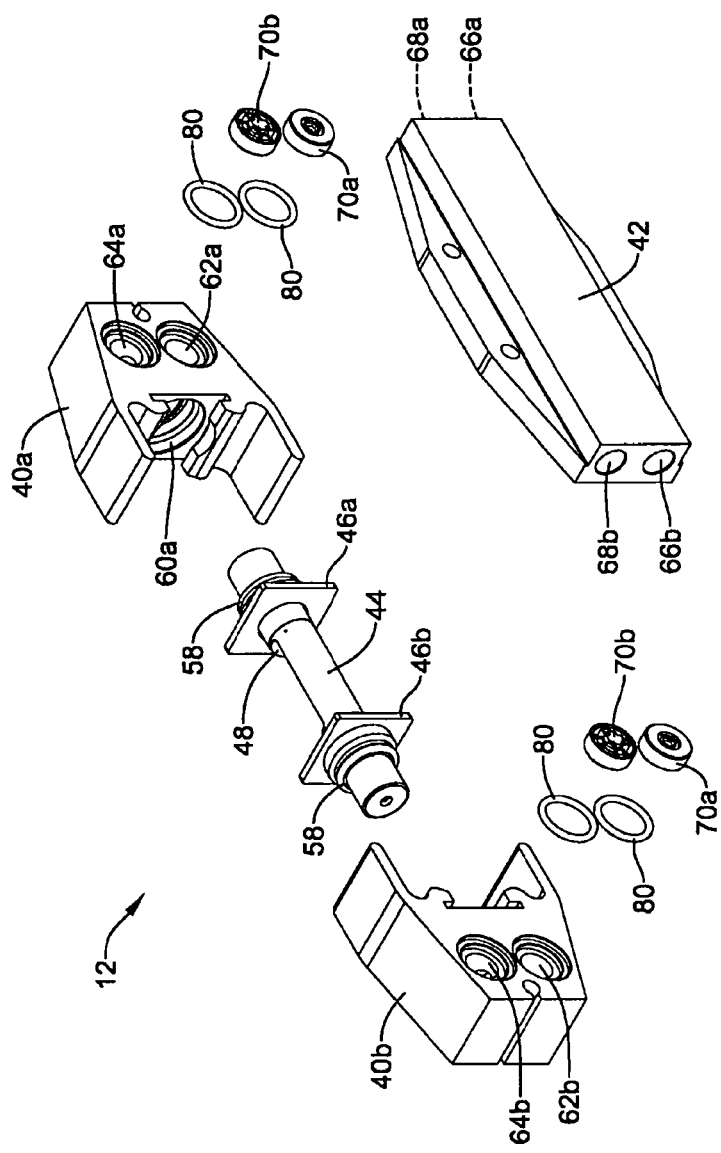
FIG. 5 is an exploded view of a pump of the pump assembly of FIG. 1.

FIG. 5 is an exploded view showing components of pump 12. As described above, pump 12 includes a first housing block 40a, a second housing block 40b, a piston 44 and a manifold 42. Additional internal components are shown in FIG. 5. Pump 12 may include a pair of check valves 70 positioned in each of the housing blocks 40a, 40b. Seals 80 may be used to prevent fluid leakage past the interface between valves 70 and housing blocks 40a, 40b.

As shown, the first housing block 40a may include a first check valve 70a allowing one directional fluid flow into the interior of first housing block 40a, and a second check valve 70b allowing one directional fluid flow out from the interior of first housing block 40a. Similarly, the second housing block 40b may include a first check valve 70a allowing one directional fluid flow into the interior of second housing block 40b, and a second check valve 70b allowing one directional fluid flow out from the interior of second housing block 40b. The first check valve 70a may be substantially identical in configuration to the second check valve 70b, with only the orientation of the check valve reversed. In other embodiments, first check valve 70a may be of a different configuration than second check valve 70b.

A first check valve 70a of pump 12 may be disposed in an inlet valve bore 62a of first housing block 40a and a second check valve 70b of pump 12 may be disposed in an outlet valve bore 64a of first housing block 40a. Similarly, a first check valve 70a of pump 12 may be disposed in an inlet valve bore 62b of second housing block 40b and a second check valve 70b of pump 12 may be disposed in an outlet valve bore 64b of second housing block 40b.

The first housing block 40a may also include a piston bore 60a into which an end portion of piston 44 extends. Similarly, although not shown in FIG. 5, the second housing block 40b may also include a piston bore into which an opposite end portion of piston 44 extends.

Figure 8A:
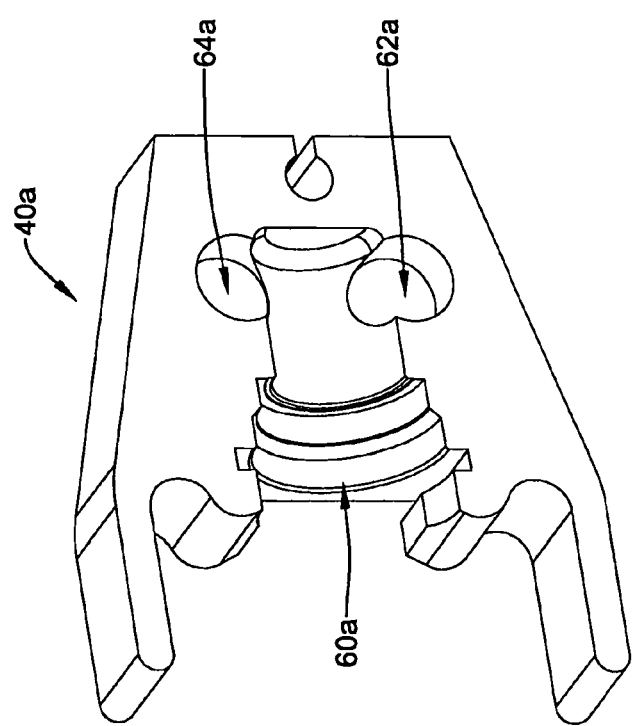
FIG. 8A is a partially cut away view of the housing block of FIG. 8.

Additional discussion of the first housing block 40a will reference FIGS. 8 and 8A. As described above, pump 12 includes a first housing block 40a and a second housing block 40b. Each of the housing blocks 40a, 40b may be of similar construction. Although discussion is directed to the first housing block 40a, it is understood that the discussion of the construction, function and/or operation of first housing block 40a may be equally applicable to the construction, function and/or operation of second housing block 40b.

As discussed above, first housing block 40a may include an inlet valve bore 62a, an outlet valve bore 64a, and a piston bore 60a. As shown in the cross-sectional view of first housing block 40a in FIG. 8A, piston bore 60a may be in fluid communication with each of the inlet valve bore 62a and the outlet valve bore 64a. Thus, it can be understood that during operation, actuation of piston 44 to the left in FIG. 8 would create a suction within piston bore 60a, drawing fluid through the inlet valve 70a positioned in inlet valve bore 62a and into the piston bore 60a. As outlet valve 70b positioned in the outlet valve bore 64a may be a one-way valve, fluid is prevented from entering the piston bore 60a through outlet valve 70b when suction is created in piston bore 60a. Actuation of the piston 44 to the right in FIG. 8 would force fluid out of piston bore 60a through outlet valve 70b positioned in outlet valve bore 64a. As inlet valve 70a positioned in inlet valve bore 62a may be a one-way valve, fluid is prevented from exiting piston bore 60a through inlet valve 70a when pressure is created in the piston bore 60a.

Referring back to FIG. 5, pump 12 may include a manifold 42 having a plurality of ports and/or bores. The manifold 42 may be fastened to first housing block 40a and second housing block 40b, enclosing valves 70 between manifold 42 and housing blocks 40a, 40b. The manifold 42 includes a first inlet bore 66a, a second inlet bore 66b, a first outlet bore 68a, and a second outlet bore 68b.

Figure 7:
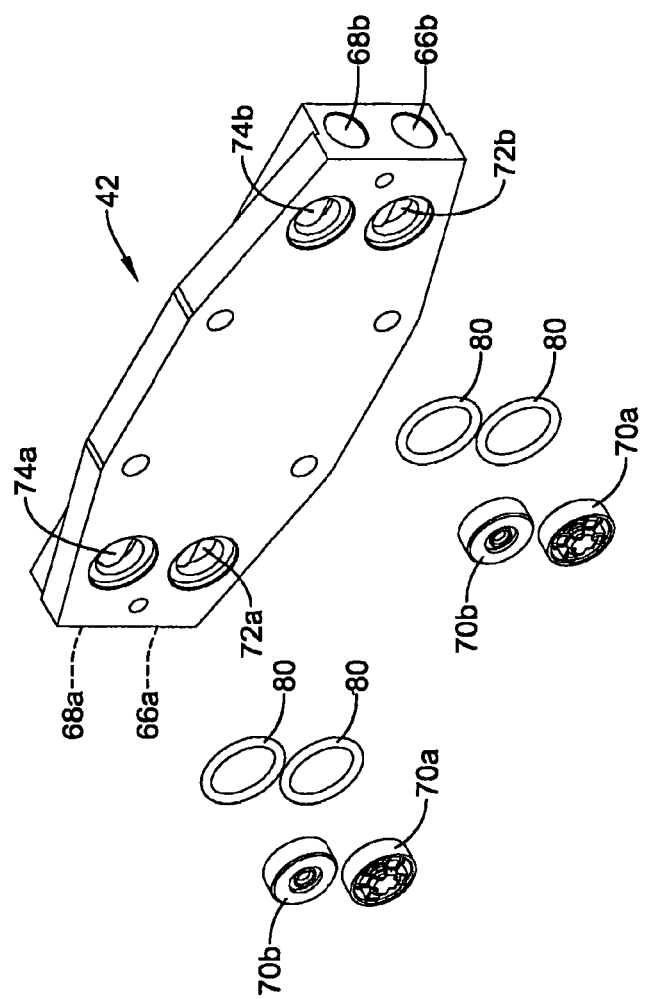
FIG. 7 is a perspective view of the manifold of a pump of the pump assembly of FIG. 1.
Figure 7A:
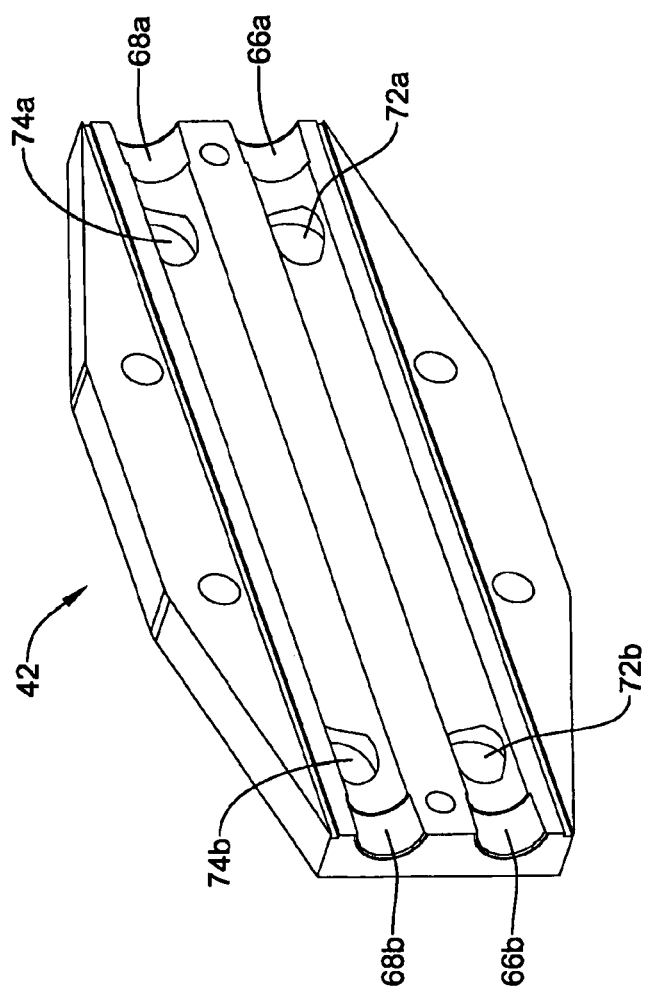
FIG. 7A is a partially cut away view of the manifold of FIG. 7.

Additional discussion of manifold 42 will reference FIGS. 7 and 7A. Manifold 42 may include a first inlet valve bore 72a, a second inlet valve bore 72b, a first outlet valve bore 74a, and a second outlet valve bore 74b. The first inlet valve bore 72a of manifold 42 may be aligned with and/or in fluid communication with first inlet valve bore 62a of first housing block 40a, and the first outlet valve bore 74a of manifold 42 may be aligned with and/or in fluid communication with first outlet valve bore 64a of first housing block 40a. Similarly, the second inlet valve bore 72b of manifold 42 may be aligned with and/or in fluid communication with the second inlet valve bore 62b of second housing block 40b, and the second outlet valve bore 74b of manifold 42 may be aligned with and/or in fluid communication with the second outlet valve bore 64b of second housing block 40b.

Manifold 42 may also include one or more inlet bores and/or one or more outlet bores. Manifold 42 is shown as including a first inlet bore 66a extending from a first inlet port, a second inlet bore 66b extending from a second inlet port, a first outlet bore 68a extending from a first outlet port, and a second outlet bore 68b extending from a second outlet port. The first inlet bore 66a may be in fluid communication with first inlet valve bore 72a, and the first outlet bore 68a may be in fluid communication with first outlet valve bore 74a. Similarly, the second inlet bore 66b may be in fluid communication with second inlet valve bore 72b, and the second outlet bore 68b may be in fluid communication with second outlet valve bore 74b.

Figure 7B:
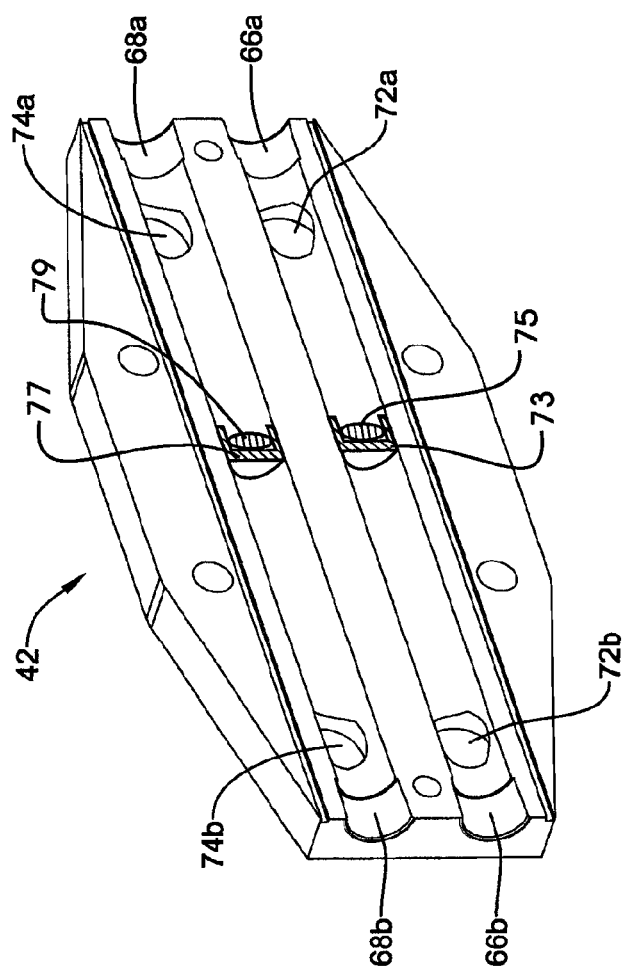
FIG. 7B illustrates a partially cut away view of an alternative embodiment manifold similar to the manifold of FIG. 7.

As shown in FIG. 7A, in some embodiments the first inlet bore 66a may be in fluid communication with second inlet bore 66b, and/or the first outlet bore 68a may be in fluid communication with second outlet bore 68b. In other embodiments, such as illustrated in FIG. 7B, the first inlet bore 66a may not be in fluid communication with second inlet bore 66b, and/or the first outlet bore 68a may not be in fluid communication with second outlet bore 68b. In this embodiment, a pair of hat shaped plugs 73, 77 are illustrated with slightly flattened compression balls 75, 79 that are deformed in place and which ensure a liquid seal between the plugs 73, 77 and bores 66, 68. The use of plugs of any nature or composition permits a standard extrusion to be selectively plugged and blocked as may be desired for a particular application. As may then be understood, in some additional embodiments, manifold 42 may include only one inlet bore in fluid communication with both first inlet valve bore 72a and second inlet valve bore 72b, and/or manifold 42 may include only one outlet bore in fluid communication with both first outlet valve bore 74a and second outlet valve bore 74b.

A fluid may flow into inlet bore 66a, 66b from a fluid source, such as a fluid container, and into inlet valve bores 72a, 72b. During the suction portion of the stroke of piston 44, the fluid may be drawn through inlet valve 70a of pump 12 into piston bore 60a, 60b. During the pressure portion of the stroke of piston 44, the fluid may be expelled from piston bore 60a, 60b through outlet valve 70b of pump 40, into outlet valve bores 74a, 74b and out of pump 12 through outlet bore 68a, 68b. It is noted that when pump 12 is a double-acting plunger pump, suction will be experienced in piston bore 60a of first housing block 40a as pressure is experienced in piston bore 60b of second housing block 40b. Likewise, suction will be experienced in piston bore 60b of the second housing block 40b as pressure is experienced in piston bore 60a of first housing block 40a.

Fittings, such as hose fittings, may be coupled to the inlet and outlet bores of the manifold as desired to couple fluid inlet and fluid outlet lines (e.g., hoses, pipes, etc.) to pump 12. Such fittings may include elbows, tees, reducers, couplers, caps, ball valves, stopcock valves, or the like.

Figure 6:
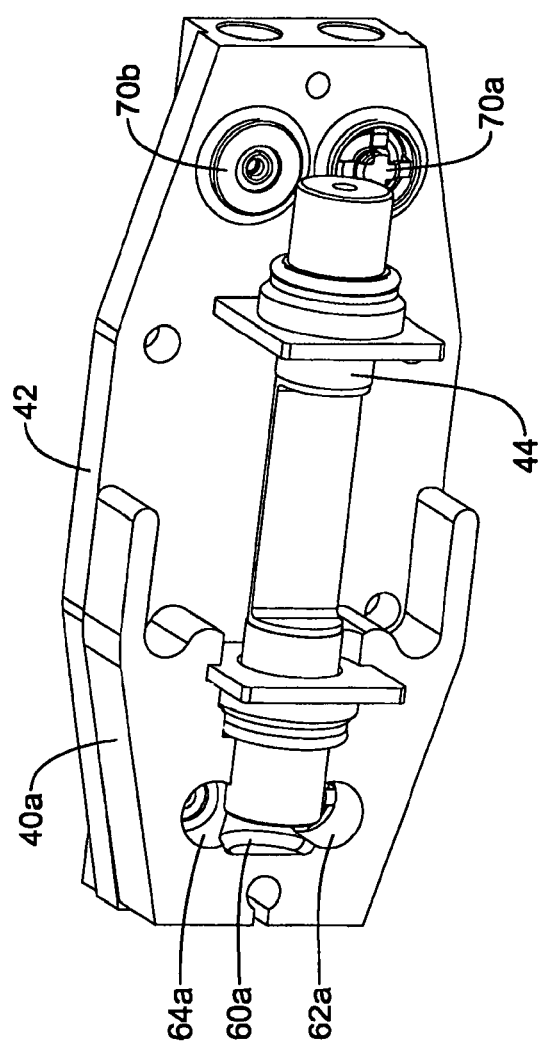
FIG. 6 is a partially cut away view of a pump of the pump assembly of FIG. 1.

FIG. 6 shows a cut away of pump 12 with second housing block 40b removed and first housing block 40a partially cut away, so that the interaction of piston 44 with the various components of housing block 40a and manifold 42 may more easily be understood. Inlet valve bore 62a, outlet valve bore 64a, and piston bore 60a may collectively create a cavity within first housing block 40a. During operation, piston 44 may reciprocate back-and-forth in piston bore 60a, changing the volume of the cavity of first housing block 40a. Depending on the portion of the stroke cycle of piston 44, fluid may either be drawn into the cavity of first housing block 40a or expelled from the cavity of first housing block 40a, creating a fluid pumping action through pump 12. Although not shown in FIG. 6, the interaction of piston 44 with the bores of housing block 40b would be similar.

Additional discussion of valves 70 within pump 12 will be discussed with reference to FIGS. 9, 9A, 9B and 9C. Valve 70 is shown in an exploded view in FIG. 9. Valve 70 includes a housing 82, a poppet 84, a spring 86, and a retainer 88.

Figure 9:
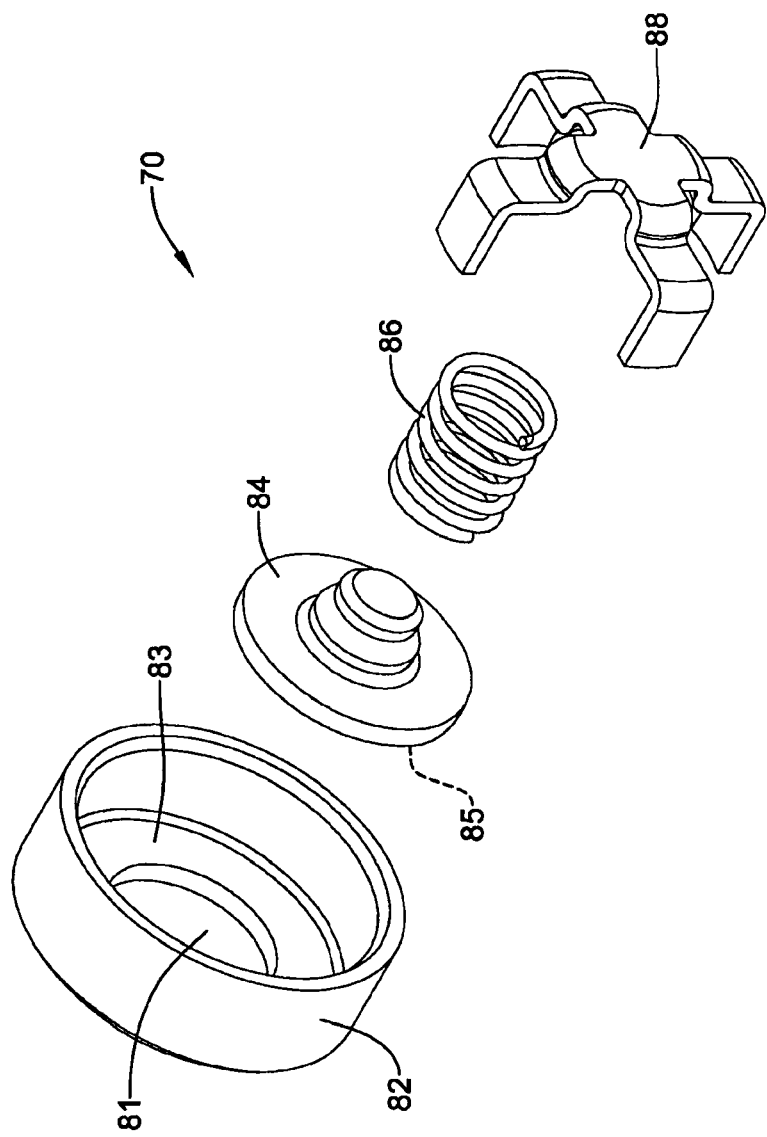
FIG. 9 is an exploded view of a valve assembly of a pump of the pump assembly of FIG. 1.
Figure 9A:
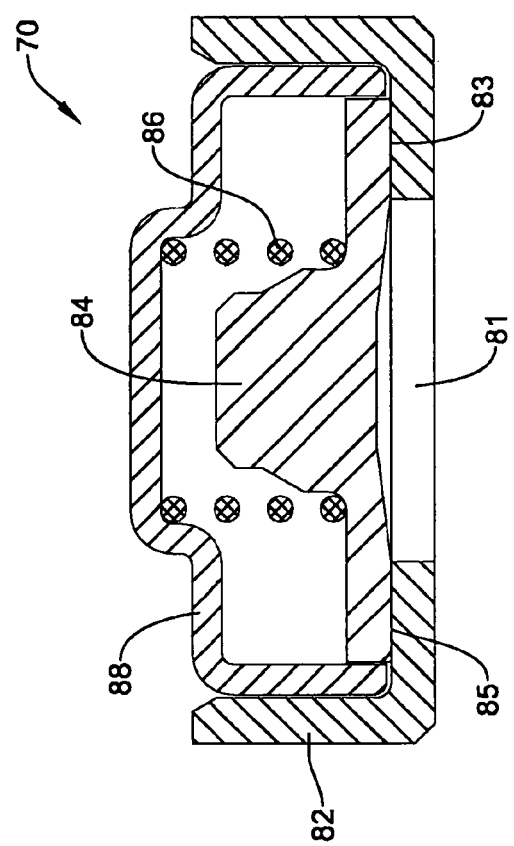
FIG. 9A is a cross sectional view of the valve assembly of FIG. 9 in an assembled configuration.

As shown in FIG. 9A, when assembled the surface 83 of housing 82 faces the surface 85 of poppet 84. Spring 86, which is located on the other side of poppet 84, is compressed between retainer 88 and poppet 84. The compressive forces of spring 86 urge the surface 85 of poppet 84 into contact with the surface 83 of housing 82. Retainer 88 holds spring 86 in place.

Valve 70 opens and closes depending on the pressure differential across poppet 84 of valve 70. During operation, pressurized fluid passes through opening 81 of housing 82 into contact with poppet 84. Forces generated by the pressurized fluid on poppet 84 oppose the forces generated by spring 86. While the forces generated by spring 86 remain greater than the forces generated by the pressured fluid, the surface 85 of poppet 84 remains in contact with the surface 83 of housing 82.

Contact between poppet 84 and housing 82 prevents fluid to pass through valve 70. As the forces generated by pressurized fluid on poppet 84 exceed forces generated by spring 86, poppet 84 moves away or lifts off of housing 82. Thus, a gap is formed between the surface 85 of poppet 84 and the surface 83 of housing 82. Fluid is then allowed to pass through the gap between poppet 84 and housing 82 in order to pass through valve 70. When the forces of the pressurized fluid are again less than the forces generated by spring 86, poppet 84 moves into contact with housing 82, eliminating the gap between the components and thus stopping the flow of fluid through the valve 70.

Alternatively, during operation a vacuum may be created on the spring-side of poppet 84. When the vacuum exceeds a threshold level, poppet 84 is pulled away from or lifts off of the housing 82, forming a gap between the surface 85 of poppet 84 and the surface 83 of housing 82. Fluid is then drawn through the gap between poppet 84 and housing 82 and across valve 70.

Figure 9B:
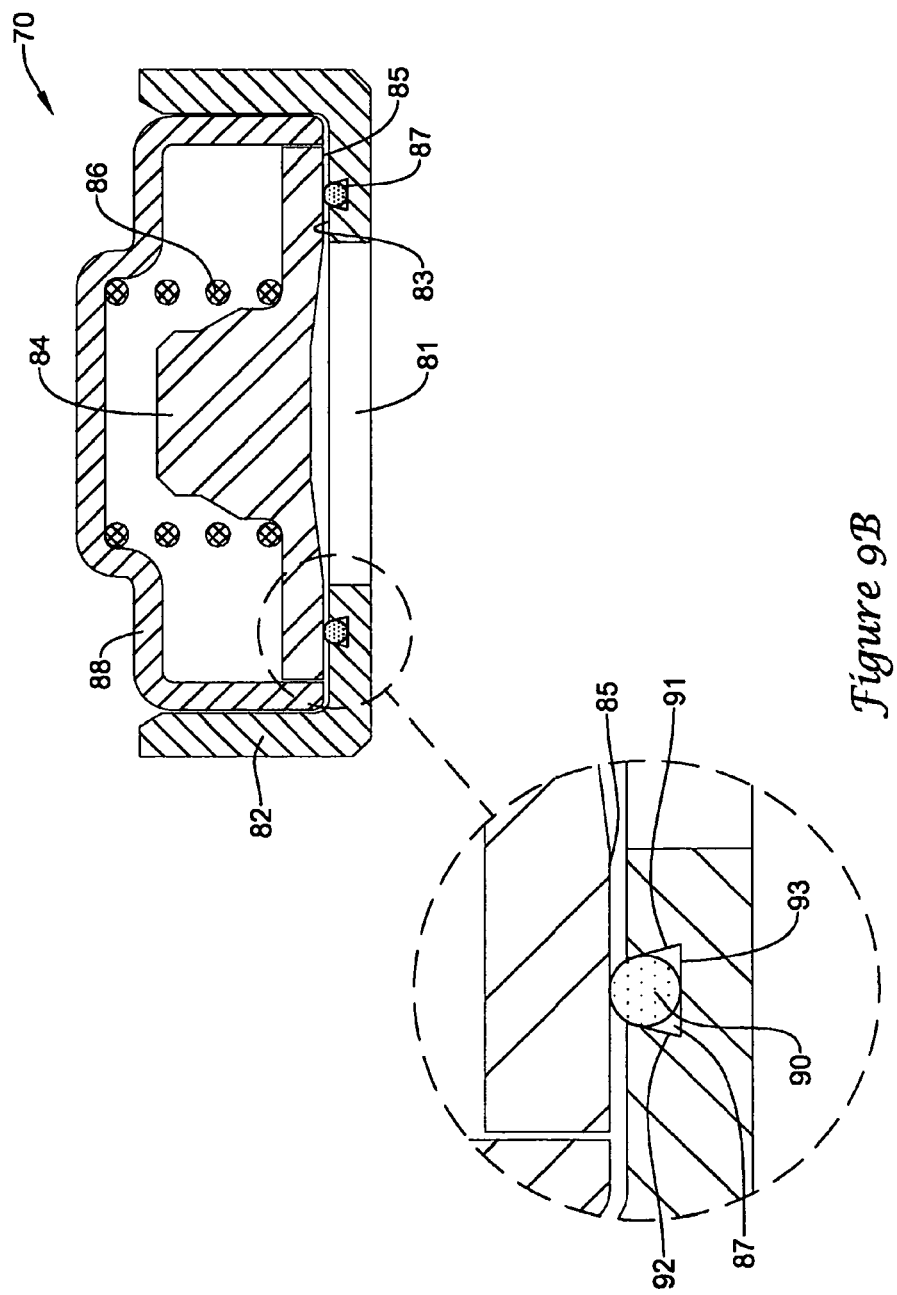
FIG. 9B is a cross sectional view of a valve assembly similar to the valve assembly shown in FIG. 9A.

FIG. 9B shows an alternate embodiment of valve 70. As shown in FIG. 9B, an elastomeric member 90 (e.g., an O-ring) may be placed between housing 82 and poppet 84, forming a seal between the two components of valve 70. As shown in FIG. 9B, housing 82 may include a channel 87 formed in housing 82 configured to retain elastomeric member 90. The channel 87 may include a bottom surface 93, and two side surfaces 91 and 92 extending from bottom surface 93 to surface 83 of housing 82. In some embodiments one or both of the two side surfaces 91, 92 may be formed at an oblique angle to bottom surface 93. In some embodiments, the angle between bottom surface 93 of channel 87 and each of the side surfaces 91, 92 of channel 87 may be an acute angle, for example. The side surfaces 91, 92 may taper toward one another as side surfaces 91, 92 approach the surface 83 of housing 82, thus narrowing channel 87 toward the surface 83 of housing 82.

An elastomeric member 90 may be placed in channel 87 through the opening of the channel 87 at the surface 83 of housing 82. In some embodiments, the distance across the opening of channel 87 between the first side surface 91 and the second side surface 92 may be less than the diameter of elastomeric member 90. Elastomeric member 90 may be slightly compressed to fit through the opening at the surface 83 of housing 82. However, once placed in channel 87, the elastomeric member 90 may at least partially expand such that elastomeric member 90 may be sufficiently retained in channel 87. The relative sizes of elastomeric member 90 and the distance across the opening of channel 87 between the first side surface 91 and the second side surface 92 may inhibit elastomeric member 90 from coming out of channel 87.

Figure 9C:
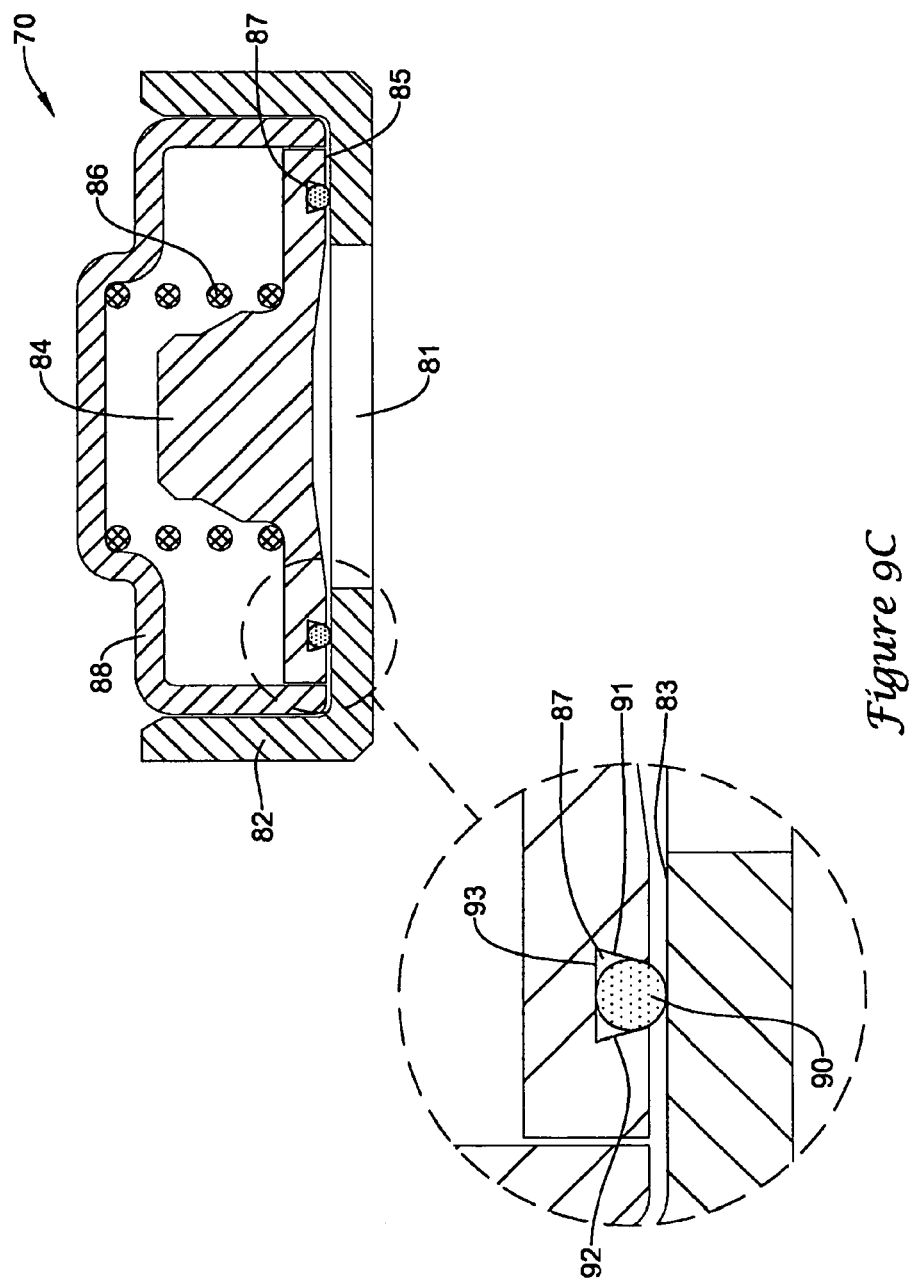
FIG. 9C is a cross sectional view of a valve assembly similar to the valve assembly shown in FIG. 9A.

FIG. 9C shows another alternate embodiment of valve 70. As shown in FIG. 9C, an elastomeric member 90 (e.g., an O-ring) may be placed between housing 82 and poppet 84, forming a seal between the two components of valve 70. As shown in FIG. 9C, poppet 84 may include a channel 87 formed in poppet 84 configured to retain elastomeric member 90. The channel 87 may include a bottom surface 93, and two side surfaces 91 and 92 extending from bottom surface 93 to surface 85 of poppet 84. In some embodiments one or both of the two side surfaces 91, 92 may be formed at an oblique angle to bottom surface 93. In some embodiments, the angle between the bottom surface 93 of channel 87 and each of the side surfaces 91, 92 of channel 87 may be an acute angle, for example. The side surfaces 91, 92 may taper toward one another as side surfaces 91, 92 approach surface 85 of poppet 84, thus narrowing the channel 87 toward the surface 85 of poppet 84.

An elastomeric member 90 may be placed in channel 87 through the opening of channel 87 at the surface 85 of poppet 84. In some embodiments, the distance across the opening of channel 87 between the first side surface 91 and the second side surface 92 may be less than the diameter of elastomeric member 90. Elastomeric member 90 may be slightly compressed to fit through the opening at the surface 85 of poppet 84. However, once placed in channel 87, elastomeric member 90 may at least partially expand such that elastomeric member 90 may be sufficiently retained in channel 87. The relative sizes of elastomeric member 90 and the distance across the opening of the channel 87 between first side surface 91 and second side surface 92 may inhibit elastomeric member 90 from coming out of channel 87.

Figure 10:
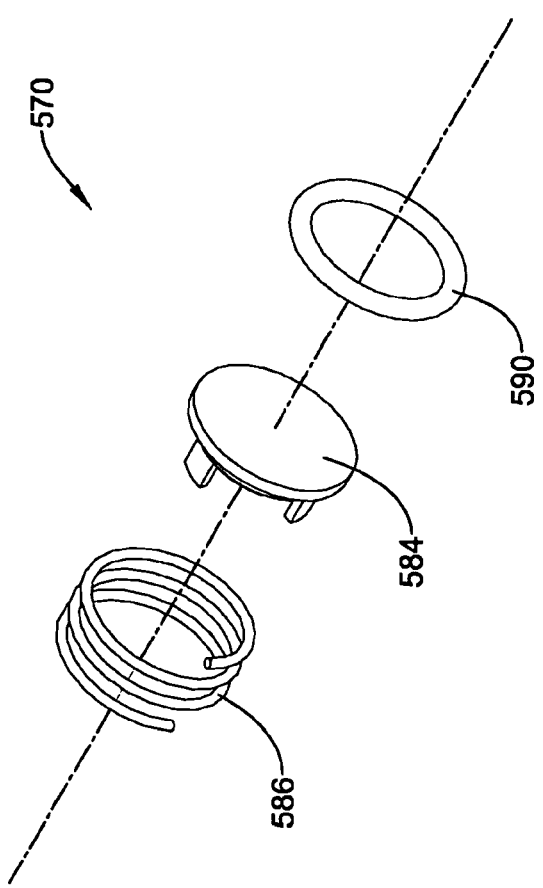
FIG. 10 is an exploded view of another valve assembly which may be used in the pump assembly of FIG. 1.

FIG. 10 is an exploded view of another valve 570 which may be used in a pump 12. The valve 570 may include a poppet 584, a spring 586 and an elastomeric member 590 (e.g., O-ring).

Figure 10A:
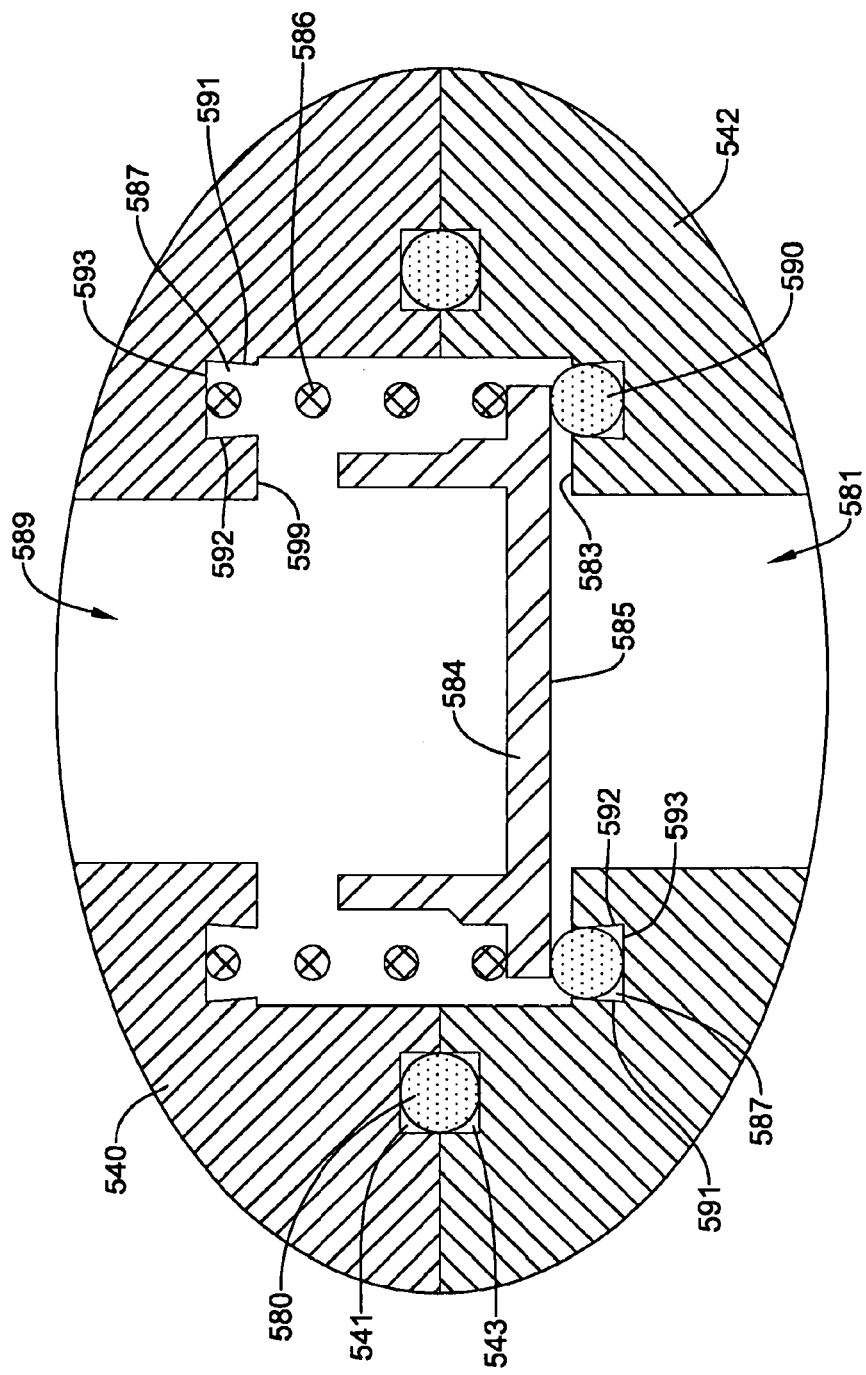
FIG. 10A is a cross sectional view of the valve assembly of FIG. 10 in an assembled configuration.

FIG. 10A shows valve 570 assembled within a pump housing. The valve 570 may be positioned between a fluid passageway 589 of a first housing portion 540 (e.g., the housing block 40) and fluid passageway 581 of a second housing portion 542 (e.g., the manifold 42). An elastomeric member 580 (e.g., O-ring) may be placed between the first housing portion 540 and the second housing portion 542 to provide a fluid tight seal at the interface between first housing portion 540 and second housing portion 542. For example, elastomeric member 580 may be positioned in a channel 541 of first housing portion 540 and/or in a channel 543 of second housing portion 542. The channel 541 of first housing portion 540 may be aligned with channel 543 of second housing portion 542, sandwiching the elastomeric member 580 therebetween.

As shown in FIG. 10A, in some embodiments the first housing portion 540 and/or the second housing portion 542 may include a channel 587 for receiving a component of valve 570. For example, spring 586 may be positioned in channel 587 of first housing portion 540 and/or elastomeric member 590 may be positioned in channel 587 of second housing portion 542. It is noted that if the flow of fluid is desired in the opposite direction, then the components of valve 570 would be reversed, such that spring 586 may be positioned in channel 587 of the second housing portion 542 and elastomeric member 590 may be positioned in the channel 587 of first housing portion 540.

The channel 587 formed in first housing portion 540 may include a bottom surface 593 and two side surfaces 591 and 592 extending from the bottom surface 593 to the surface 599 of first housing portion 540. In some embodiments one or both of the two side surfaces 591, 592 may be formed at an oblique angle to the bottom surface 593. In some embodiments, the angle between the bottom surface 593 of channel 587 and each of the side surfaces 591, 592 of channel 587 may be an acute angle, for example. The side surfaces 591, 592 may taper toward one another as the side surfaces 591, 592 approach surface 599 of first housing portion 540, thus narrowing channel 587 toward the surface 599 of first housing portion 540.

As shown in FIG. 10A, in some embodiments the channel 587 of second housing portion 542 may have a similar shape. For instance, channel 587 formed in second housing portion 542 may include a bottom surface 593 and two side surfaces 591 and 592 extending from the bottom surface 593 to the surface 583 of second housing portion 542. In some embodiments one or both of the two side surfaces 591, 592 may be formed at an oblique angle to bottom surface 593. In some embodiments, the angle between bottom surface 593 of channel 587 and each of the side surfaces 591, 592 of channel 587 may be an acute angle, for example. The side surfaces 591, 592 may taper toward one another as side surfaces 591, 592 approach surface 583 of second housing portion 542, thus narrowing channel 587 toward the surface 583 of second housing portion 542.

The elastomeric member 590 may be placed in channel 587 of the second housing portion 542 through the opening of channel 587 at the surface 583 of second housing portion 542. In some embodiments, the distance across the opening of channel 587 between the first side surface 591 and the second side surface 592 may be less than the diameter of elastomeric member 590. The elastomeric member 590 may be slightly compressed to fit through the opening at the surface 583 of second housing portion 542. However, once placed in channel 587, elastomeric member 590 may at least partially expand such that elastomeric member 590 may be sufficiently retained in channel 587. The relative sizes of elastomeric member 590 and the distance across the opening of channel 587 between the first side surface 591 and the second side surface 592 may inhibit elastomeric member 590 from coming out of channel 587.

The spring 586 of valve 570 may be retained in channel 587 of first housing portion 540 and push against poppet 584 when compressed. Spring 586 may be compressed when the first housing portion 540 is positioned adjacent the second housing portion 542. Compressive forces of spring 586 urge the surface 585 of poppet 584 toward the surface 583 of second housing portion 542. When valve 570 is closed, poppet 584 may contact elastomeric member 590 positioned in channel 587 of the second housing portion 542, creating a fluid tight seal which prevents fluid from passing through valve 570. When the valve is open, poppet 584 may not contact elastomeric member 590, allowing fluid to flow from passageway 581 of second housing portion 542, through valve 570, and into passageway 589 of first housing portion 540.

The valve 570 opens and closes depending on the pressure differential across poppet 584 of valve 570. During operation, pressurized fluid passes through passageway 581 of the second housing portion 542 into contact with poppet 584. Forces generated by the pressurized fluid on poppet 584 oppose the forces generated by spring 586. While the forces generated by spring 586 remain greater than the forces generated by the pressurized fluid, the surface 585 of poppet 584 remains in contact with elastomeric member 590. As the forces generated by the pressurized fluid on poppet 584 exceed the forces generated by spring 586, poppet 584 moves away or lifts off second housing portion 542, forming a gap between surface 585 of poppet 584 and the elastomeric member 590. Fluid is then allowed to pass through the gap between poppet 584 and the second housing portion 542 in order to pass through valve 570. When the forces of the pressurized fluid are again less than the forces generated by spring 586, poppet 584 moves into contact with elastomeric member 590, eliminating the gap between the components and thus stopping the flow of fluid through valve 570.

Alternatively, during operation a vacuum may be created in passageway 589 of first housing portion 540. When the vacuum exceeds a threshold level, poppet 584 is pulled away from or lifts off of elastomeric member 590, forming a gap between surface 585 of poppet 584 and elastomeric member 590. Fluid is then drawn through the gap between poppet 584 and the second housing portion 542 from passageway 581 of the second housing portion 542 to passageway 589 of first housing portion 540.

Figure 11:
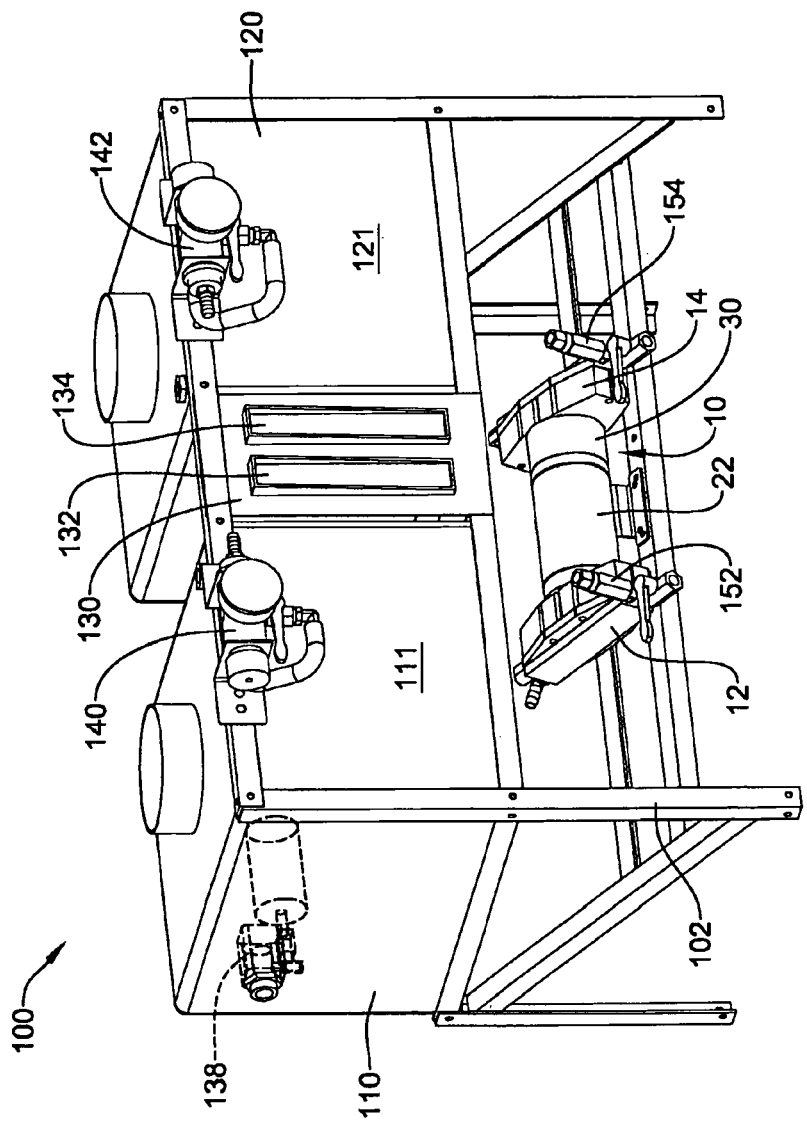
FIGS. 11 and 12 are perspective views of an exemplary pumping system including the pumping assembly of FIG. 1.
Figure 12:
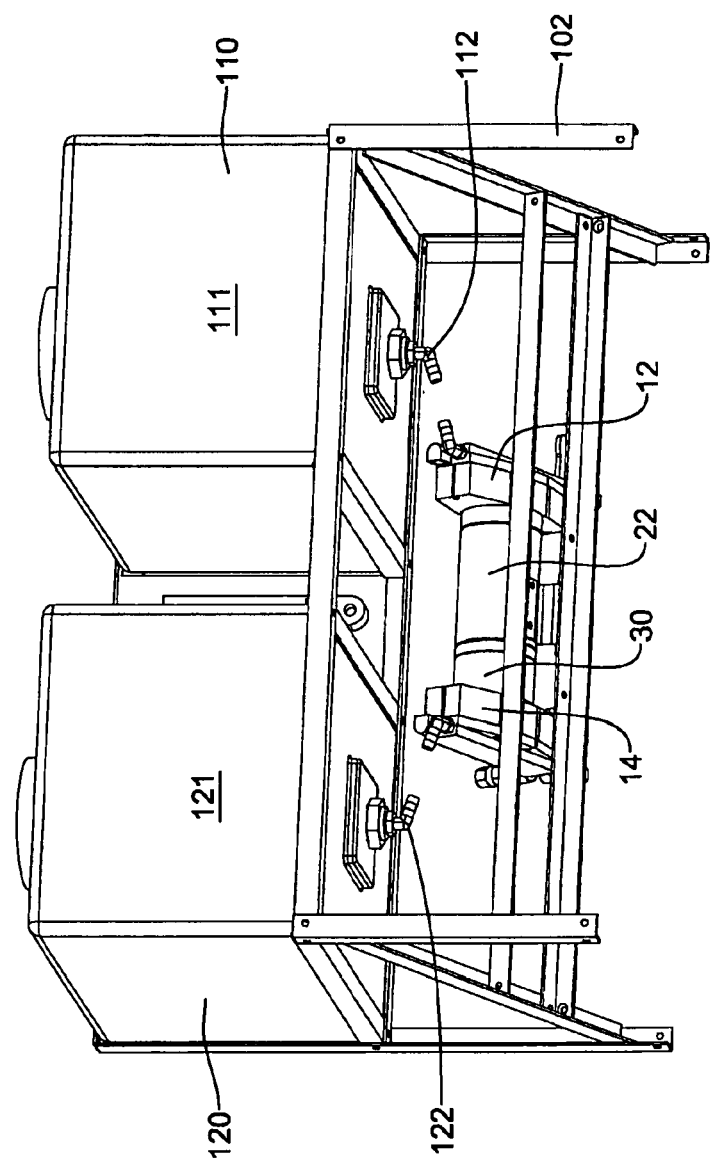

FIGS. 11 and 12 illustrate an exemplary pumping system 100 utilizing the pump assembly 10 as described above. Pumping system 100 may include a first fluid container or reservoir 110 for holding a first fluid 111, and pumping system 100 may include a second fluid container or reservoir 120 for holding a second fluid 121. The first fluid container 110 and/or the second fluid container 120 may be mounted onto a frame 102 of pumping system 100. Additionally, pump assembly 10 may be mounted onto frame 102.

In some embodiments, the first fluid 111 may be water and the second fluid 111 may be a chemical which may be mixed with the water in order to dilute the chemical in the water. In other embodiments, the first fluid 111 may be a first chemical and the second fluid 111 may be a second chemical which may be mixed with the first chemical.

The first fluid container 110 may include a fluid outlet 112, which may extend from the bottom of the first fluid container 110, or from another area of the first fluid container 110. Similarly, the second fluid container 120 may include a fluid outlet 122, which may extend from the bottom of the second fluid container 120, or from another area of the second fluid container 120.

Additionally, in some embodiments, the first fluid container 110 may include a flow valve 138, such as a float valve, which controls the level of first fluid 111 in first container 110. As the fluid level in first container 110 is lowered sufficiently, flow valve 138 is triggered, allowing an additional quantity of first fluid 111 to enter the first fluid container 110 until a desired level of first fluid 111 is attained. Thus, flow valve 138 may ensure that a sufficient quantity of first fluid 111 is maintained in first fluid container 110 during operation. Similarly, in some embodiments a flow valve may be used to ensure that a sufficient quantity of second fluid 121 is maintained in the second fluid container 120 during operation.

A first one-way check valve 152 may be placed on the fluid outlet side of first pump 12 and a second one-way check valve 154 may be placed on the fluid outlet side of second pump 14. The one-way check valves 152, 154 may prevent fluid from reentering pumps 12, 14 from the outlet side of the pump 12, 14 after being expelled from the pump 12, 14 during operation.

In addition to first fluid container 110, second fluid container 120 and pump assembly 10, the pumping system 100 may include one or more additional components. For example, pumping system 100 may include a flow meter 130 for indicating fluid flow through first pump 12 and/or second pump 14 of pump assembly 10. For instance, flow meter 130 may include a first gauge 132 to measure the flow of first fluid 111 through pumping system 100, and flow meter 130 may include a second gauge 134 to measure the flow of second fluid 121 through pumping system 100. Additionally, pumping system 100 may include a first regulator 140 and a second regulator 142. The first regulator 140 may control fluid flow and/or pressure of first fluid 111 through pumping system 100, and second regulator 142 may control fluid flow and/or pressure of second fluid 121 through pumping system 100. The first and second regulators 140, 142 of pumping system 100 are shown as pressure regulators.

It is noted that hoses, pipes and other fluid conduits have been removed from pumping system 100 shown in FIG. 11 in order to preserve the clarity of the figure. One of skill in the art, in view of the schematic depiction of pumping system 100, would appreciate that various components of pumping system 100 may be fluidly coupled together using hoses, pipes and/or fluid conduits extending between a fluid outlet of a first component to a fluid inlet of a second component.

Figure 13:
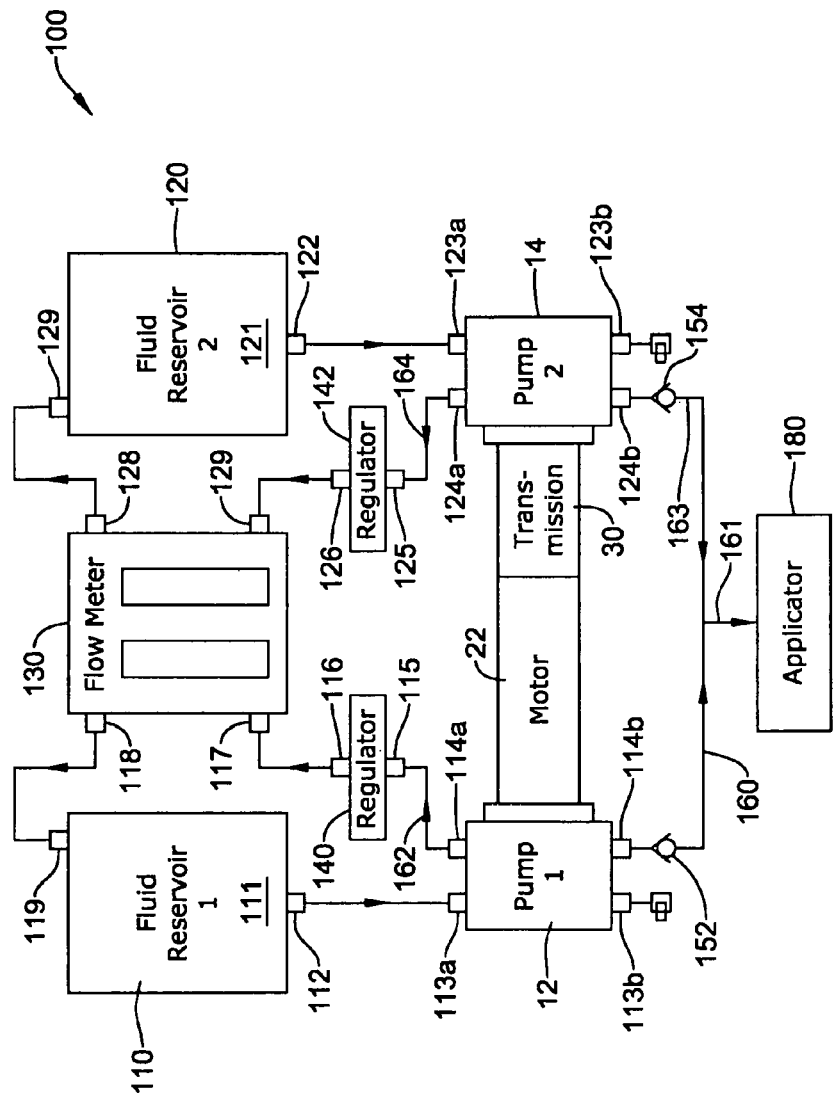
FIG. 13 is a schematic diagram of the pumping system of FIGS. 1 and 12.

FIG. 13 is a schematic depiction of the pumping system 100 of FIGS. 11 and 12 showing various components of the pumping system 100 fluidly connected. In describing the various components as being fluidly connected, what is meant is that hoses, pipes or other fluid conduits may be used to place the various components in fluid communication with one or more other components of pumping system 100. Shown in FIG. 13, outlet 112 of first fluid container 110 may be fluidly connected to first inlet 113a of first pump 12. The second outlet 114b of first pump 12 may be fluidly connected with a fluid applicator 180, such as a spray gun, nozzle, boom, or the like. The first outlet 114a of first pump 12 may be fluidly connected to the inlet 115 of regulator 140, and the outlet 116 of regulator 140 may be fluidly connected to the inlet 117 of flow meter 130. The outlet 118 of flow meter 130 may be fluidly connected to an inlet 119 of first fluid container 110.

Thus, during operation pump 12 will draw first fluid 111 from first fluid container 110 into pump 12. The pump 12 will pump first fluid 111 out of pump 12 either through the first outlet 114a or the second outlet 114b of pump 12. The pressure regulator 140 may control which of the first outlet 114a or the second outlet 114b of pump 12 the first fluid 111 is pumped through.

The pressure regulator 140, which may be an adjustable pressure regulator or a pre-set or non-adjustable pressure regulator, may be set to a threshold pressure. At pressures below the threshold pressure, pressure regulator 140 does not allow fluid flow through from inlet 115 of pressure regulator 140 to the outlet 116 of pressure regulator 140. Thus, at pressures below the threshold pressure, first fluid 111 is expelled from the second outlet 114b of pump 12, across check valve 152, into first fluid flow line 160, into fluid mix line or proportioned output 161, and to applicator 180. At pressures above the threshold pressure of pressure regulator 140, the first fluid 111 is expelled from the first outlet 114a of pump 12 through the first fluid bypass line 162. The first fluid bypass line 162 routes first fluid 111 out the first outlet 114a of pump 12, through pressure regulator 140, through flow meter 130 and back to first fluid container 110. It can be seen that when no fluid flow is experienced or called for at applicator 180, first fluid 111 pumped through first pump 12 is routed through the first fluid bypass line 162 and back to first fluid container 110. However, when fluid flow is experienced or called for at applicator 180, the first fluid 111 pumped through first pump 12 is routed through the first fluid line 160 to applicator 180. When no fluid flow is allowed across applicator 180, the pressure at the outlet of first pump 12 will increase until the pressure reaches the threshold pressure set at pressure regulator 140, at which time pressure regulator 140 will open, allowing bypass flow of first fluid 111 pumped through the first pump 12 to be recirculated back to first fluid container 110.

Bypass flow of the first fluid 111 back to the first fluid container 110 may also pass through flow meter 130. The flow meter 130 may provide a visual indication of the flow rate of first fluid 111 being pumped through first pump 12.

Furthermore, outlet 122 of second fluid container 120 may be fluidly connected to the first inlet 123a of second pump 14. The second outlet 124b of second pump 14 may be fluidly connected with fluid applicator 180. The first outlet 124a of second pump 14 may be fluidly connected to inlet 125 of regulator 142, and the outlet 126 of regulator 142 may be fluidly connected to the inlet 127 of flow meter 130. The outlet 128 of flow meter 130 may be fluidly connected to an inlet 129 of second fluid container 120.

Thus, during operation pump 14 will draw the second fluid 121 from second fluid container 120 into pump 14. The pump 14 will pump second fluid 121 out of pump 14 either through the first outlet 124a or the second outlet 124b of pump 14. The pressure regulator 142 may control which of the first outlet 124a or the second outlet 124b of pump 14 the second fluid 121 is pumped through. Pressure regulator 142, which may be an adjustable pressure regulator or a pre-set or non-adjustable pressure regulator, may be set to a threshold pressure. At pressures below the threshold pressure, pressure regulator 142 does not allow fluid flow through from the inlet 125 of pressure regulator 142 to the outlet 126 of pressure regulator 142. Thus, at pressures below the threshold pressure, the second fluid 121 is expelled from the second outlet 124b of pump 14, across check valve 154, into the second fluid flow line 163, into the fluid mix line or proportioned output 161, and to applicator 180. At pressures above the threshold pressure of pressure regulator 142, the second fluid 121 is expelled from the first outlet 124a of pump 14 through the second fluid bypass line 164. The second fluid bypass line 164 routes the second fluid 121 out the first outlet 124a of pump 14, through pressure regulator 142, through flow meter 130 and back to second fluid container 120. Thus, it can be seen that when no fluid flow is experienced or called for at applicator 180, the second fluid 121 pumped through second pump 14 is routed through the second fluid bypass line 164 and back to second fluid container 120. However, when fluid flow is experienced or called for at applicator 180, the second fluid 121 pumped through second pump 14 is routed through the second fluid flow line 163 to applicator 180. When no fluid flow is allowed across applicator 180, the pressure at the outlet of second pump 14 will increase until the pressure reaches the threshold pressure set at pressure regulator 142, at which time pressure regulator 142 will open, allowing bypass flow of the second fluid 121 pumped through second pump 14 to be recirculated back to second fluid container 120.

Bypass flow of the second fluid 121 back to the second fluid container 120 may also pass through flow meter 130. The flow meter 130 may provide a visual indication of the flow rate of the second fluid 121 being pumped through second pump 14. Thus, flow meter 130 may provide a visual indication of the flow rates of both the first fluid 111 and the second fluid 121 through pumping system 100. The flow rate of first fluid 111 may be compared with the flow rate of second fluid 121 to ensure that the proper fluid mix is achieved at applicator 180 of pumping system 100. During operation, electric motor 22 of pump assembly 10 may drive each of the first pump 12 and the second pump 14. The transmission 30 may deliver rotational power to second pump 14 through second drive shaft 34 (see FIG. 2) at the same rate or at a different rate than rotational power is delivered to first pump 12 through first drive shaft 24 (see FIG. 2). Thus, first pump 12 may be driven at a first rate and second pump 14 may be driven at a second rate. In embodiments in which the displacement of each of the pumps 12 and 14 is the same, when first pump 12 is driven at a first rate and second pump is driven at a second rate different from the first rate, then the flow rate of the output of first fluid 111 from first pump 12 is different than the flow rate of the output of second fluid 121 from second pump 14.

Therefore, the first fluid 111 may be pumped to the fluid mix line or proportioned output 161 at a first rate and the second fluid 121 may be pumped to the fluid mix line or proportioned output 161 at a second rate. Depending on the relative rates in which the first and second pumps 12 and 14 are driven and/or the displacements of the first and second pumps 12 and 14, first fluid 111 may be pumped to the proportioned output 161 at a greater rate, the same rate, or a lesser rate than the second fluid 121 is pumped to proportioned output 161.

In some embodiments, the desired proportions of the first fluid 111 and/or the second fluid 121 to the proportioned output 161 are not adjustable without removing and/or replacing one or more components of pumping system 100. For example, the displacement of one or more of the first pump 12 and the second pump 14 may be altered by replacing piston 44 with a piston of a different diameter or by replacing cam 52 with a cam having a different eccentricity to alter the stroke length of piston 44. In some embodiments one or more of the first pump 12 and the second pump 14 may be substituted with a pump having a different displacement. In some embodiments the transmission 30 may be changed to provide a different ratio between the rotational speed of the input (e.g., the first drive shaft 24) and the rotational speed of the output (e.g., the second drive shaft 34) of transmission 30.

The first fluid 111 may be mixed with the second fluid 121 in the fluid mix line or proportioned output 161 prior to reaching applicator 180. As the appropriate and desired proportions of first fluid 111 and second fluid 121 are delivered to applicator 180 by pump assembly 10, the fluid mixture maintains the desired ratio of first fluid 111 to second fluid 121, relatively independently of pressure and flow rate at the output.

Additionally, first fluid 111 is only mixed with second fluid 121 as needed. Thus, a surplus of the fluid mixture is not created, reducing waste at the conclusion of a fluid application. Furthermore, the accuracy of the ratio of first fluid 111 to second fluid 121 in the fluid mixture is maintained.

Figure 14:
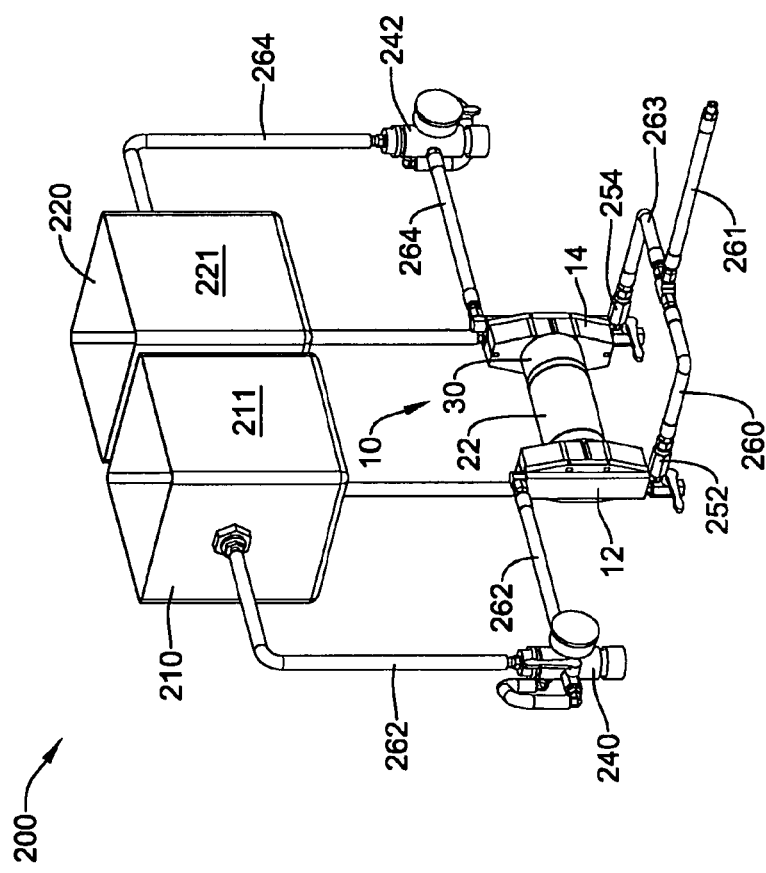
FIG. 14 is a perspective view of another exemplary pumping system including the pumping assembly of FIG. 1.

FIG. 14 illustrates another exemplary pumping system 200 utilizing pumping assembly 10 as described above. The pumping system 200 may include a first fluid container or reservoir 210 for holding a first fluid 211, and the pumping system 200 may include a second fluid container or reservoir 220 for holding a second fluid 221.

The first fluid container 210 may include a fluid outlet 212, which may extend from the bottom of first fluid container 210, or other area of first fluid container 210. Similarly, the second fluid container 220 may include a fluid outlet 222, which may extend from the bottom of second fluid container 220, or other area of second fluid container 220.

Similar to pumping system 100 shown in FIGS. 11 and 12, in some embodiments, the first fluid container 210 may be located at a position above first pump 12 and/or the second fluid container 220 may be located at a position above second pump 14. Such a configuration benefits in the ability of utilizing gravity to aid in self-priming of the pumps 12 and 14 prior to use. In other words, gravity may draw first fluid 211 into first pump 12 and/or gravity may draw second fluid 221 into second pump 14 in order to self-prime pumps 12 and 14.

Additionally and/or alternatively, in embodiments in which the first fluid container 210 is located at a position above the first pump 12 and/or in embodiments in which the second fluid container 220 is located at a position above the second pump 14, any air bubbles generated at the pumps 12, 14 or otherwise in the system may naturally migrate upward toward the containers 210, 220 and away from pumps 12 and 14. Such embodiments may help ensure that air potentially trapped in the system will not adversely affect fluid flow through pumps 12 and 14, and thus will ensure that a controlled quantity of fluid is pumped through pumps 12 and 14 with each stroke of the pumps 12 and 14.

A first one-way check valve 252 may be placed on the fluid outlet side of first pump 12 and a second one-way check valve 254 may be placed on the fluid outlet side of second pump 14. The one-way check valves 252, 254 may prevent fluid from reentering pumps 12 and 14 from the outlet side of the pump 12, 14 after being expelled from the pump 12, 14 during operation.

In addition to first fluid container 210, second fluid container 220 and pump assembly 10, pumping system 200 may include one or more additional components. For example, pumping system 200 may include a first regulator 240 and a second regulator 242. The first regulator 240 may control fluid flow and/or pressure of first fluid 211 through pumping system 200, and the second regulator 242 may control fluid flow and/or pressure of second fluid 221 through pumping system 200. The first and second regulators 240, 242 of pumping system 200 are shown as pressure regulators.

Figure 15:
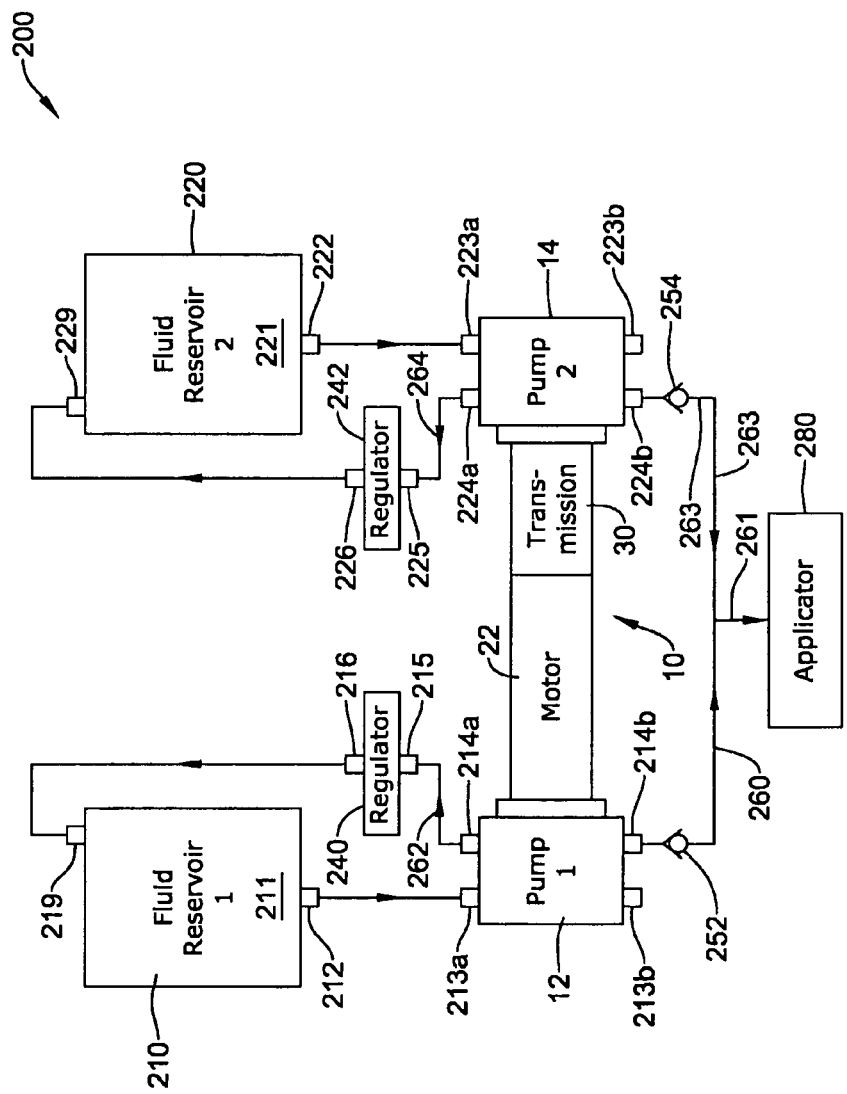
FIG. 15 is a schematic diagram of the pumping system of FIG. 14.

It is noted that hoses, pipes and other fluid conduits have been included in the pumping system 200 shown in FIG. 14 in order to illustrate the various fluid pathways through pumping system 200. FIG. 15 is a schematic depiction of pumping system 200 of FIG. 14 showing various components of pumping system 200 fluidly connected. In describing the various components as being fluidly connected, what is meant is that hoses, pipes or other fluid conduits may be used to place the various components in fluid communication with one or more other components of pumping system 200.

As shown in FIG. 15, outlet 212 of the first fluid container 210 may be fluidly connected to the first inlet 213a of first pump 12. The second outlet 214b of first pump 12 may be fluidly connected with a fluid applicator 280, such as a spray gun, nozzle, boom, or the like. The first outlet 214a of first pump 12 may be fluidly connected to the inlet 215 of regulator 240, and the outlet 216 of regulator 240 may be fluidly connected to an inlet 219 of first fluid container 210.

Thus, during operation pump 12 will draw first fluid 211 from first fluid container 210 into pump 12. The pump 12 will pump first fluid 211 out of pump 12 either through the first outlet 214a or the second outlet 214b of pump 12. The pressure regulator 240 may control which of the first outlet 214a or the second outlet 214b of pump 12 the first fluid 211 is pumped through.

The pressure regulator 240, which may be an adjustable pressure regulator or a pre-set or non-adjustable pressure regulator, is set to a threshold pressure. At pressures below the threshold pressure, pressure regulator 240 does not allow fluid flow through from the inlet 215 of pressure regulator 240 to the outlet 216 of pressure regulator 240. Thus, at pressures below the threshold pressure, first fluid 211 is expelled from the second outlet 214b of pump 12, across the check valve 252, into first fluid flow line 260, into fluid mix line or proportioned output 261, and to applicator 280. At pressures above the threshold pressure of pressure regulator 240, the first fluid 211 is expelled from the first outlet 214a of pump 12 through first fluid bypass line 262. First fluid bypass line 262 routes first fluid 211 out the first outlet 214a of pump 12, through pressure regulator 240, and back to first fluid container 210.

Thus, it can be seen that when no fluid flow is experienced or called for at applicator 280, first fluid 211 pumped through first pump 12 is routed through the first fluid bypass line 262 and back to first fluid container 210. However, when fluid flow is experienced or called for at applicator 280, the first fluid 211 pumped through first pump 12 is routed through the first fluid line 260 to applicator 280. When no fluid flow is allowed across applicator 280, the pressure at the outlet of first pump 12 will increase until the pressure reaches the threshold pressure set at the pressure regulator 240, at which time the pressure regulator 240 will open, allowing bypass flow of first fluid 211 pumped through first pump 12 to be recirculated back to first fluid container 210.

Furthermore, the outlet 222 of second fluid container 220 may be fluidly connected to the first inlet 223a of second pump 14. The second outlet 224b of second pump 14 may be fluidly connected with fluid applicator 280. The first outlet 224a of second pump 14 may be fluidly connected to the inlet 225 of regulator 242, and the outlet 226 of regulator 242 may be fluidly connected to an inlet 229 of second fluid container 220.

Thus, during operation pump 14 will draw second fluid 221 from the second fluid container 220 into pump 14. The pump 14 will pump second fluid 221 out of pump 14 either through the first outlet 224a or the second outlet 224b of pump 14. The pressure regulator 242 may control which of the first outlet 224a or the second outlet 224b of pump 14 the second fluid 221 is pumped through.

The pressure regulator 242, which may be an adjustable pressure regulator or a pre-set or non-adjustable pressure regulator, is set to a threshold pressure. At pressures below the threshold pressure, the pressure regulator 242 does not allow fluid flow through from the inlet 225 of pressure regulator 242 to the outlet 226 of pressure regulator 242. Thus, at pressures below the threshold pressure, second fluid 221 is expelled from the second outlet 224b of pump 14, across check valve 254, into second fluid flow line 263, into fluid mix line or proportioned output 161, and to applicator 280. At pressures above the threshold pressure of pressure regulator 242, the second fluid 221 is expelled from the first outlet 224a of pump 14 through the second fluid bypass line 264. The second fluid bypass line 264 routes second fluid 221 out the first outlet 224a of pump 14, through pressure regulator 242, and back to second fluid container 220.

Thus, it can be seen that when no fluid flow is experienced or called for at applicator 280, second fluid 221 pumped through second pump 14 is routed through the second fluid bypass line 264 and back to second fluid container 220. However, when fluid flow is experienced or called for at applicator 280, the second fluid 221 pumped through second pump 14 is routed through the second fluid flow line 263 to applicator 280. When no fluid flow is allowed across applicator 280, the pressure at the outlet of second pump 14 will increase until the pressure reaches the threshold pressure set at pressure regulator 242, at which time pressure regulator 242 will open, allowing bypass flow of the second fluid 221 pumped through second pump 14 to be recirculated back to second fluid container 220.

During operation, electric motor 22 of pump assembly 10 may drive each of the first pump 12 and the second pump 14. The transmission 30 may deliver rotational power to second pump 14 through second drive shaft 34 (see FIG. 2) at the same rate or at a different rate than rotational power is delivered to first pump 12 through first drive shaft 24 (see FIG. 2). Thus, first pump 12 may be driven at a first rate and second pump 14 may be driven at a second rate. In embodiments in which the displacement of each of the pumps 12 and 14 is the same, when first pump 12 is driven at a first rate and the second pump 14 is driven at a second rate different from the first rate, then the flow rate of the output of the first fluid 211 from first pump 12 is different than the flow rate of the output of the second fluid 221 from second pump 14.

Therefore, first fluid 211 may be pumped to the fluid mix line or proportioned output 261 at a first rate and second fluid 221 may be pumped to the fluid mix line or proportioned output 261 at a second rate. Depending on the relative rates in which the first and second pumps 12 and 14 are driven and/or the displacements of the first and second pumps 12 and 14, the first fluid 211 may be pumped to proportioned output 261 at a greater rate, the same rate, or a lesser rate than the second fluid 221 is pumped to proportioned output 261.

In some embodiments, the desired proportions of first fluid 211 and/or second fluid 221 to proportioned output 261 are not adjustable without removing and/or replacing one or more components of pumping system 200. For example, the displacement of one or more of the first pump 12 and the second pump 14 may be altered by replacing piston 44 with a piston of a different diameter or by replacing cam 52 with a cam having a different eccentricity to alter the stroke length of piston 44. In some embodiments one or more of first pump 12 and second pump 14 may be substituted with a pump having a different displacement. In some embodiments transmission 30 may be changed to provide a different ratio between the rotational speed of the input (e.g., the first drive shaft 24) and the rotational speed of the output (e.g., the second drive shaft 34) of transmission 30.

The first fluid 211 may be mixed with the second fluid 221 in the fluid mix line or proportioned output 261 prior to reaching applicator 280. As the appropriate and desired proportions of first fluid 211 and second fluid 221 are delivered to applicator 280 by pump assembly 10, the fluid mixture maintains the desired ratio of first fluid 211 to second fluid 221.

Additionally, first fluid 211 is only mixed with second fluid 221 as needed. Thus, a surplus of the fluid mixture is not created, reducing waste at the conclusion of a fluid application. Furthermore, the accuracy of the ratio of first fluid 211 to second fluid 221 in the fluid mixture is maintained.

Figure 16:
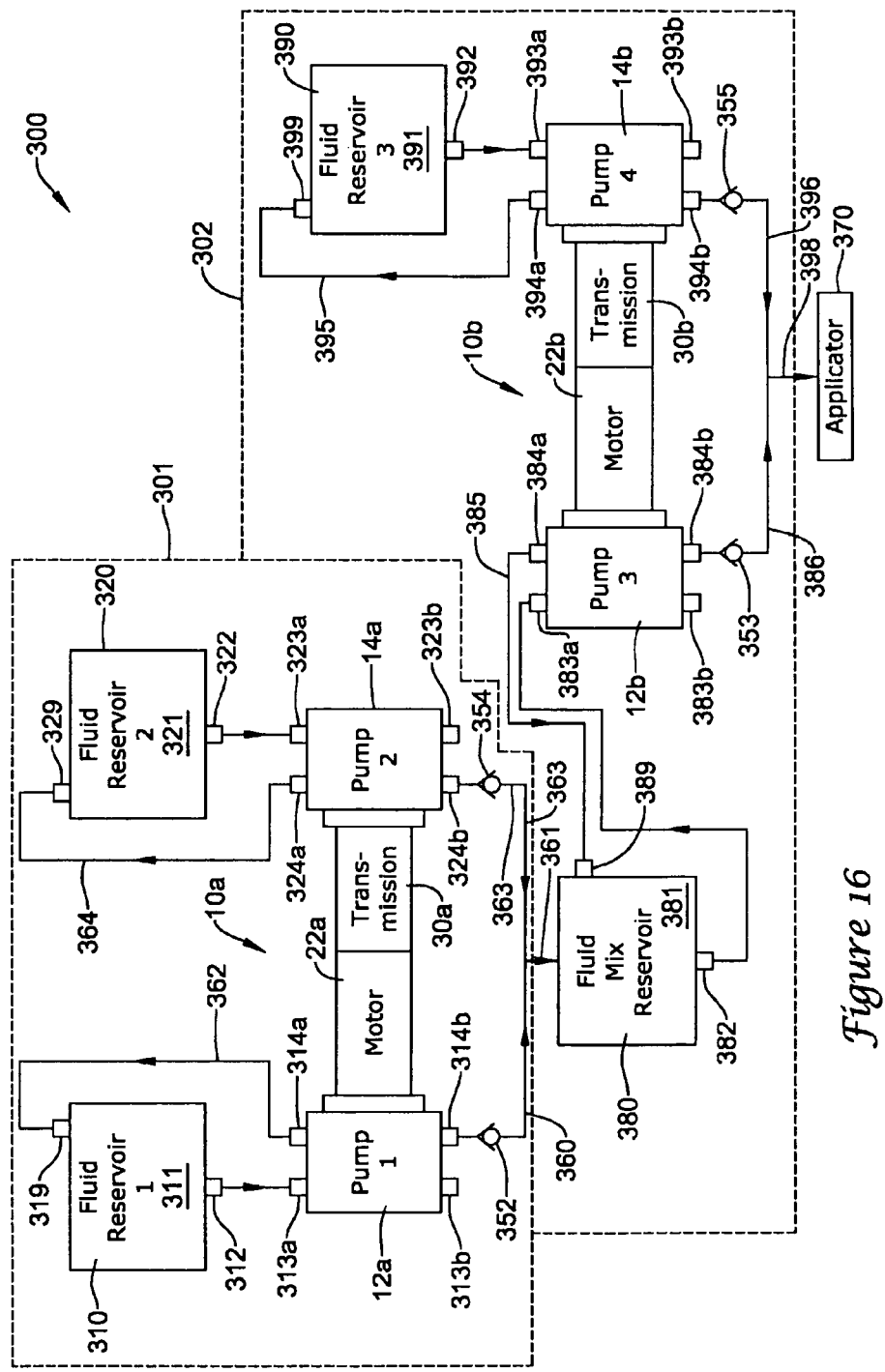
FIG. 16 is a schematic diagram of another exemplary pumping system including a plurality of the pumping assemblies of FIG. 1.

FIG. 16 is a schematic depiction of another pumping system 300 utilizing a plurality of the pumping assemblies 10 as described above. Pumping system 300 is a dual stage pumping system including a first stage pumping subsystem 301 and a second stage pumping subsystem 302. The first stage pumping subsystem 301 may include a first pump assembly 10a including a first pump 12a and a second pump 14a. The second stage pumping subsystem 302 may include a second pump assembly 10b including a third pump 12b and a fourth pump 14b.

The first stage pumping subsystem 301 may include a first fluid container or reservoir 310 for holding a first fluid 311, and the first stage pumping subsystem 301 may include a second fluid container or reservoir 320 for holding a second fluid 321.

As shown in FIG. 16, the outlet 312 of first fluid container 310 may be fluidly connected to the first inlet 313a of first pump 12a. The second outlet 314b of first pump 12a may be fluidly connected with a first stage output 361 of first pumping subsystem 301. The first outlet 314a of first pump 12a may be fluidly connected to an inlet 319 of first container 310 via a first fluid bypass line 362. It is noted that, although not shown in FIG. 16, a recirculating valve assembly, which may include a pressure regulator similar to the pressure regulator described above regarding the pumping systems 100, 200, may be placed in the first fluid bypass line 362 as desired.

Thus, during operation first pump 12a will draw the first fluid 311 from first fluid container 310 into first pump 12a. The first pump 12a will pump first fluid 311 out of pump 12a either through the first outlet 314a or the second outlet 314b of pump 12a. In some embodiments, a recirculating valve assembly may control which of the first outlet 314a or the second outlet 314b of first pump 12a the first fluid 311 is pumped through.

When first fluid 311 is pumped out of the first outlet 314a of first pump 12a, first fluid 311 may be recirculated back to first fluid container 310. When first fluid 311 is pumped out of the second outlet 314b of first pump 12a, first fluid 311 may be pumped through a one-way check valve 352 located in a first fluid output line 360 to the first stage output 361. The check valve 352 may prevent fluid from reentering pump 12a from the outlet side of pump 12a after being expelled from pump 12a during operation.

Additionally, the outlet 322 of second fluid container 320 may be fluidly connected to the first inlet 323a of second pump 14*a*. The second outlet 324*b* of second pump 14*a* may be fluidly connected with the first stage output 361 of first pumping subsystem 301. The first outlet 324*a* of second pump 14*a* may be fluidly connected to an inlet 329 of second container 320 via a second fluid bypass line 364. It is noted that, although not shown in FIG. 16, a recirculating valve assembly, which may include a pressure regulator similar to the pressure regulator described above regarding pumping systems 100, 200, may be placed in second fluid bypass line 364 as desired.

Thus, during operation second pump 14*a* will draw second fluid 321 from second fluid container 320 into second pump 14*a*. The second pump 14*a* will pump second fluid 321 out of pump 14*a* either through the first outlet 324*a* or the second outlet 324*b* of pump 14*a*. In some embodiments, a recirculating valve assembly may control which of the first outlet 324*a* or the second outlet 324*b* of second pump 14*a* the second fluid 321 is pumped through.

When the second fluid 321 is pumped out of the first outlet 324*a* of second pump 14*a*, second fluid 321 may be recirculated back to second fluid container 320. When second fluid 321 is pumped out of the second outlet 324*b* of second pump 14*a*, second fluid 321 may be pumped through a one-way check valve 354 located in a second fluid output line 363 to the first stage output 361. The check valve 354 may prevent fluid from reentering pump 14*a* from the outlet side of pump 14*a* after being expelled from pump 14*a* during operation.

During operation, electric motor 22*a* of pump assembly 10*a* may drive each of the first pump 12*a* and the second pump 14*a*. The transmission 30*a* may deliver rotational power to second pump 14*a* through second drive shaft 34 (see FIG. 2) at the same rate or at a different rate than rotational power is delivered to first pump 12*a* through first drive shaft 24 (see FIG. 2). Thus, first pump 12*a* may be driven at a first rate and second pump 14*a* may be driven at a second rate. In embodiments in which the displacement of each of the pumps 12*a*, 14*a* is the same, when first pump 12*a* is driven at a first rate and second pump 14*a* is driven at a second rate different from the first rate, then the flow rate of the output of first fluid 311 from first pump 12*a* is different than the flow rate of the output of second fluid 321 from second pump 14*a*.

Therefore, first fluid 311 may be pumped to the first stage outlet 361 at a first rate and second fluid 321 may be pumped to first stage outlet 361 at a second rate. Depending on the relative rates in which the first and second pumps 12*a*, 14*a* are driven and/or the displacements of the first and second pumps 12*a*, 14*a*, first fluid 311 may be pumped to the first stage output 361 at a greater rate, the same rate, or a lesser rate than second fluid 321 is pumped to the first stage output 361.

In some embodiments, the desired proportions of first fluid 311 and/or second fluid 321 to the first stage output 361 are not adjustable without removing and/or replacing one or more components of pumping subsystem 301. For example, the displacement of one or more of the first pump 12*a* and the second pump 14*a* may be altered by replacing piston 44 with a piston of a different diameter or by replacing cam 52 with a cam having a different eccentricity to alter the stroke length of piston 44. In some embodiments one or more of the first pump 12*a* and the second pump 14*a* may be substituted with a pump having a different displacement. In some embodiments the transmission 30*a* may be changed to provide a different ratio between the rotational speed of the input (e.g., the first drive shaft 24) and the rotational speed of the output (e.g., the second drive shaft 34) of transmission 30.

The first fluid 311 may be mixed with second fluid 321 in the first stage output 361. As the appropriate and desired proportions of first fluid 311 and second fluid 321 are delivered to first stage output 361 by the pump assembly 10*a*, the fluid mixture maintains the desired ratio of first fluid 311 to second fluid 321, relatively independently of pressure and flow rate at the output.

Additionally, first fluid 311 is only mixed with second fluid 321 as needed. Thus, a surplus of the fluid mixture is not created, reducing waste at the conclusion of a fluid application. Furthermore, the accuracy of the ratio of first fluid 311 to second fluid 321 in the fluid mixture is maintained.

Thus, the first stage output 361 includes a proportioned fluid mix of first fluid 311 and second fluid 321 at a desired ratio. The first stage output 361 may be connected to an inlet of the second stage pumping subsystem 302, such as a first stage mix container 380.

The second stage pumping subsystem 302 may include a first stage mix container or reservoir 380 for holding a first stage fluid mixture 381 of first fluid 311 and second fluid 321 output from first stage pumping subsystem 301 through first stage output 361, and the second stage pumping subsystem 302 may include a third fluid container or reservoir 390 for holding a third fluid 391.

As shown in FIG. 16, the outlet 382 of first stage mixed fluid container 380 may be fluidly connected to the first inlet 383*a* of third pump 12*b*. The second outlet 384*b* of third pump 12*b* may be fluidly connected with a fluid applicator 370, such as a spray gun, nozzle, boom, or the like through the second stage outlet 398. The first outlet 384*a* of third pump 12*b* may be fluidly connected to an inlet 389 of first stage mixed fluid container 380 via a first stage mixed fluid bypass line 385. It is noted that, although not shown in FIG. 16, a recirculating valve assembly, which may include a pressure regulator similar to the pressure regulator described above regarding the pumping systems 100, 200, may be placed in the first stage mixed fluid bypass line 385 as desired.

Thus, during operation third pump 12*b* will draw the first stage fluid mixture 381 from first stage mixed fluid container 380 into third pump 12*b*. The third pump 12*b* will pump the first stage fluid mixture 381 out of pump 12*b* either through the first outlet 384*a* or the second outlet 384*b* of pump 12*b*. In some embodiments, a recirculating valve assembly may control which of the first outlet 384*a* or the second outlet 384*b* of third pump 12*b* the first stage fluid mixture 381 is pumped through.

When the first stage fluid mixture 381 is pumped out of the first outlet 384*a* of third pump 12*b*, the first stage fluid mixture 381 may be recirculated back to the first stage mixed fluid container 380. When the first stage fluid mixture 381 is pumped out of the second outlet 384*b* of third pump 12*b*, the first stage fluid mixture 381 may be pumped through a one-way check valve 353 located in a first stage fluid mixture output line 386 to the second stage output 398. The check valve 353 may prevent fluid from reentering pump 12*b* from the outlet side of pump 12*b* after being expelled from pump 12*b* during operation.

Additionally, the outlet 392 of third fluid container 390 may be fluidly connected to the first inlet 393*a* of fourth pump 14*b*. The second outlet 394*b* of fourth pump 14*b* may be fluidly connected with fluid applicator 370. The first outlet 394*a* of fourth pump 14*b* may be fluidly connected to an inlet 399 of third fluid container 390 via a third fluid bypass line 395. It is noted that, although not shown in FIG. 16, a recirculating valve assembly, which may include a pressure regulator similar to the pressure regulator described above regarding pumping systems 100 and 200, may be placed in the third fluid bypass line 395 as desired.

Thus, during operation fourth pump 14*b* will draw third fluid 391 from the third fluid container 390 into fourth pump 14*b*. The fourth pump 14*b* will pump third fluid 391 out of pump 14*b* either through the first outlet 394*a* or the second outlet 394*b* of pump 14*b*. In some embodiments, a recirculating valve assembly may control which of the first outlet 394*a* or the second outlet 394*b* of fourth pump 14*b* the third fluid 391 is pumped through.

When third fluid 391 is pumped out of the first outlet 394*a* of fourth pump 14*b*, the third fluid 391 may be recirculated back to third fluid container 390. When the third fluid 391 is pumped out of the second outlet 394*b* of fourth pump 14*b*, the third fluid 391 may be pumped through a one-way check valve 355 located in a third fluid output line 396 to fluid applicator 370 through the second stage output 398. The check valve 355 may prevent fluid from reentering pump 14*b* from the outlet side of pump 14*b* after being expelled from pump 14*b* during operation.

During operation, electric motor 22*b* of pump assembly 10*b* may drive each of the third pump 12*b* and the fourth pump 14*b*. The transmission 30*b* may deliver rotational power to fourth pump 14*b* through the second drive shaft 34 (see FIG. 2) at the same rate or at a different rate than rotational power is delivered to third pump 12*b* through first drive shaft 24 (see FIG. 2). Thus, the third pump 12*b* may be driven at a first rate and the fourth pump 14*b* may be driven at a second rate. In embodiments in which the displacement of each of the pumps 12*b* and 14*b* is the same, when third pump 12*b* is driven at a first rate and fourth pump 14*b* is driven at a second rate different from the first rate, then the flow rate of the output of the first stage fluid mixture 381 from third pump 12*b* is different than the flow rate of the output of the fourth fluid 391 from fourth pump 14*b*.

Therefore, the first stage fluid mixture 381 may be pumped to the second stage output 398 and out to fluid applicator 370 at a first rate and the third fluid 391 may be pumped to the second stage output 398 and out to fluid applicator 370 at a second rate. Depending on the relative rates in which the third and fourth pumps 12*b* and 14*b* are driven and/or the displacements of the third and fourth pumps 12*b* and 14*b*, the first stage fluid mixture 381 may be pumped to the second stage output 398 and out to fluid applicator 370 at a greater rate, the same rate, or a lesser rate than third fluid 391 is pumped to the second stage output 398 and out to fluid applicator 370.

In some embodiments, the desired proportions of the first stage fluid mixture 381 and/or the third fluid 391 to the second stage output 398 and out to fluid applicator 370 are not adjustable without removing and/or replacing one or more components of the pumping subsystem 302. For example, the displacement of one or more of the third pump 12*b* and the fourth pump 14*b* may be altered by replacing piston 44 with a piston of a different diameter or by replacing cam 52 with a cam having a different eccentricity to alter the stroke length of piston 44. In some embodiments one or more of the third pump 12*b* and the fourth pump 14*b* may be substituted with a pump having a different displacement. In some embodiments transmission 30*b* may be changed to provide a different ratio between the rotational speed of the input (e.g., the first drive shaft 24) and the rotational speed of the output (e.g., the second drive shaft 34) of transmission 30*b*.

The first stage fluid mixture 381, which is a proportioned mixture of first fluid 311 and second fluid 321, may be mixed with third fluid 391 in the second stage output 398. As the appropriate and desired proportions of first fluid 311 and second fluid 321 are delivered to first stage output 361 by pump assembly 10*a*, and the appropriate and desired proportions of the third fluid 391 and the first stage fluid mixture 381 of first fluid 311 and second fluid 321 are delivered to the second stage output 398, pumping system 300 maintains the desired ratio of first fluid 311, second fluid 321 and third fluid 391 at the second stage output 398 to fluid applicator 370.

Additionally, first fluid 311, second fluid 321 and third fluid 391 are only mixed as needed. Thus, a surplus of the fluid mixture is not created, reducing waste at the conclusion of a fluid application. Furthermore, the accuracy of the ratio of first fluid 311, second fluid 321 and third fluid 391 in the fluid mixture is maintained.

In addition to first fluid container 310, second fluid container 320, first stage mix container 380, third fluid container 390 and the pump assemblies 10*a*, 10*b*, pumping system 300 may include one or more additional components. For example, pumping system 300 may include one or more flow meters for indicating the fluid flow through one or more of the pumps of one or more of the pump assemblies 10*a*, 10*b*. For instance, in some embodiments one or more flow meters may be included in pumping system 300 similar to the flow meter 130 of pumping system 100.

Additionally, pumping system 300 may include one or more regulators which may control fluid flow and/or pressure of one or more fluids and/or fluid mixes through pumping system 300. For instance, in some embodiments a flow regulator and/or a pressure regulator may be included in pumping system 300 similar to the pressure regulator 140, 142 of pumping system 100.

It is noted that one of skill in the art, in view of the schematic depiction of pumping system 300, would appreciate that various components of pumping system 300 may be fluidly coupled together using hoses, pipes and/or fluid conduits extending between a fluid outlet of a first component to a fluid inlet of a second component.

Additional pumping subsystems may be added to pumping system 300 to further mix a plurality of fluids. For example, a third pumping subsystem may be added in order to add a fourth fluid to the fluid mixture output by pumping system 300. Thus, it can be seen that modifications of pumping system 300 may result in four, five, six or more fluids being mixed together in precisely and accurately specified proportions.

Figure 17:
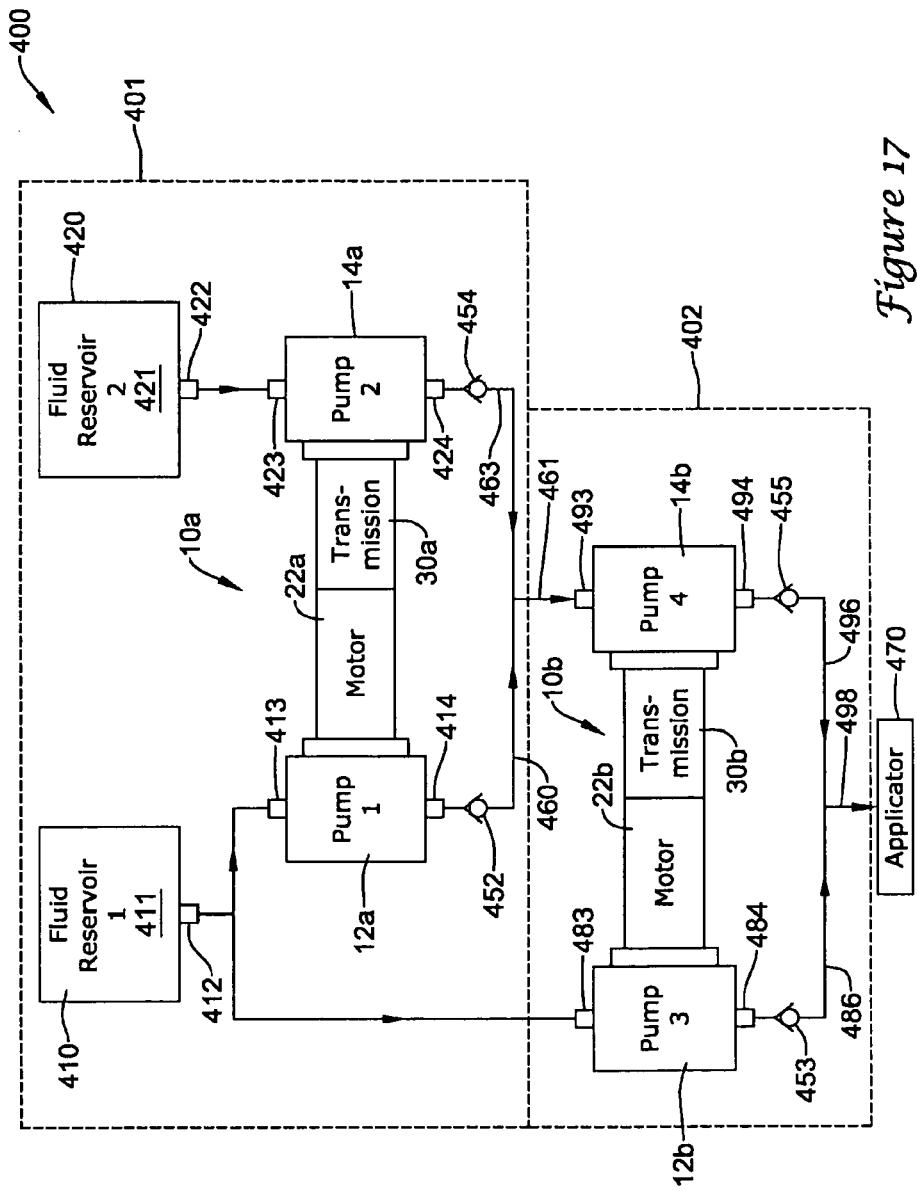
FIG. 17 is a schematic diagram of yet another exemplary pumping system including a plurality of the pumping assemblies of FIG. 1.

FIG. 17 is a schematic depiction of another pumping system 400 utilizing a plurality of pumping assemblies 10 as described above. The pumping system 400 is a dual stage pumping system including a first stage pumping subsystem 401 and a second stage pumping subsystem 402. The first stage pumping subsystem 401 may include a first pump assembly 10*a* including a first pump 12*a* and a second pump 14*a*. The second stage pumping subsystem 402 may include a second pump assembly 10*b* including a third pump 12*b* and a fourth pump 14*b*.

The first stage pumping subsystem 401 may include a first fluid container or reservoir 410 for holding a first fluid 411, and the first stage pumping subsystem 401 may include a second fluid container or reservoir 420 for holding a second fluid 421.

As shown in FIG. 17, the outlet 412 of first fluid container 410 may be fluidly connected to the first inlet 413*a* of first pump 12*a*. The outlet 414 of first pump 12*a* may be fluidly connected with a first stage outlet 461 of first pumping subsystem 401. It is noted that, although not shown in FIG. 17, a recirculating valve assembly, which may include a fluid bypass line and/or pressure regulator similar to the fluid bypass line and pressure regulator described above regarding pumping systems 100, 200, may be in fluid communication with a second outlet of first pump 12*a* and the first fluid container 410.

Thus, during operation first pump 12*a* will draw first fluid 411 from first fluid container 410 into first pump 12*a*. The first pump 12*a* will pump first fluid 411 out of pump 12*a* through the outlet 414 of pump 12*a*. In some embodiments, a recirculating valve assembly may control when first fluid 411 is pumped through the outlet 414 of first pump 12*a*.

When first fluid 411 is pumped out of the outlet 414 of first pump 12*a*, the first fluid 411 may be pumped through a one-way check valve 452 located in a first fluid output line 460 to the first stage proportioned output 461. The check valve 452 may prevent fluid from reentering pump 12*a* from the outlet side of the pump 12*a* after being expelled from pump 12*a* during operation.

Additionally, the outlet 422 of second fluid container 420 may be fluidly connected to the inlet 423 of second pump 14*a*. The outlet 424 of second pump 14*a* may be fluidly connected with the first stage outlet 461 of first pumping subsystem 401. It is noted that, although not shown in FIG. 17, a recirculating valve assembly, which may include a fluid bypass line and/or pressure regulator similar to the fluid bypass line and pressure regulator described above regarding pumping systems 100, 200, may be in fluid communication with a second outlet of second pump 14*a* and the second fluid container 420.

Thus, during operation second pump 14*a* will draw second fluid 421 from second fluid container 420 into second pump 14*a*. The second pump 14*a* will pump second fluid 421 out of pump 14*a* through the outlet 424 of pump 14*a*. In some embodiments, a recirculating valve assembly may control when second fluid 421 is pumped through the outlet 424 of second pump 14*a*.

When the second fluid 421 is pumped out of the outlet 424 of second pump 14*a*, the second fluid 421 may be pumped through a one-way check valve 454 located in a second fluid output line 463 to the first stage proportioned output 461. The check valve 454 may prevent fluid from reentering pump 14*a* from the outlet side of pump 14*a* after being expelled from pump 14*a* during operation.

During operation, electric motor 22*a* of pump assembly 10*a* may drive each of the first pump 12*a* and the second pump 14*a*. The transmission 30*a* may deliver rotational power to the second pump 14*a* through the second drive shaft 34 (see FIG. 2) at the same rate or at a different rate than rotational power is delivered to the first pump 12*a* through the first drive shaft 24 (see FIG. 2). Thus, first pump 12*a* may be driven at a first rate and second pump 14*a* may be driven at a second rate. In embodiments in which the displacement of each of the pumps 12*a*, 14*a* is the same, when the first pump 12*a* is driven at a first rate and the second pump 14*a* is driven at a second rate different from the first rate, then the flow rate of the output of first fluid 411 from first pump 12*a* is different than the flow rate of the output of second fluid 421 from second pump 14*a*.

Therefore, first fluid 411 may be pumped to the first stage proportioned output 461 at a first rate and the second fluid 421 may be pumped to the first stage proportioned output 461 at a second rate. Depending on the relative rates in which the first and second pumps 12*a* and 14*a* are driven and/or the displacements of the first and second pumps 12*a* and 14*a*, first fluid 411 may be pumped to the first stage proportioned output 461 at a greater rate, the same rate, or a lesser rate than second fluid 421 is pumped to the first stage proportioned output 461.

In some embodiments, the desired proportions of first fluid 411 and/or second fluid 421 to the first stage proportioned output 461 are not adjustable without removing and/or replacing one or more components of pumping subsystem 401. For example, the displacement of one or more of the first pump 12*a* and the second pump 14*a* may be altered by replacing piston 44 with a piston of a different diameter or by replacing cam 52 with a cam having a different eccentricity to alter the stroke length of piston 44. In some embodiments one or more of first pump 12*a* and second pump 14*a* may be substituted with a pump having a different displacement. In some embodiments the transmission 30*a* may be changed to provide a different ratio between the rotational speed of the input (e.g., the first drive shaft 24) and the rotational speed of the output (e.g., the second drive shaft 34) of transmission 30*a*.

The first fluid 411 may be mixed with the second fluid 421 in the first stage proportioned output 461. As the appropriate and desired proportions of first fluid 411 and second fluid 421 are delivered to the first stage proportioned output 461 by pump assembly 10*a*, the fluid mixture maintains the desired ratio of first fluid 411 to second fluid 421, relatively independently of pressure and flow rate at the output.

Thus, first stage proportioned output 461 includes a proportioned fluid mix of the first fluid 411 and the second fluid 421 at a desired ratio. The first stage output 461 may be connected to an inlet of the second stage pumping subsystem 402, such as a pump of the second stage pumping subsystem 402 or a first stage mixed fluid container (not shown).

The second stage pumping subsystem 402 may include a pump assembly 10*b* including a third pump 12*b* and a fourth pump 14*b*. As shown in FIG. 17, the outlet 412 of first fluid container 410, or another outlet of first fluid container 410 may be fluidly connected to the inlet 483 of third pump 12*b*. The outlet 484 of third pump 12*b* may be fluidly connected with a fluid applicator 470, such as a spray gun, nozzle, boom, or the like through the second stage proportioned output 498.

Thus, during operation third pump 12*b* will draw first fluid 411 the first fluid container 410 into third pump 12*b*. The third pump 12*b* will pump first fluid 411 out of pump 12*b* through the outlet 484 of pump 12*b*. In some embodiments, a recirculating valve assembly may control when the first fluid 411 is pumped through the outlet 484 of third pump 12*b*.

When first fluid 411 is pumped out of the outlet 484 of third pump 12*b*, first fluid 411 may be pumped through a one-way check valve 453 located in a first fluid outlet line 486 to the second stage proportioned output 498. The check valve 453 may prevent fluid from reentering pump 12*b* from the outlet side of pump 12*b* after being expelled from pump 12*b* during operation.

Additionally, the first stage proportioned output 461 of first pumping subsystem 401 may be fluidly connected to the inlet 493 of fourth pump 14*b*. The outlet 494 of fourth pump 14*b* may be fluidly connected with fluid applicator 470 through the second stage proportioned output 498. It is noted that, although not shown in FIG. 17, a recirculating valve assembly, which may include a fluid bypass line and/or pressure regulator similar to the fluid bypass line and pressure regulator described above regarding pumping systems 100, 200, may be in fluid communication with a second outlet of fourth pump 14*b*, as desired.

Thus, during operation fourth pump 14*b* will draw the first stage fluid mixture 491 (e.g., a proportioned mixture of first fluid 411 and second fluid 421) from the first stage output 461 into fourth pump 14*b*. The fourth pump 14*b* will pump the first stage fluid mixture 491 out of pump 14*b* through the outlet 494 of pump 14*b*. In some embodiments, a recirculating valve assembly may control when the first stage fluid mixture 491 is pumped through outlet 494 of fourth pump 14*b*.

When the first stage fluid mixture 491 is pumped out of the outlet 494 of fourth pump 14*b*, the first stage fluid mixture 491 may be pumped through a one-way check valve 455 located in a first stage fluid output line 496 to the fluid applicator 470 through the second stage proportioned output 498. The check valve 455 may prevent fluid from reentering pump 14*b* from the outlet side of pump 14*b* after being expelled from pump 14*b* during operation.

During operation, electric motor 22*b* of pump assembly 10*b* may drive each of the third pump 12*b* and the fourth pump 14*b*. The transmission 30*b* may deliver rotational power to the fourth pump 14*b* through the second drive shaft 34 (see FIG. 2) at the same rate or at a different rate than rotational power is delivered to the third pump 12*b* through the first drive shaft 24 (see FIG. 2). Thus, the third pump 12*b* may be driven at a first rate and the fourth pump 14*b* may be driven at a second rate. In embodiments in which the displacement of each of the pumps 12*b*, 14*b* is the same, when third pump 12*b* is driven at a first rate and fourth pump 14*b* is driven at a second rate different from the first rate, then the flow rate of the output of first fluid 411 from third pump 12*b* is different than the flow rate of the output of first stage fluid mixture 491 from fourth pump 14*b*.

Therefore, the first stage fluid mixture 491 may be pumped to the second stage proportioned output 498 and out to fluid applicator 470 at a first rate and the first fluid 411 may be pumped to the second stage proportioned output 498 and out to fluid applicator 470 at a second rate. Depending on the relative rates in which the third and fourth pumps 12*b*, 14*b* are driven and/or the displacements of the third and fourth pumps 12*b*, 14*b*, the first stage fluid mixture 491 may be pumped to the second stage proportioned output 498 and out to fluid applicator 470 at a greater rate, the same rate, or a lesser rate than first fluid 411 is pumped to the second stage proportioned output 498 and out to fluid applicator 470.

In some embodiments, the desired proportions of first stage fluid mixture 491 and/or first fluid 411 to the second stage output 498 and out to fluid applicator 470 are not adjustable without removing and/or replacing one or more components of pumping subsystem 402. For example, the displacement of one or more of the third pump 12*b* and the fourth pump 14*b* may be altered by replacing piston 44 with a piston of a different diameter or by replacing cam 52 with a cam having a different eccentricity to alter the stroke length of piston 44. In some embodiments one or more of the third pump 12*b* and the fourth pump 14*b* may be substituted with a pump having a different displacement. In some embodiments transmission 30*b* may be changed to provide a different ratio between the rotational speed of the input (e.g., the first drive shaft 24) and the rotational speed of the output (e.g., the second drive shaft 34) of transmission 30*b*.

The first stage fluid mixture 491, which is a proportioned mixture of first fluid 411 and second fluid 421, may be mixed with an additional quantity of first fluid 411 in the second stage outlet 498. As the appropriate and desired proportions of first fluid 411 and second fluid 421 are delivered to the first stage output 461 by pump assembly 10*a*, and the appropriate and desired proportions of first fluid 411 and the first stage fluid mixture 491 of first fluid 411 and second fluid 421 are delivered to the second stage output 498, pumping system 400 maintains the desired ratio of first fluid 411 and second fluid 421 at the second stage proportioned output 498 to fluid applicator 470. Thus, it can be demonstrated that pumping system 400 may be beneficial in forming a mixture of first fluid 411 and second fluid 421 at rates in which first fluid 411 is present in quantities much greater than the quantity of second fluid 421. For instance, in some embodiments the pumping system may provide a mixture of first fluid 411 and second fluid 421 having a ratio in the range of 100:1 to 1600:1, in the range of 100:1 to 200:1, in the range of 200:1 to 400:1, in the range of 400:1 to 800:1, in the range of 500:1 to 1000:1, in the range of 800:1 to 1200:1, in the range of 1200:1 to 1400:1, in the range of 1000:1 to 1600:1. In some embodiment the ratio of first fluid 411 to second fluid 421 may be 100:1, 200:1, 300:1, 400:1, 500:1, 600:1, 700:1, 800:1, 900:1; 1000:1, 1296:1 or 1600:1.

Additionally, first fluid 411 and second fluid 421 are only mixed as needed. Thus, a surplus of the fluid mixture is not created, reducing waste at the conclusion of a fluid application. Furthermore, the accuracy of the ratio of first fluid 411 to second fluid 421 in the fluid mixture is maintained.

In addition to first fluid container 410, second fluid container 420 and pump assemblies 10*a*, 10*b*, pumping system 400 may include one or more additional components. For example, pumping system 400 may include one or more flow meters for indicating the fluid flow through one or more of the pumps of one or more of the pump assemblies 10. For instance, in some embodiments one or more flow meters may be included in pumping system 400 similar to flow meter 130 of pumping system 100.

Additionally, pumping system 400 may include one or more regulators which may control fluid flow and/or pressure of one or more fluids and/or fluid mixes through pumping system 400. For instance, in some embodiments a flow regulator and/or a pressure regulator may be included in pumping system 400 similar to the pressure regulator 140, 142 of pumping system 100. It is noted that one of skill in the art, in view of the schematic depiction of pumping system 400, would appreciate that various components of pumping system 400 may be fluidly coupled together using hoses, pipes and/or fluid conduits extending between a fluid outlet of a first component to a fluid inlet of a second component.

Additional pumping subsystems may be added to pumping system 400 to further mix a plurality of fluids. For example, a third pumping subsystem may be added in order to further dilute second fluid 421 in a mixture of first fluid 411. Thus, it can be seen that modifications of pumping system 400 may result in a plurality of fluids being mixed together in precisely and accurately specified proportions.

Figure 18:
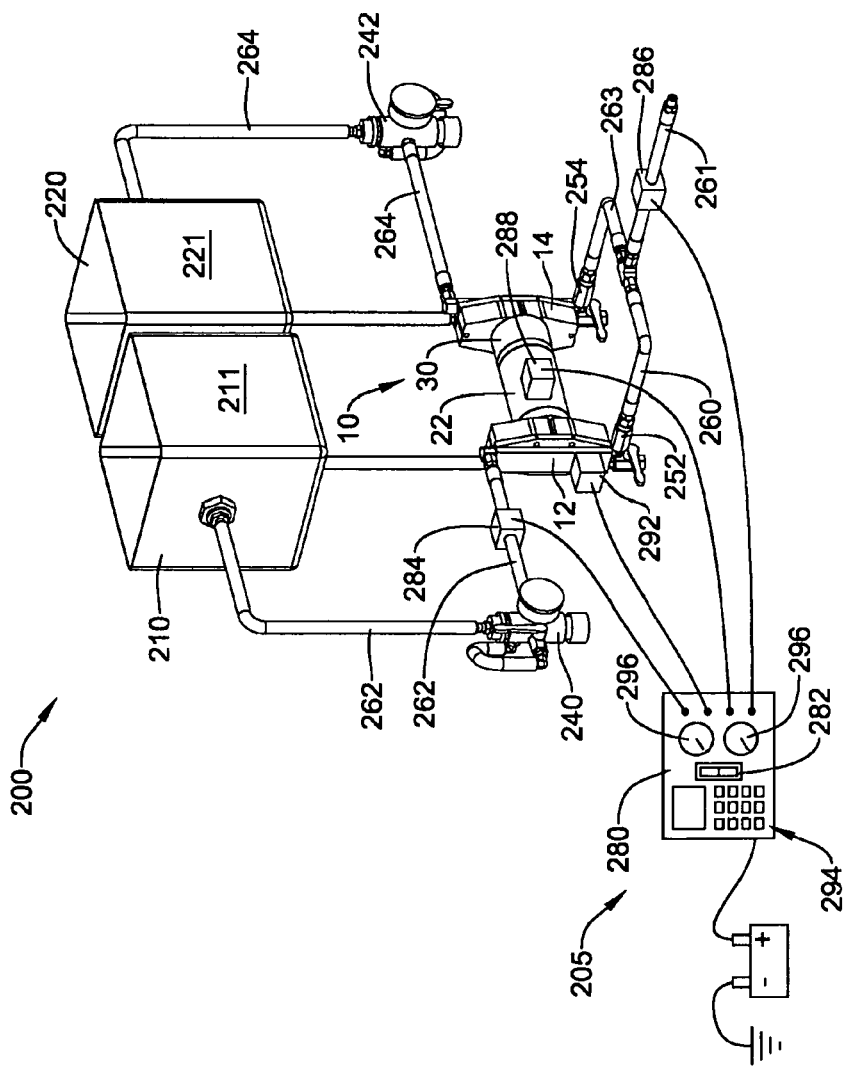
FIG. 18 depicts an exemplary pumping system including a control module.

FIG. 18 illustrates an exemplary control system 205 incorporated with the pumping system 200 of FIG. 14. As pumping system 200 shown in FIG. 18 is similar to that shown in FIG. 14 and described herein, a description of various components of pumping system 200 will not be repeated. Although control system 205 is described in association with pumping system 200, it is noted that control system 205 or another control system may be incorporated with another exemplary pumping system including the other exemplary pumping systems described herein.

The control system 205 may include a control box 280 and one or more switches, transducers, gauges, meters, solenoids, relays, speed controllers, flow controllers, pressure controllers, or the like. The control box 280 may include a switch, such as a master on/off switch 282, controlling electrical signals through the control box 280.

In some embodiments, control system 205 may include a pressure switch and/or pressure transducer 284. In some embodiments, the pressure switch and/or pressure transducer 284 may be placed on a high pressure side of the first pump 12 and/or the second pump 14. For instance, pressure switch and/or pressure transducer 284 may be placed in a fluid output line of first pump 12 and/or in a fluid output line of second pump 14. In FIG. 18, pressure switch and/or pressure transducer 284 is shown in the first fluid bypass line 262, however, in other embodiments pressure switch and/or pressure transducer 284 may be placed at another location such as in the first fluid output line 260 or in the proportioned output line 261. The pressure switch and/or pressure transducer 284 may send a signal regarding the pressure sensed by the pressure switch and/or pressure transducer 284 to the control box 280.

Additionally or alternatively, in some embodiments the control system 205 may include a flow switch and/or flow transducer 286. The flow switch and/or flow transducer 286 may be placed in a fluid output line of first pump 12 and/or in a fluid output line of second pump 14. In FIG. 18, the flow switch and/or flow transducer 286 is shown in the proportioned output line 261, however, in other embodiments the flow switch and/or flow transducer 286 may be placed at another location as desired. The flow switch and/or flow transducer 286 may send a signal regarding the flow sensed by the flow switch and/or flow transducer 284 to control box 280.

In some embodiments, control system 205 may include a speed counter/rate counter 292 which may determine the rotational rate of the first and/or second drive shaft 24, 34 of motor assembly 20 and/or the stroke rate of the first and/or second pump 12, 14. As the stroke rate of the first pump 12 may be directly related to the rotational rate of the first drive shaft 24 and the stroke rate of the second pump 14 may be directly related to the rotational rate of the second drive shaft 34, sensing the speed and/or rate of one component of the system may be used to determine the speed and/or rate of another component of the system. The speed counter/rate counter 292 may send a signal regarding the speed and/or rate of a component of system 200 to control box 280, such as the processor 290 of control box 280.

Additionally or alternatively, in some embodiments, control system 205 may include a speed control module 288 for controlling the rotational rate of the first drive shaft 24 and/or the second drive shaft 34 of motor assembly 20. For instance, in some embodiments the speed control module 288 may control the speed of motor 22, thus controlling the rotational rate of the first drive shaft 24 and the second drive shaft 34. Thus, the speed of the motor 22 and/or the rotational rates of the first drive shaft 24 and the second drive shaft 34 may be variably controlled in some embodiments.

Additionally or alternatively, in some embodiments the speed control module 288 may send a signal to transmission 30 to control the ratio of the rotational rate of the first drive shaft 24 to the rotational rate of the second drive shaft 34. Thus, the speed of the second drive shaft 34 relative to the speed of the first drive shaft 24 may be variably controlled in some embodiments.

In some embodiments, speed control module 288 may allow motor 22 to run at variable speeds. Thus, the rotational rate of the first drive shaft 24 may be varied with speed control module 288. In such embodiments, when transmission 30 is fixed or otherwise not varied, varying the rotational rate of the first drive shaft 24 with speed control module 288 varies the rotational rate of the second drive shaft 34 in proportion to the ratio dictated by transmission 30. Thus, varying the speed of the motor 22 may vary the flow of fluid to the proportioned output 261 while maintaining a constant proportion of first fluid 211 to second fluid 221 at the proportioned output 261.

In some embodiments, control system 205 may include a processor 290. The processor 290 may receive signals from one or more switches, transducers, counters, or other signal input devices. For example, in some embodiments processor 290 may receive a signal from the pressure switch and/or pressure transducer 284, may receive a signal from the flow switch and/or flow transducer 286, may receive a signal from the speed counter/rate counter 292, and/or from one or more other components of control system 205. In some embodiments, processor 290 may transmit a signal to speed control module 288 to control rotational rate of the first drive shaft 24 and/or the second drive shaft 34 of motor assembly 20.

In some embodiments, the control system 205 may include a user interface 294 which may allow an operator to input information to processor 290. In some embodiments, the user interface 294 may include a dot-matrix display, a touch screen display, a keyboard, a curser control device such as a computer mouse or a track ball, buttons, knobs, switches, or other means of entering, selecting and/or evaluating input data. For instance, in some embodiments the user interface 294 may allow an operator to input the label dictated rate of a chemical to be mixed with water (or another fluid), input another desired rate of a chemical to be mixed with water (or another fluid) and/or select from one of a list of mix rates stored in the memory of processor 290. Upon inputting the label dictated rate of chemical to water, the desired rate of chemical to water, and/or selecting a desired rate of a chemical to water, control system 205 may control the rotational rate of first drive shaft 24 driving first pump 12 (dictating the flow rate of the first fluid 211) to the rotational rate of second drive shaft 34 driving second pump 14 (dictating the flow rate of the second fluid 221) to attain the desired or recommended rate of a fluid mixture.

In some embodiments, user interface 294 may include a bar code scanner or other suitable indicia reader, such as but not limited to RF ID tag readers and the like. In such embodiments, the user may scan the bar code or indicia of a product, such as a container of a chemical. Reading the bar code of the product, processor 290 may be able to determine the label dictated rate recommended for the product and/or may prompt a user to select from one or more suggested rates for mixing the product (e.g., chemical) with water (or other fluid). In such embodiments, once the rate has been selected or determined, the processor 290 may send a signal to speed control module 288 to control the rotational rate of first drive shaft 24 and/or the rotational rate of second drive shaft 34, and or control the relative rates of first drive shaft 24 to second drive shaft 34, thereby controlling the relative flow rates of fluid being pumped by first pump 12 and second pump 14 to the proportioned output 261 to control the ratio of first fluid 211 to second fluid 221 at the proportioned output 261.

The control box 280 may also include one or more gauges or meters 296, providing a visual indication of one or more operating conditions of system 200, such as the speed of the first and/or second drive shaft 24, 34 or the flow rate of the first and/or second fluid 211, 221. The gauges or meters 296, or additional gauges or meters, may also be used to indicate fluid pressure, fluid concentration, amperes, voltage, etc. In some embodiments, the control system 205, including control box 280, may include additional components such as switches, fuses, circuit breakers, solenoids, relays, gauges, meters, terminals, connectors, etc. as desired.

Figure 19A:
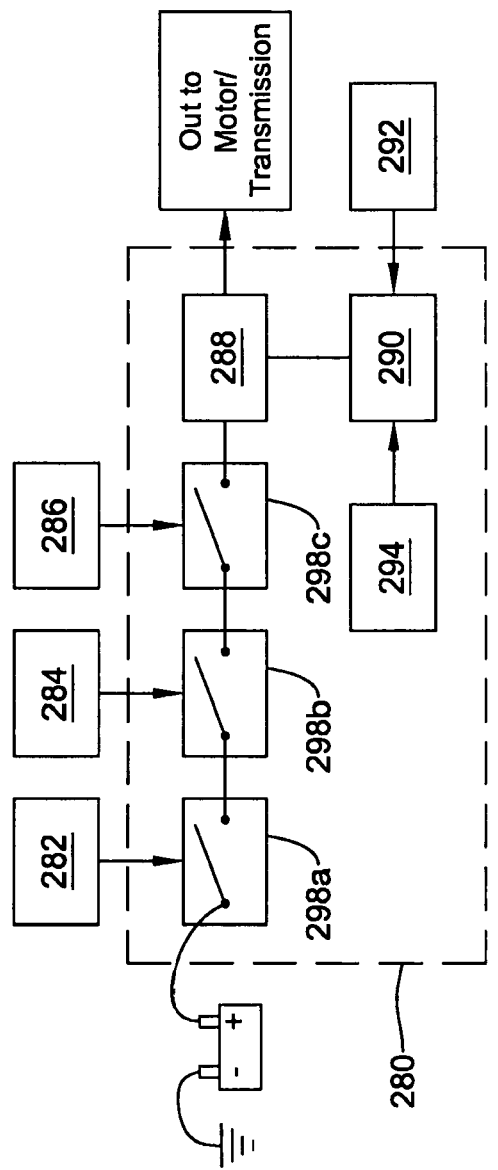
FIG. 19A is a diagram illustrating an exemplary functionality of a control system for use with the pumping system of FIG. 18.

FIG. 19A schematically illustrates one exemplary configuration of control system 205 used with pumping system 200. As shown in FIG. 19A, electrical power may be provided to the speed control module 288, or other component of control system 205, through a plurality of switches or relays 298. For instance, the on/off switch 282 may be used to control power to components of control system 205, such as the speed control module 288 and/or the processor 290, through the switch or relay 298a. The pressure switch 284 and/or the flow switch 286 (or relays 298 controlled by the pressure switch 284 and/or the flow switch 286) may be electrically wired in series with the on/off switch 282 to control electrical power to speed control module 288. For instance, when the pressure switch 284 senses a pressure less than a threshold pressure, the switch or relay 298b may close, allowing power to be passed through the switch or relay 298b. Additionally or alternatively, when flow switch 286 senses flow greater than a threshold flow rate (e.g., above zero flow), the switch or relay 298c may close, allowing power to be passed through the switch or relay 298c. Thus, as shown in FIG. 19A, when the on/off switch 282 is in the "on" position, pressure switch 284 senses a pressure less than a threshold pressure, and flow switch 286 senses a flow greater than a threshold flow rate, the switches or relays 298a, 298b, 298c may be closed, allowing electrical power to pass to speed control module 288. In other embodiments, the pressure switch 284 and the flow switch 286 may be wired in parallel, and thus, if one or the other of switches or relays 298b or 298c are closed, electrical power may be passed to speed control module 288.

With the configuration illustrated in FIG. 19A, during time periods in which no fluid flow is called for at the applicator connected to proportioned output 261, the flow switch 286 would open relay 298c as the detected flow (e.g., zero flow) would be below a threshold flow rate. During this time, the pressure in the first fluid bypass line 262 would increase to the threshold pressure of pressure regulator 240. Thus, pressure switch 284 would open relay 298b as the detected pressure in the first fluid bypass line 262 would be greater than a threshold pressure. As both switches or relays 298b, 298c would be open, electrical power would not reach speed control module 288 and motor 22 may be stopped or disengaged to stop pumps 12 and 14.

When fluid flow through proportioned output 261 to the applicator is called for, flow through proportioned output 261 would commence, closing switch or relay 298c. Additionally, commencement of flow through proportioned output 261 would decrease the pressure in the first fluid bypass line 262 below the threshold level, closing switch or relay 298b. With both switches or relays 298b, 298c closed, electrical power is transmitted to speed control module 288 to start or engage motor 22 to run pumps 12 and 14. Placement of pressure switch 284 in series with flow switch 286 ensures that a signal indicating that a pressure below a threshold pressure at the pressure switch 284 is due to the presence of fluid flow through the proportioned output 261, and not due to the lack of fluid in system 200, such as the lack of first fluid 211 at the inlet of first pump 12 and/or the lack of second fluid 221 at the inlet of second pump 14.

Additionally, signals from the user interface 294 and/or from the speed/rate counter 292 may be sent to processor 290. For example, the current speed of the first drive shaft 24, the current speed of the second drive shaft 34, the current stroke rate of the first pump 12, and/or the current stroke rate of the second pump 14 may be sent to processor 290. Processor 290 may process this information and may make a logic determination as to whether the rotational rate of first drive shaft 24 and/or second drive shaft 34 should be increased or decreased to provide a desired flow rate of a mixed fluid (at a determined mixing ratio) at proportioned output 261. Additionally or alternatively, processor 290 may receive a signal from user interface 294 to control desired rotational rate of the first drive shaft 24 and/or the second drive shaft 34. The processor 290 may send a signal to speed control module 288 to adjust the rotational rate of first drive shaft 24 and/or second drive shaft 34 to attain the desired rotational rates. In some embodiments, speed control module 288 may adjust the motor speed and/or the ratio through transmission 30 to attain the desired rotational rates of the first drive shaft 24 (powering the first pump 12) and the second drive shaft 34 (powering the second pump 14) to attain the desired flow rate of a desired ratio of the first fluid 211 to the second fluid 221.

Figure 19B:
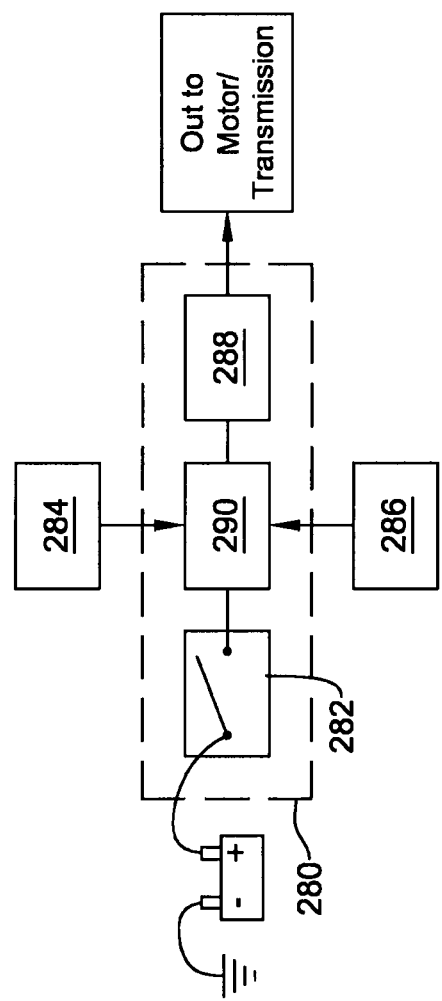
FIG. 19B is a diagram illustrating another exemplary functionality of a control system for use with the pumping system of FIG. 18.

FIG. 19B schematically illustrates another exemplary configuration of the control system 205 used with pumping system 200. The control box 280 may include an on/off switch 282 controlling power to processor 290. In this configuration, signals from pressure transducer 284 and/or flow transducer 286 are input into processor 290. For example, in some embodiments an analog signal may be sent to processor 290 from pressure transducer 284 and/or from flow transducer 286. The processor 290 may include an analog-to-digital converter (A/D converter) to convert the inputted signals. The processor 290 may process the signals and send an output signal to speed control module 288 to control the speed of the first drive shaft 24 and/or the second drive shaft 34 of motor assembly 20. In some embodiments, speed control module 288 may adjust the motor speed and/or the ratio through transmission 30 to attain the desired rotational rates of the first drive shaft 24 (powering the first pump 12) and the second drive shaft 34 (powering the second pump 14) to attain the desired flow rate of a desired ratio of first fluid 211 to second fluid 221.

Thus, in such embodiments, processor 290 (such as with a user interface 294) may call for a higher or lower flow rate at the proportioned output 261 and/or call for a desired ratio of first fluid 211 to second fluid 221 at the proportioned output 261. The processor 290 may then signal speed control module 288 to adjust the speed of the first drive shaft 24 and/or the second drive shaft 34 accordingly, to attain the desired flow rate and/or fluid ratio at proportioned output 261. In some embodiments, pressure transducer 284 and/or flow transducer 286 may provide feedback to processor 290 for evaluation, and/or alternatively, in embodiments in which pressure transducer 284 and/or flow transducer 286 is located in the proportioned output 261, control system 205 may be able to maintain a constant pressure and/or flow rate at the proportioned output 261 by providing feedback to processor 290 in order to adjust the speed of the first drive shaft 24 and/or the second drive shaft 34 (e.g., adjust the speed of motor 22) accordingly.

Figure 19C:
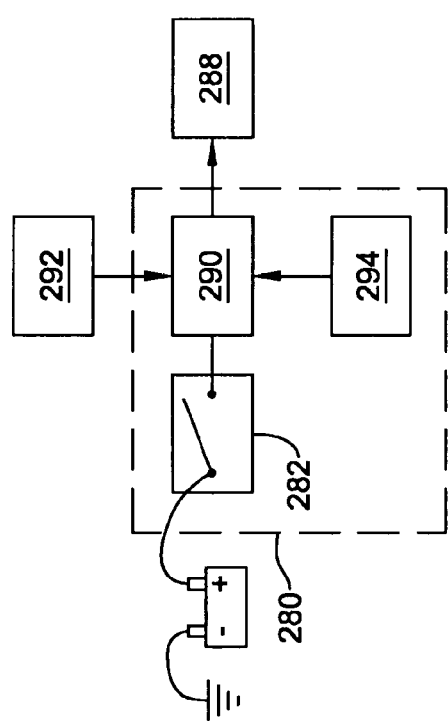
FIG. 19C is a diagram illustrating another exemplary functionality of a control system for use with the pumping system of FIG. 18.

FIG. 19C schematically illustrates another exemplary configuration of control system 205 used with pumping system 200. The control box 280 may include an on/off switch 282 controlling power to processor 290. A user interface 294 communicating with processor 290 may allow a user to input information into processor 290. For example, a user may be able to input or select a desired flow rate and/or a desired ratio of first fluid 211 to second fluid 221 for an application. The processor 290 may process the information to determine the necessary rotational speed of the first drive shaft 24 and/or the second drive shaft 34 to attain the desired flow rate and/or desired ratio of first fluid 211 to second fluid 221. The processor 290 may send a signal to speed control module 288 to control the speed of motor 22 and/or the speed ratio through transmission 30 necessary to attain the desired flow rate and/or desired ratio of first fluid 211 to second fluid 221. In some embodiments, processor 290 may include a digital-to-analog converter (D/A converter) to convert a digital signal from processor 290 to an analog signal sent to speed control module 288, or speed control module 288 may convert the signal to an analog signal to send to motor 22 and/or transmission 30.

In this configuration, signals from the speed/rate counter 292 are input into processor 290. For example, in some embodiments an analog signal may be sent to processor 290 from speed/rate counter 292. The processor 290 may include an analog-to-digital converter (A/D converter) to convert the inputted signals. In other embodiments, a digital signal may be sent to processor 290 from speed/rate counter 292. The processor 290 may process the signals and send an output signal to speed control module 288 to further control the speed of first drive shaft 24 and/or second drive shaft 34 of motor assembly 20. In some embodiments, speed control module 288 may adjust the motor speed and/or the ratio through transmission 30 to attain the desired rotational rates of the first drive shaft 24 (powering the first pump 12) and the second drive shaft 34 (powering the second pump 14) to attain the desired flow rate of a desired ratio of first fluid 211 to second fluid 221.

Thus, in such embodiments, the user interface 294 may be used to indicate to the processor 290 a desired flow rate at the proportioned output 261 and/or a desired ratio of first fluid 211 to second fluid 221 at the proportioned output 261. The processor 290 may then signal the speed control module 288 to adjust the speed of the first drive shaft 24 and/or the second drive shaft 34 accordingly, to attain the desired flow rate and/or fluid ratio at proportioned output 261. In some embodiments, the speed/rate counter 292 may provide feedback to processor 290 for evaluation to determine if the desired speed and/or flow rate has been attained.

In other embodiments, the control system 205 may be used to adjust the flow rate of the fluid mixture at the proportioned output 261 relative to the ground speed of a vehicle using the pumping system 200 to apply a fluid mixture during an application process to ensure that a desired quantity of the fluid mixture is applied, regardless of the ground speed of the vehicle during application. In such an embodiment, the speed of motor 22 may be varied according to the ground speed experienced in order to ensure a constant quantity of the mixture is applied per area covered. Thus, the proportion or ratio of first fluid 211 and second fluid 221 in the fluid mixture at the proportioned output 261 may remain constant while the flow rate of the fluid mixture may be adjusted according to the ground speed of the vehicle. In such an embodiment, a pressure transducer 284 may be utilized to ensure that the pressure at the proportional output 261 remains constant as well.

One of skill in the art, in view of the above discussion of various pumping systems utilizing a pump assembly as described, would appreciate that other pumping system configurations and arrangements may be possible. For example, various components of a pumping system utilizing a pump assembly as described may be fluidly coupled together using hoses, pipes and/or fluid conduits extending between a fluid outlet of a first component to a fluid inlet of a second component to achieve a desired pumping system.

The following is one exemplary system operation description for an alternative embodiment Absolute Proportioning Pump (APP) 500 illustrated in FIGS. 20-23, which might incorporate a pump similar to pumps 12, 14 described herein above with reference to the previous embodiments. Most preferably, APP 500 illustrated in FIGS. 20-23 will incorporate tanks and a framework of size appropriate to be portable or readily supported upon a cart or vehicle. APP 500 incorporates two liquid tanks 510 and 520, and while the particular liquids are not critical to the present invention, in a typical configuration tank 520 might for exemplary purposes contain water 521 therein, while tank 510 might for exemplary purposes contain a technical material 511 therein. Technical material 511 will be understood to be any suitable material for a given application, and so may, for exemplary purposes and not solely limiting thereto, comprise such diverse liquids as herbicides, pesticides, insect repellants, soap or detergent solutions, enzymes, sanitizers, fire retardant or control solutions, or other liquid dispersions, solutions or other materials.

Technical material 511 can flow in the direction of flow arrow 512 through solenoid valve 532 and into pump inlet 513. Pump motor 22 drives transmission 30, as has been described herein above, to cause pump 12 to pump liquid from inlet 513 to outlet 514, in the direction of flow arrow 515. Between technical material pump outlet 514 and water pump inlet 523, a pressure regulating check valve 552 is provided that maintains a minimum pressure at technical material pump outlet 514. This may, for exemplary purposes, be achieved by providing a spring and ball check valve having a sufficiently powerful spring that a minimum pressure differential is required for actuation thereof. To maintain the desired absolute proportions that APP 500 is capable of, this combination of minimum pressure differential is essential as arranged. Otherwise, with a simple one-way check valve having an insignificant pressure differential, water pump inlet 523 may produce some suction, leading to a draw of technical material through pump 12 from pump inlet 513 to pump outlet 514.

Figure 20:
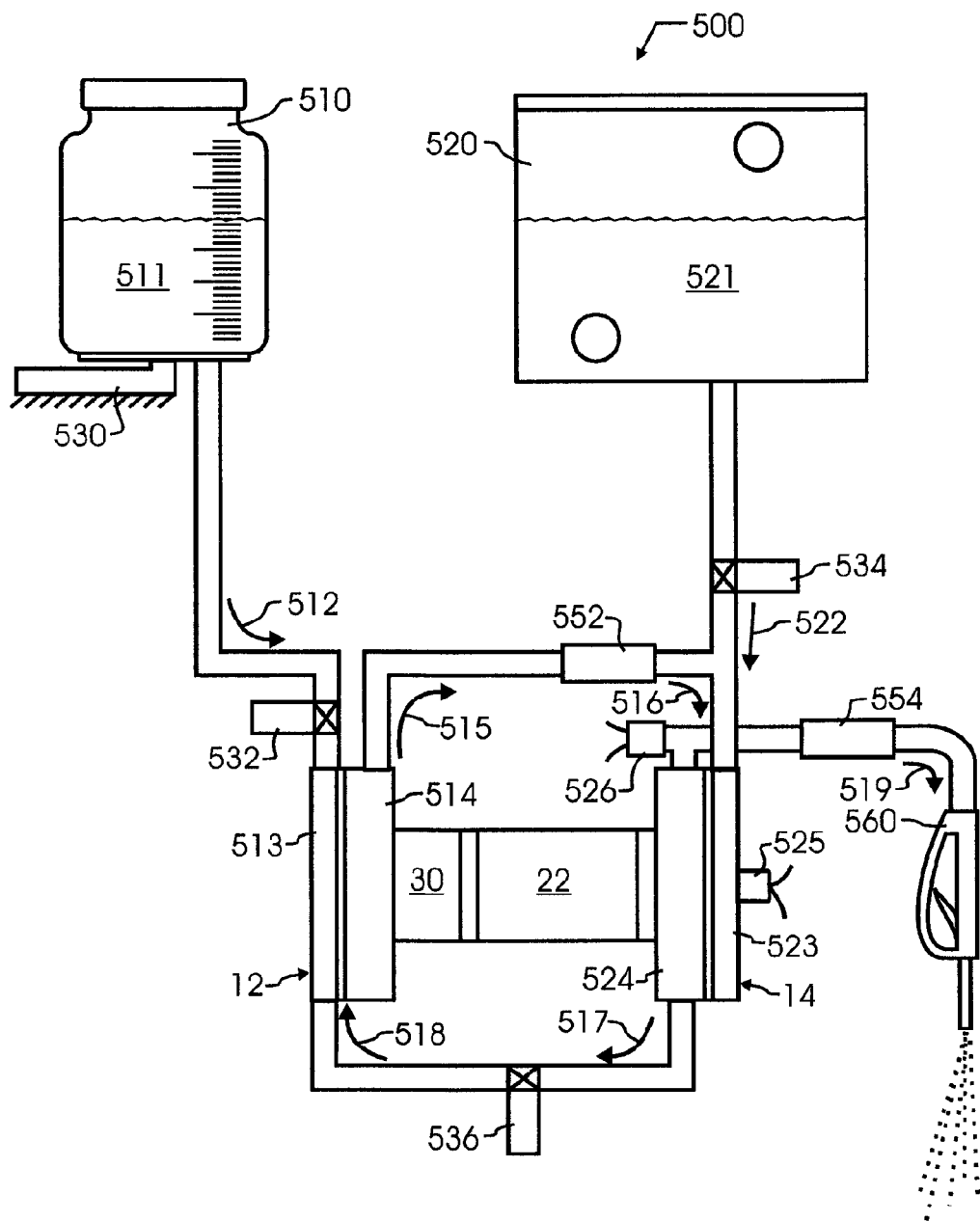
FIG. 20 illustrates another alternative embodiment proportioning pump, control systems and applicator apparatus diagrammatically.

Water 521 may flow from tank 520 through solenoid valve 534 in the direction of flow arrow 522 and into pump inlet 523. Since both technical material 511 and water 521 are drawn into pump 14, pump 14 acts as a powerful mixer, throughly agitating and blending the two liquids together. During normal operation, the proportioned liquids are pumped from pump outlet 524 through outlet check valve 554 in the direction illustrated by flow arrow 519, and out through spray nozzle 560. While water may flow from pump outlet 524 through solenoid valve 536 in the direction of flow arrows 517 and 518 as shown in FIG. 20, during normal operation solenoid valve 536 is closed, as illustrated by the "run" illustration of FIG. 22. This prevents the flow of fluid from pump outlet 524 to pump inlet 513. A pump speed proximity switch 525 may be used to detect the speed of motor 22, where the motor speed is controlled to attain a particular desired flow rate. Additionally, pump speed proximity switch 525 may also be used, if desired, to detect a failure condition when motor 22 fails to rotate. System pressure switch 526 may also be used to monitor for over-pressure, such as when spray nozzle 560 is closed, and through electrical or electronic control be used to regulate the speed of motor 22, or to stop motor 22 completely if required or appropriate.

Desirably, tanks 510 and 520 are at an equal or nearly equal height, and technical material 511 and water 521 will have similar head heights. Also preferred is to have pump inlet 523 as nearly in line and below the outlet from tank 520 as possible, and to have pump inlet 513 below and as nearly in line with the outlet from tank 510 as possible. With the pumps below, and with equal head for both pump inlets 513, 523, the proportioning will be most precise. Further, by keeping pump inlets below and in line with tank outlets, there is much less chance for air or other gasses to accumulate and become trapped in the lines or system components.

Figure 21:
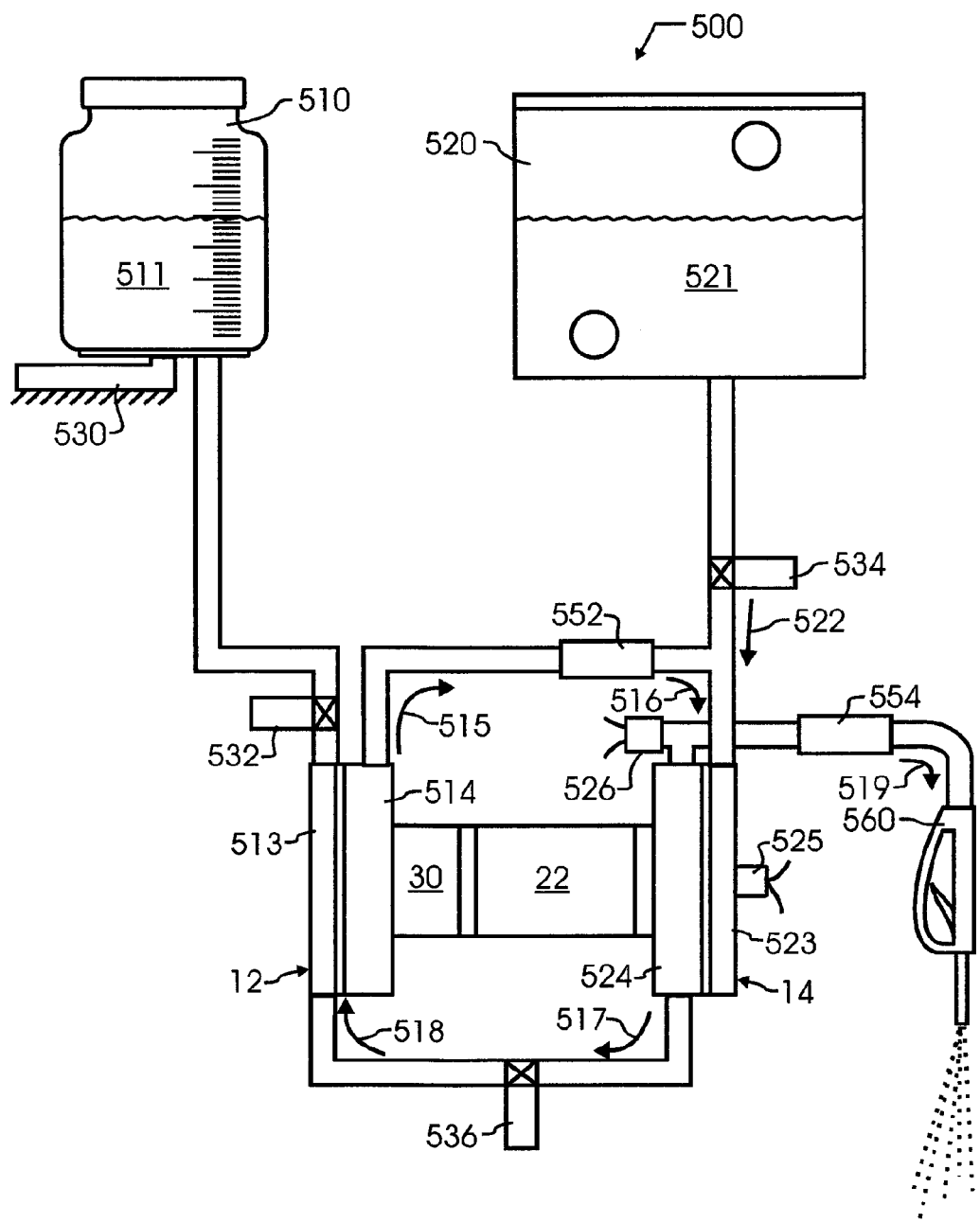
FIG. 21 illustrates a purge cycle for the alternative embodiment proportioning pump, control systems and applicator apparatus of FIG. 20 diagrammatically.
Figure 22:
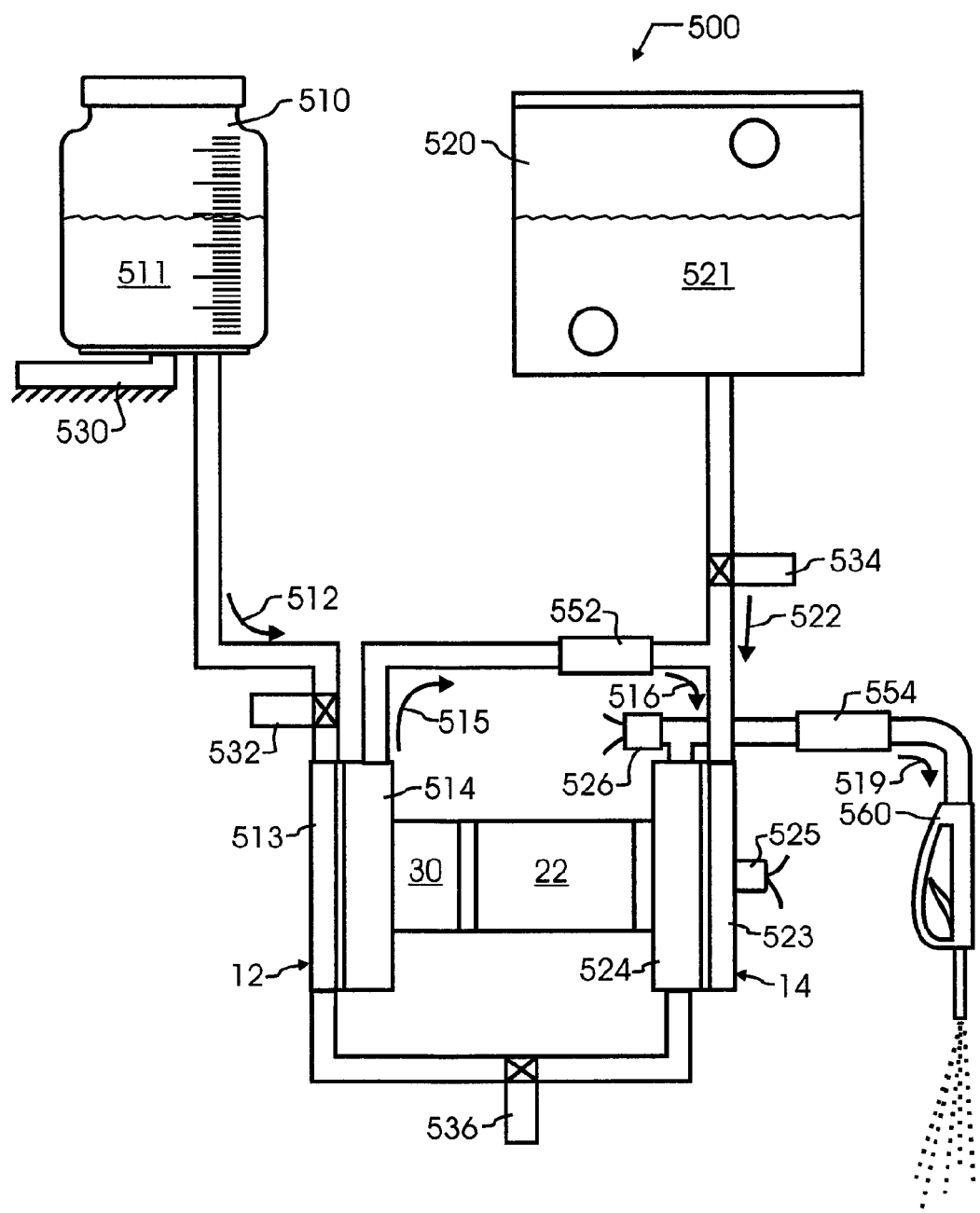
FIG. 22 illustrates a run cycle for the alternative embodiment proportioning pump, control systems and applicator apparatus of FIG. 20 diagrammatically.
Figure 23:
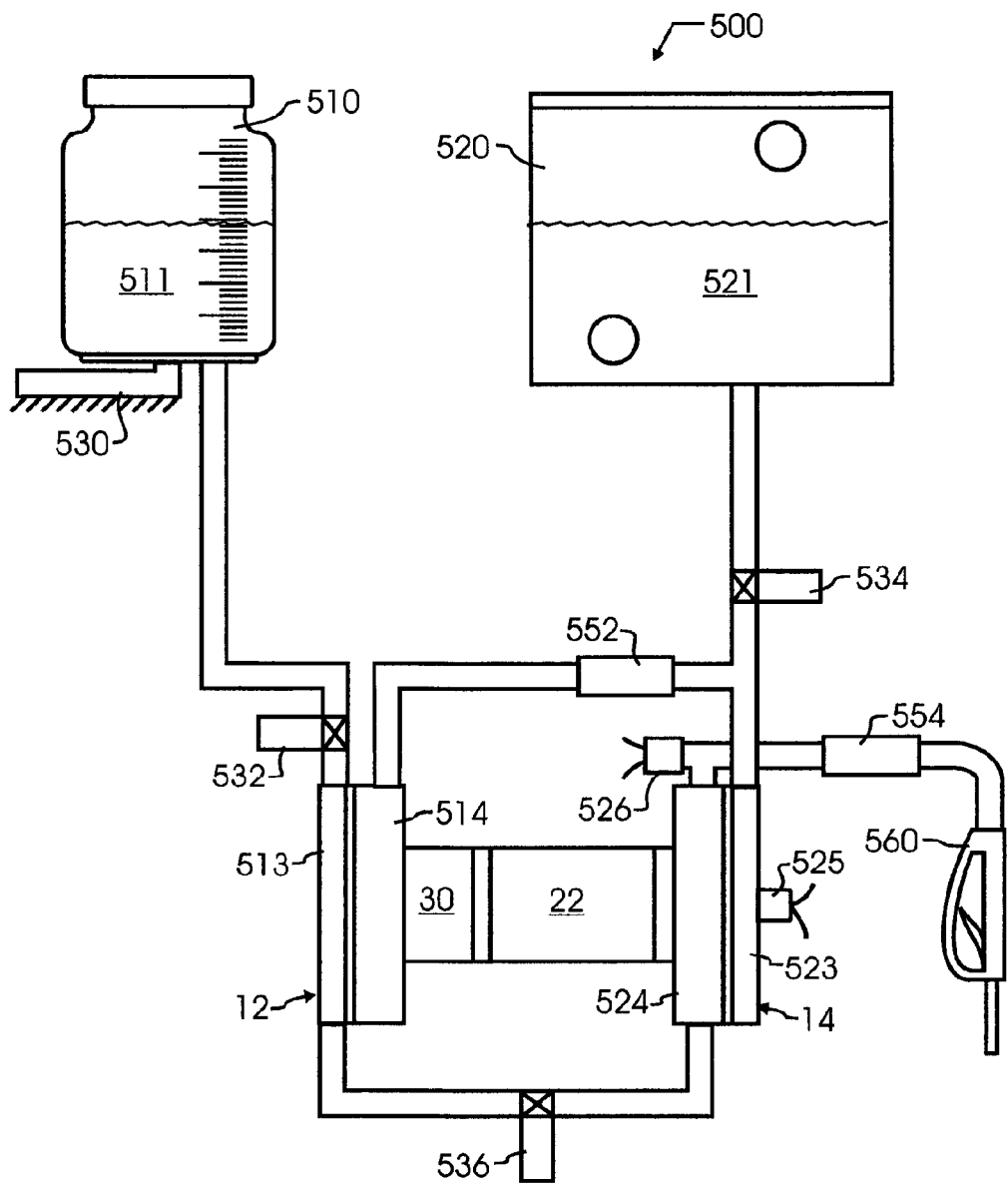
FIG. 23 illustrates a trigger release pump stop cycle for the alternative embodiment proportioning pump, control systems and applicator apparatus of FIG. 20 diagrammatically, which corresponds also with a technical material (concentrate, or solution to be diluted) stop when there is a problem with the technical material, for the alternative embodiment proportioning pump, control systems and applicator apparatus of FIG. 20 diagrammatically.

FIG. 21 illustrates a flush/purge cycle which might be used either just prior to initiating an application of proportioned water 521 and technical material 511 through nozzle 560, or just subsequent thereto. In the case of just prior, the purpose is to purge pumps 12, 14 and associated lines, hoses, valves and other fluid-containing conduits and apparatus of any air bubbles or other foreign matter or residual fluids that might be entrained therein. Air in particular is quite compressible, and so any air entrapped within pumps 12, 14 may substantially alter the desired proportions between technical material 511 and water 521. To remove the air, solenoid valve 532 is closed, preventing flow of technical material into pump inlet 513. Solenoid valves 534 and 536 are opened, allowing water to circulate in the direction of flow arrow 522 into pump inlet 523, and from there through pump 14 to pump outlet 524. With solenoid valve 536 open, water 521 will pass through both check valve 554 and also into pump inlet 513. Pump 12 will pump water 521 through pump 12 to pump outlet 514, and on in the direction of flow arrows 515 and 516 back to pump inlet 523. The agitation brought on by the operation of motor 22, transmission 30 and pumps 12 and 14, when combined with the flow of water 521, will ordinarily be more than adequate to purge the lines of any air or other foreign liquids or gases that might have become trapped in the lines, pumps and other components. As may be apparent, this same solenoid valve arrangement may be used just subsequent to application of a proportioned technical material 511 and water 521 solution, to rinse all remnants of technical material from pumps 12 and 14. Additionally, APP 500 will preferably be designed such that pump inlets 513 and 523 are either vertical or at least offset from horizontal, such as at a 45 degree angle thereto. This further facilitates the release of air, since relatively small vibrations will cause the bubbles to rise up and into tanks 510, 520 and out of pumps 12 and 14. FIG. 23 illustrates a trigger release pump stop cycle for APP 500. When an operator releases the trigger for spray nozzle 560, then system pressure switch 526 will respond to the natural increase in pressure. This can be used to electrically or electronically close each of the three solenoid valves 532, 534, 536 and to disconnect power from motor 22. As a result, all flow and pressure generation is discontinued until the operator begins spraying again, thereby reducing pressure and resetting system pressure switch 526. An identical solenoid valve closure and pump disconnect occurs when a condition is detected suggesting that technical material 511 has failed. This could, for exemplary purposes only and not solely limited thereto, be a condition such as an empty tank 510, that might for exemplary purposes be electronically detected by a load cell or the equivalent 530. A similar load cell and logic may, if desired be provided for tank 520. If other means are provided to detect flow of technical material 11 into pump inlet 513, such as a flow rate detector, fluid pressure switch, optical detector or any other suitable detector, then a detection of no flow would be used to trigger the same solenoid valve closures and pump motor disconnect. In an alternative embodiment, load cell 530 may be used to calculate usage based upon weight change over time, and if usage rates are significantly outside of an expected rate, the same shutdowns can be initiated. If so provided, an error condition may also be signaled.

In an alternative embodiment, tank 510 may be provided as a fabricated container that is sealed with the technical material contained therein for shipping and delivery of the technical material. In this embodiment, tank 510 will have some type of permeable connection, such as a foil seal, puncture site, or other suitable coupling, and will be engaged directly into APP 500 and will rest upon load cell 530, just as tank 510 does. Particularly where a control system is provided such as control system 205 described herein above, indicia such as a bar code or RF ID tag found on a typical commercial package may be read either prior to or more preferably upon insertion into APP 500. This introduction of new technical material may then be recorded, and, where desired, the particular proportioning recommended by the manufacturer may then be automatically used without further adjustment by an operator.

Also in the embodiment illustrated in the Figures, tank 510 may preferably be provided with liquid level graduations. An opening through a case wall will preferably expose these level graduations, so that an operator can also visually observe the level and change of level of technical material without having to stop or open the cover to tank 510. Alternative embodiments will provide sight glasses, electronic level detectors and displays, or any other suitable and appropriate method of conveying technical material level. Water tank 520 may optionally be provided with similar visual cues, if so desired.

For exemplary purposes only, and not solely limited thereto, a typical system operation is as follows.
I Preliminary Setup and Conditions
Check level of TM in tank (Fill TM tank if required)
Plug in
Attach hoses
Water: turn ON at spigot
II Normal Operation
Master switch to ON note: enables pump and electronics; starts purge yes/no timer
Level switches high indicating fluid in respective tanks
Record real time start time (record actual clock time outside of system)
Zero the job timer by engaging key switch
    (this timer adds up the "trigger open" times=pump run times−purge time)
    NOTE accumulated time stays on display until job timer is switched off, then back on again. Not affected by unplugging unit
Pump enable switch ON (dispense wand trigger must be closed (no flow))
    IF T3 TIME SINCE LAST DISPENSE IS LESS THAN T=30 MIN NO PURGE IS NECESSARY AND SKIP THIS STEP. OTHERWISE:
One time auto purge event:
    starts air purge timer
    plc display reads "PURGE CYCLE, PLEASE WAIT" flashes
    solenoid valve 532 closed, 534 and 536 set to open pump runs
    timer ends, pump system off
    plc display reads "PURGE CYCLE, COMPLETE DISPENSE SYSTEM ENABLED"
System Ready Trigger Off Condition
    pressure switch 526 senses high pressure, shuts pump off
    note: locks up high pressure until trigger is open.
System Ready Open Trigger (flow)
    pressure switch 526 senses pressure drop and starts pump
Speed (Flow) May be Adjusted as Required
    With trigger open and pumps running adjust pump speed control for desired flow output or pressure reading, if feature provided
Close Trigger Condition
    pressure switch 526 senses high pressure shuts pump off
    note: locks up high pressure until trigger is open.
III Temporary Shutdown for Job Interruption or Break, Etc
    turn off pump enable switch and remove key
IV Job Complete/System Shutdown:
    release trigger (pumps stop due to system logic s/a normal operation)
    pump enable switch OFF (so pumps cannot restart automatically)
    water source OFF. disconnect feed hose and stow
    take end of job readings:
        Write down job run time on work order and zero the job timer
        clock time/date, system run time & TM use.
(note: Can be done manually or electronically through readouts, printouts or download. Download is tamper proof and might be appealing to franchise operators to keep tab of jobs. This could be real time or at end of job/day)
    master switch OFF
    drain water tank (optional)
        empty TM tank (save for re-use) optional
        trigger on (to depressurize dispense hose, but do not drain)

disconnect and stow dispense hose (check valve & trigger valve keep hose full)

manually secure TM tank openings to prevent tip over leaks (note: this could be automatic using ball check vent caps.)

Also note that a purge cycle as in FIG. 21 can be executed.

end of system operation description—

APP 500 provides a portable apparatus that can be used to ensure that particular requirements or regulations have been met. In one contemplated embodiment, a GPS or other similar location determining apparatus may be combined with either sprayer 560, in which case movements and dwell time of an operator during application can be monitored, or more commonly the GPS may be combined with an electronic control system of APP 500 at the base unit defined by pump 22 and liquid tanks 510, 520, in which case time at a particular job site may be monitored, along with information on quantity of technical material 511 applied.

This can be critical for some applications, particularly where closely regulated technical materials are being applied. For exemplary purposes only, the proper application of insecticide is critical to the prevention of termites. A proper insecticide, when properly applied, can provide the necessary protection for a dwelling to permit an insurance policy to be obtained against future termite damage. However, a careless operator might not actually apply the insecticide to the dwelling. This could be disastrous to the dwelling, which can be destroyed by termites. Further, the insecticides commonly used are tightly regulated by US federal regulations. If the operator is not properly applying them, the operator might alternatively be illegally dumping the chemicals. By tracing and either recording position and product consumption or relaying position and product consumption through a communications channel, the activities of the operator may be more closely tracked to help ensure operator compliance. Once again, where a manufacturer has specified a particular dilution ratio and the technical material container, whether used directly as tank 510 or emptied into a pre-existing tank 510, APP 500 may be programmed to automatically apply at that rate.

While a large variety of pumps and pumping apparatus are known, the ability to precisely dilute technical material 511 to the very low concentrations enabled by the present invention is highly desired. Prior art systems by artisans skilled in the art of insecticide application use different pumps and different tank arrangements than those illustrated herein, and as a result are not able to accurately and precisely control dilution, making very high dilution ratios as accurately achieved in the present invention impossible to achieve in the prior art. Further, preferred embodiment APP 500 is readily rinsed during a rinse cycle, meaning the lines may be flushed prior to leaving the job site, thereby helping to ensure that technical material is only placed where desired.

Furthermore, for other applications such as the proportioning of foaming materials, it is critical not to draw air or other gases into the system. In these cases, both viscosity and volume may change substantially, making accurate proportioning and proper dispensing nearly impossible.

The various embodiments illustrated herein above provide illustration of very flexible and diverse pumping systems that have particular applications in industry not well served theretofore. Nevertheless, these systems require construction not only of the motors, pumps, tanks, and fluid lines, but also particular housings and supports for each particular application. This means that each intended purpose or use for a pumping system, or different specifications set forth by an Original Equipment Manufacturer (OEM), may require an original or custom designed housing and support. For individual customers desiring high volumes of absolute proportioning pumps or other pumping systems taught herein, this custom design is certainly cost-justified. However, there are other applications where it would be very much preferred to have a standard or stock APP that could be easily applied to or incorporated within a third party housing or case, while still preserving the benefits of the various features described herein above.

In order to achieve this objective, three different pumping systems that may be efficiently built and sold as stock systems for incorporation into OEM housings are illustrated herein and described herein below, depending upon the needs of a particular customer or industry. One APP system may preferably operate at a fixed ratio between technical material 511 and diluent 521 such as water. While such systems have been extensively described herein above with respect to various embodiments, the particular configuration of the pump, motor and solution tank referred to herein as a split pump using two tanks creates a more compact and efficient APP system than was heretofore attainable. Another APP system may preferably provide at least one pump referred to herein below as an injection slave that is electronically linked to another pump, the slave using the same or similar novel solution tank as the fixed ratio APP. A third APP system may preferably provide at least one pump that is controlled to selectively direct individual pump stroke outputs to vary the pump flow rate as desired and controlled, referred to herein as a sequential injection system.

Figure 24:
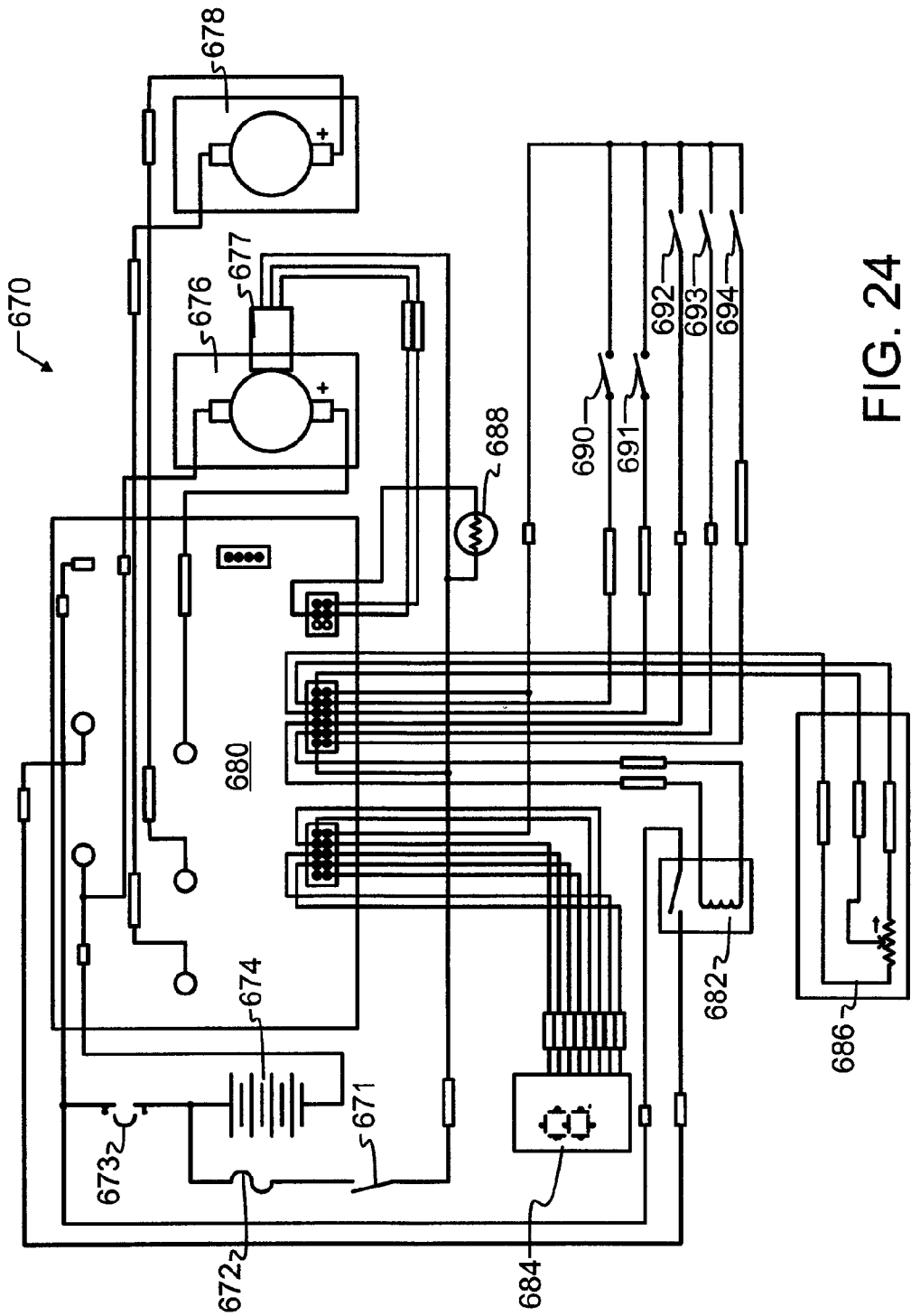
FIG. 24 illustrates a basic schematic for an injection slave embodiment designed in accord with the teachings of the present invention.
Figure 25:
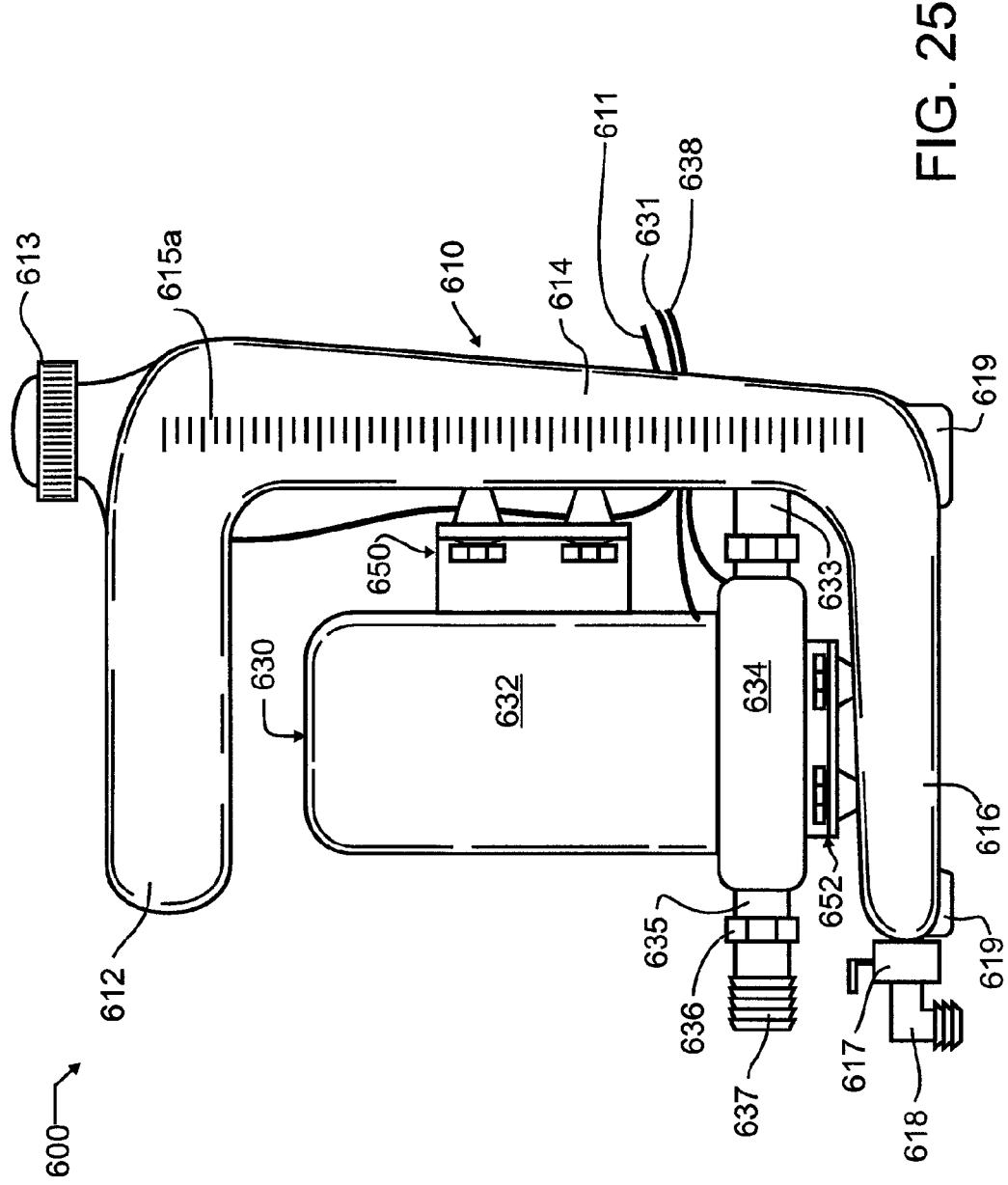
FIG. 25 illustrates a right side view of a preferred embodiment auxiliary injection slave pump operative in the injection slave embodiment of FIG. 24 from a right side view.

FIG. 24 illustrates a basic schematic for a preferred embodiment injection-slave embodiment control system 670. As illustrated therein, a key switch 671 is used to connect power such as provided by batteries 674 or other suitable source through fuse 672 to a suitable control component or system associated with motor 676. This connection then provides the initiation of an electrical or electronic control box 680 that includes appropriate circuitry and a plurality of appropriate electrical connectors, the details which are not critical to the present invention and exact construction which may readily be determined by a person reasonably skilled in the field of electronics upon a review of the present disclosure. Control box 680 monitors a suitable indicator of the flow rate of water generated by rotation of motor 676. Using a positive displacement pump such as illustrated herein and described herein above, a proximity detecting switch 677 may be inserted into the pump head such as pump 12. This proximity detecting switch may, for example, be inserted into the gap between first housing block 40*a* and second housing block 40*b* illustrated in FIG. 3. If so inserted, this switch will most preferably sense the proximity of cam 52 and bearing 54 thereto. Each rotation of cam 52, due to the eccentric mounting, will bring an outer diameter defined by bearing 54 closer to and then farther from the proximity switch, thereby for exemplary purposes opening and closing the proximity switch once for each revolution.

The output of proximity switch 677 is coupled back to control box 680, which in turn generates a signal operatively driving motor 678 either in synchronization with or in a desired speed ratio relative to motor 676. This allows motor 678 to, in accord with the term generally used in the electrical art, be slaved to motor 676. As a result, for a given number of piston displacements in a pump driven by motor 676, a predictable number of piston displacements will occur in a pump driven by motor 678. This also means that, for a suitable positive displacement pump such as illustrated herein above, there will be a predictable and precise proportion or ratio of fluids delivered by the two pumps. Consequently, with some combination of stroke volume ratios between the two pumps driven by motors 676, 678, and with some predetermined speed control ratio produced by control box 680, a predictable volume of mixed and properly proportioned fluids may be delivered from these pumps.

A variety of ancillary components may optionally be provided or incorporated into an APP system of this configuration. For example, a pressure sensor 688, a relay 682, a display 684, a water pump motor speed control 686, an auxiliary pump enable switch 690, a main pump enable 691, an up switch 692, a down switch 693 and a hose pressure switch 694 may each optionally be provided, as may any other suitable and desired components.

While in the illustration of FIG. 24 only one slave motor 678 is illustrated, more than one motor may further be slaved to water pump 676. Consequently, where predetermined ratios are known, a plurality of liquids may be injected through a plurality of slave motors similar to slave motor 678, each controlled by control system 670. Furthermore, with appropriate logic an operator may be permitted to select exclusive pumping from either water motor 676 or any slave motor 678 as desired or selected.

Figure 26:
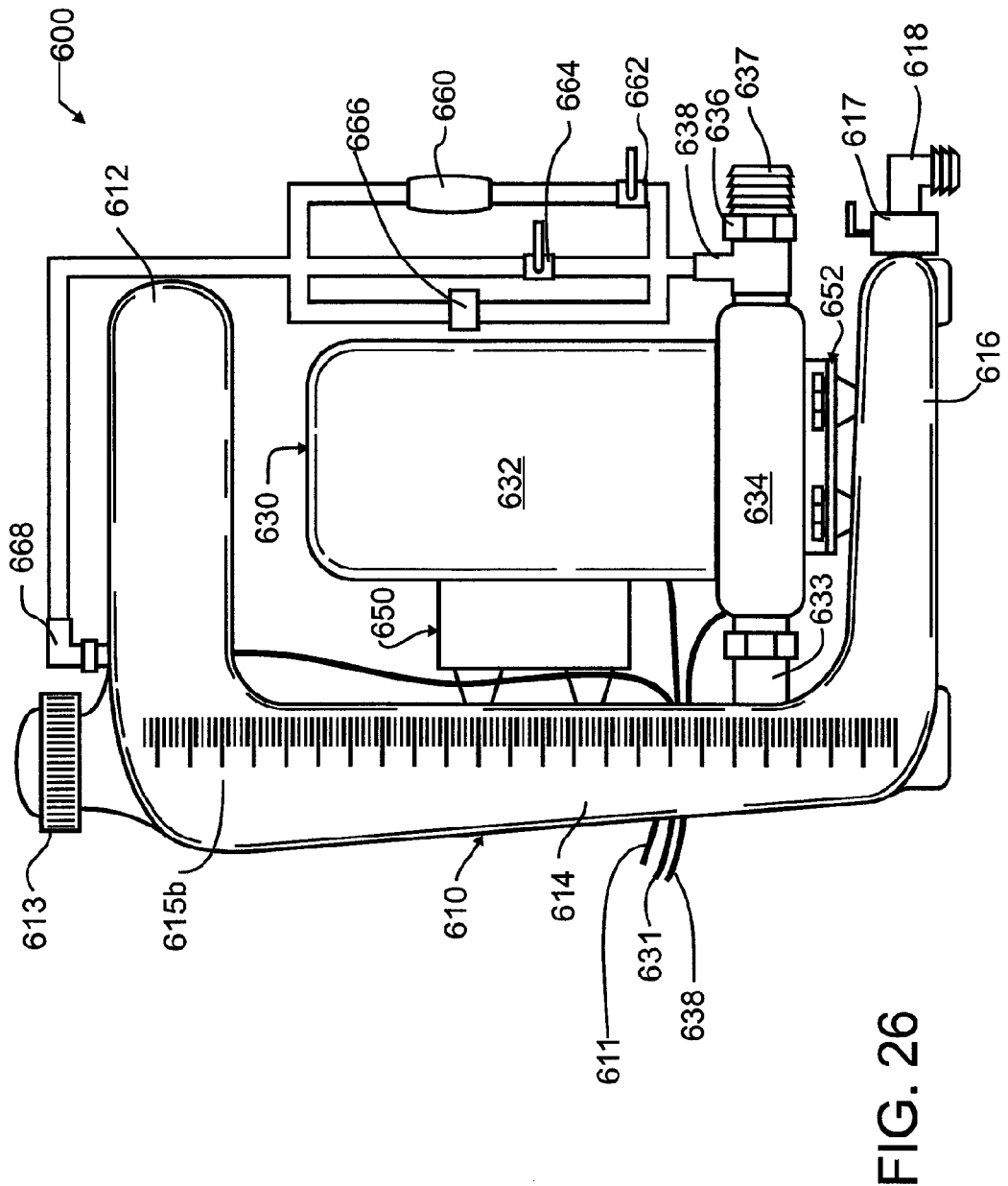
FIG. 26 illustrates the preferred embodiment auxiliary injection slave pump of FIG. 25 from a left side view.
Figure 27:
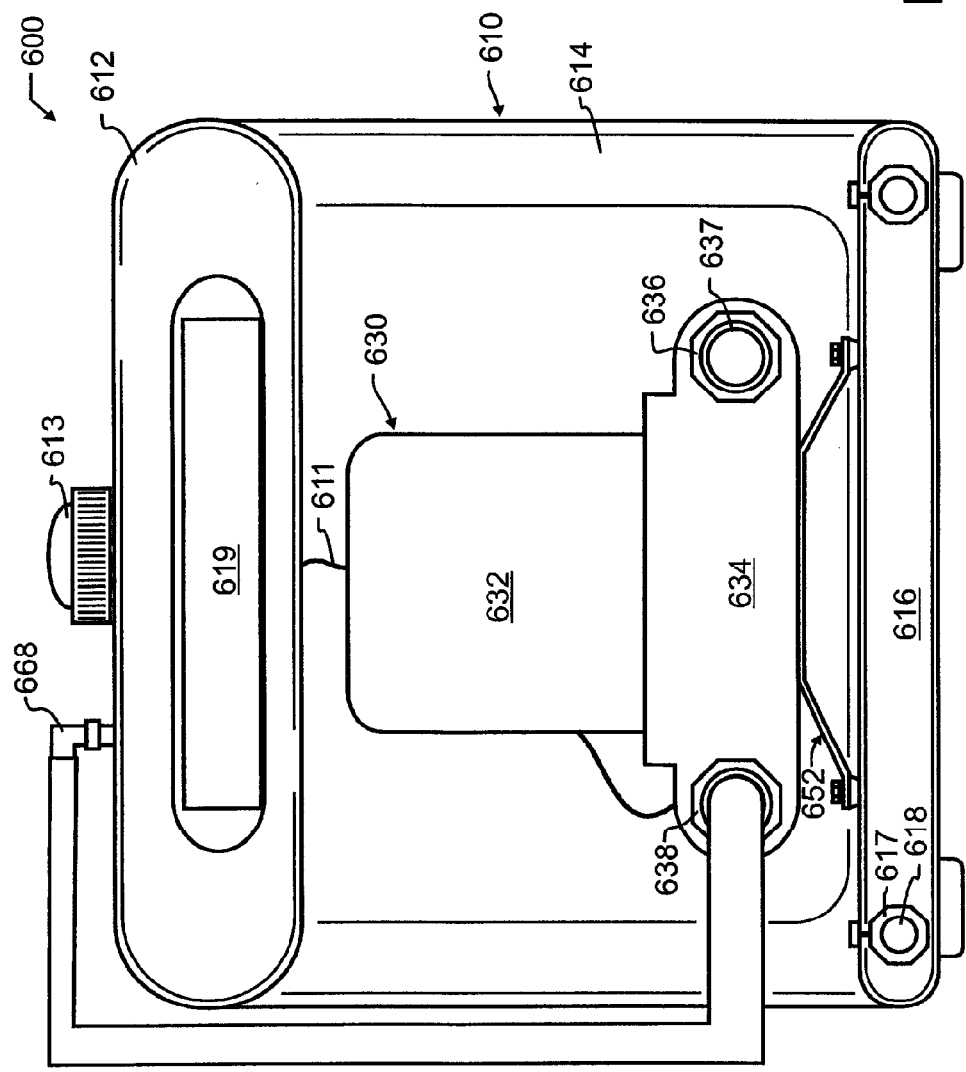
FIG. 27 illustrates the preferred embodiment auxiliary injection slave pump of FIG. 25 from a front view.
Figure 28:
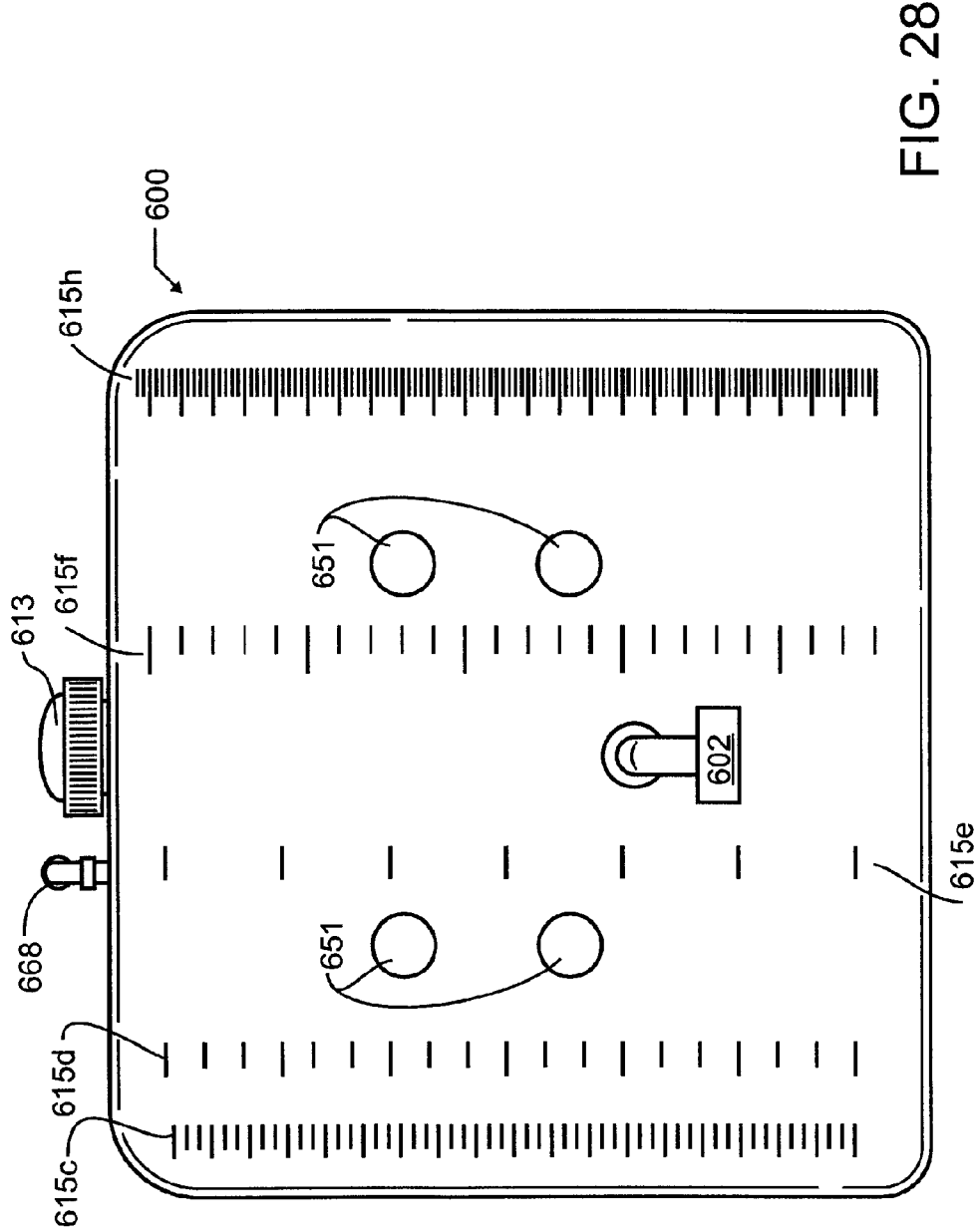
FIG. 28 illustrates the preferred embodiment auxiliary injection slave pump of FIG. 25 from a rear or back view.

FIGS. 25-28 illustrate a preferred embodiment injection slave pump apparatus 600. A preferred liquid tank 610 defines a storage volume operative to receive and hold a liquid. The liquid may, for exemplary purposes, be introduced through a fill cap such as cover 613, which might for exemplary purposes be provided with a vent and check valve as is known in the art of liquid tank covers, to permit air to be drawn into tank 610 as liquid is pumped therefrom, but to prevent liquid from escaping through the vent. Tank 610 most preferably has an upper generally horizontal portion 612, a mid-section 614 extending generally vertically, and a lower wedge-shaped sediment bowl 616. As long as tank 610 is transparent or translucent, so that a level of any liquid retained therein may be viewed, a set of graduations that define a sight gauge 615*a* along the right side of tank 610 will preferably be provided. Similar sight gauges 615*b-h* may further be provided along the back and left sides of tank 610 as also illustrated. Similar sight gauges, while not illustrated, may also be provided and visible from the front, such as from the view illustrated in FIG. 27. The graduations, as illustrated for exemplary purposes in FIG. 28, may represent a variety of units of measure, such as fluid ounces, milliliters, gallons and so forth. An electronic display 619 may be provided at any suitable location, but as illustrated in FIG. 27 may also be inserted into a suitable recess in tank 610.

Nestled within tank 610 but external to the fluid held therein, is a pumping apparatus 630 that might for exemplary purposes comprise a motor 632 and a pump 634, similar in construction to motor 22 and pump 12 discussed herein above. The inlet 633 to pump 634 is most preferably offset above the bottom of sediment bowl 616. While this does mean that there may be a small amount of liquid that pumping apparatus 630 cannot pump from tank 610, this also means that any sediment or residue may readily be collected and drained through the operation of ball vale 617 and drain outlet 618. Furthermore, for mobile applications this also means that the preferred injection slave pump apparatus 600 may be safely and effectively operated through a relatively wide range of angular orientations with respect to gravity. Nevertheless, and with only a slight tilt from horizontal in the orientation of pump 634, which is generated by the gentle slope of the top of wedge-shaped sediment bowl 616 and may further be generated by the size of support feet 619, any air in inlet 633 will rise towards generally vertical mid-section 614 of tank 610. Likewise, any air introduced during a filling of tank 610 will likewise rise in vertical mid-section 614, thus not interfering with the proper operation of pump 634. The exact proportions and dimensions of each of the sections 612, 614 and 616 of tank 610 are not critical to the proper operation of the invention, but a larger upper section 612 provides substantial storage volume without as much vertical rise as would be required in section 614. Pumping apparatus 630 may be inserted between upper section 612 and sediment bowl 616 as a single unit, and may be fastened to tank 610 through one or more mounts 650, 652. These mounts are illustrated as comprising "L" or "U" shaped brackets and a plurality of rubber or elastomerically isolated bolt fasteners, but any suitable couplings may be provided. Preferably some type of isolation is provided, simply to reduce the forces transmitted through from motor 632 to tank 610 such as might occur upon sudden acceleration or deceleration of injection slave pump apparatus 600. Too great a force can lead to undesired damage or failures.

Through tank 610 a plurality of mounting holes 651 may be provided corresponding to mounts 650, 652, through which suitable fasteners may pass, and an additional hole or passage is preferably provided for electrical connections to pumping apparatus 630. Connecting wires for purposes such as a power line 631, a proximity switch wiring line 638, and a digital display connector cable 611 may preferably pass through the additional hole from a suitable connector 602 visible in FIG. 28. By bundling the wires, a single harness and connector 602 may optionally be provided, helping to simplify installation of injection slave pump apparatus 600 into an OEM or other housing.

Pump outlet 635 may preferably pass through a back flow check valve 636 to outlet coupler 637, which in turn may optionally connect to a common manifold, mixing chamber, or further pumping apparatus. This common manifold, mixing chamber or further pumping apparatus will preferably also couple to an output from a similar apparatus such as from water pump 676. While the schematic of FIG. 24 illustrates a water pump 676 and single injection slave motor 678, as many injection slave pump apparatuses 600 as may be required for a particular application may be provided. In other words, if there are four chemicals to be mixed with water, then there might for exemplary purposes be one water pump with proximity or RPM detection, and four injection slave pump apparatuses 600 slaved thereto. For exemplary purposes, if there are four chemicals without the need for water, then there might for exemplary purposes be four injection slave pump apparatuses 600 provided, and one of these might be linked into injection-slave control system 670 as the master unit, replacing the water unit entirely.

FIGS. 26 and 27 illustrate two alternative output arrangements coupled with pump outlet 635. In FIG. 26, a tee-coupling 638 that may further optionally be a pressure controlled valve is provided on an end of the pump 634 outlet manifold distal to outlet coupler 637. One or more of a plurality of priming apparatus may be provided, including a priming bulb 660 that is elastomeric, a ball valve or solenoid valve 664, 662 that selectively controls flow, and a pressure regulator 666, each which may be constructed to permit priming of pump 634, removal of trapped gases, and which may further provide over-pressure protection. As long as back flow check valve 636 is provided between tee-coupling 638 and outlet 637, then liquid held within tank 610 will not be contaminated by other fluids. In other words, only liquid pumped from tank 610 will pass through tee-coupling 638, and so liquid passing from tee-coupling 638 to tank inlet 668 will only be liquid that originated from within tank 610. In FIG. 27, a second output from pump 634, such as provided by the second of two outlet bores 68*a* and 68*b* described herein above, may be used for coupling to tank inlet 668. In this instance, tee-coupling 638 most preferably also comprises a pressure regulator to only activate when flow out of the first outlet bore is restricted or completely blocked.

Figure 29:
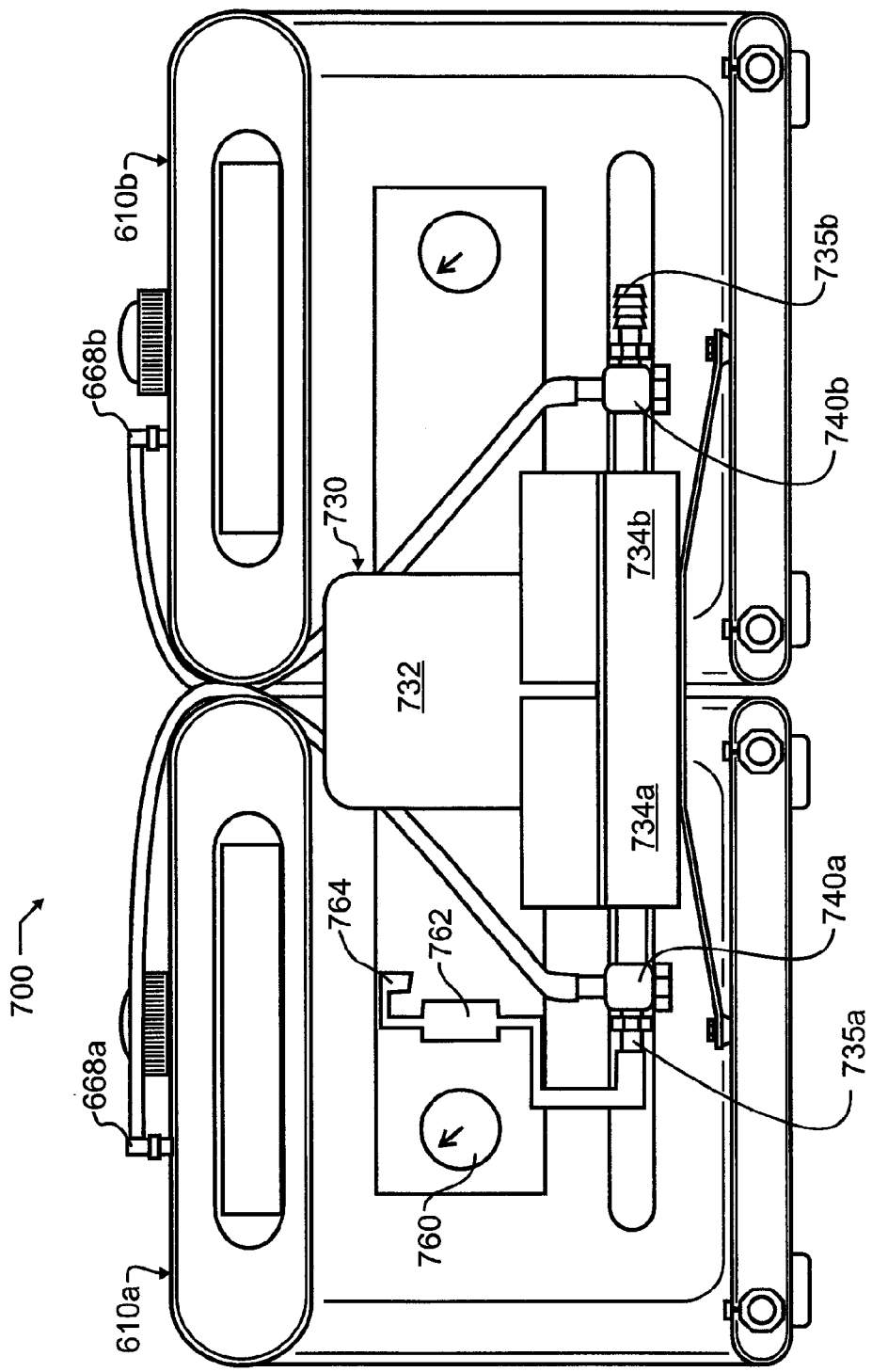
FIG. 29 illustrates a preferred embodiment split pump, fixed ration proportioning system using two source tanks from a front view.
Figure 30:
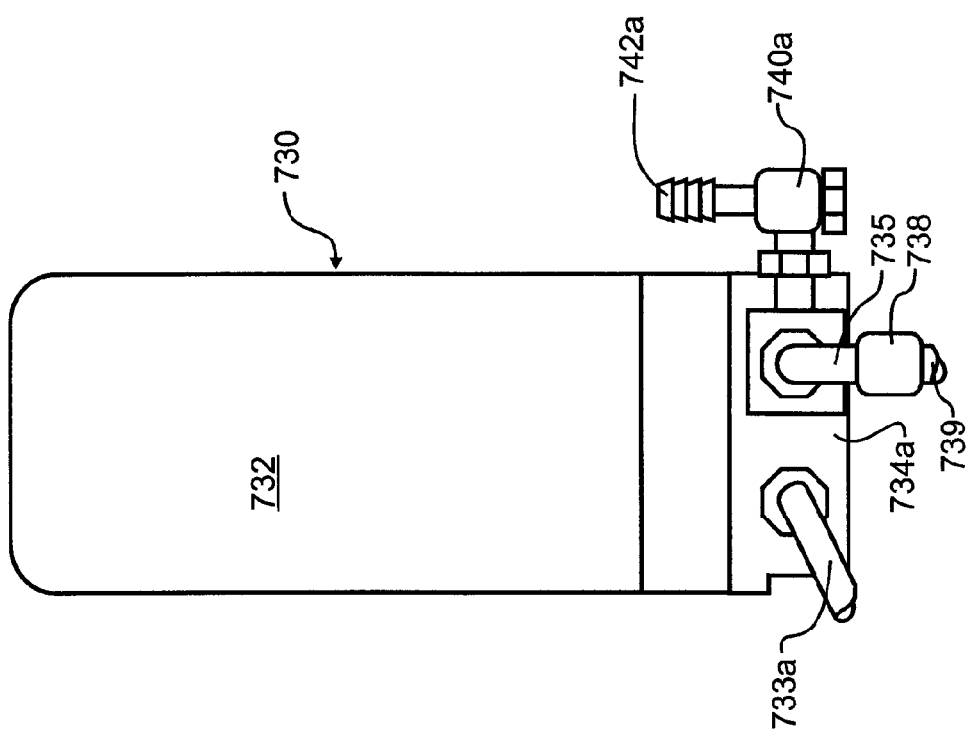
FIG. 30 illustrates a preferred embodiment split pump as used in the split pump, fixed ration proportioning system of FIG. 29 from a side view.
Figure 31:
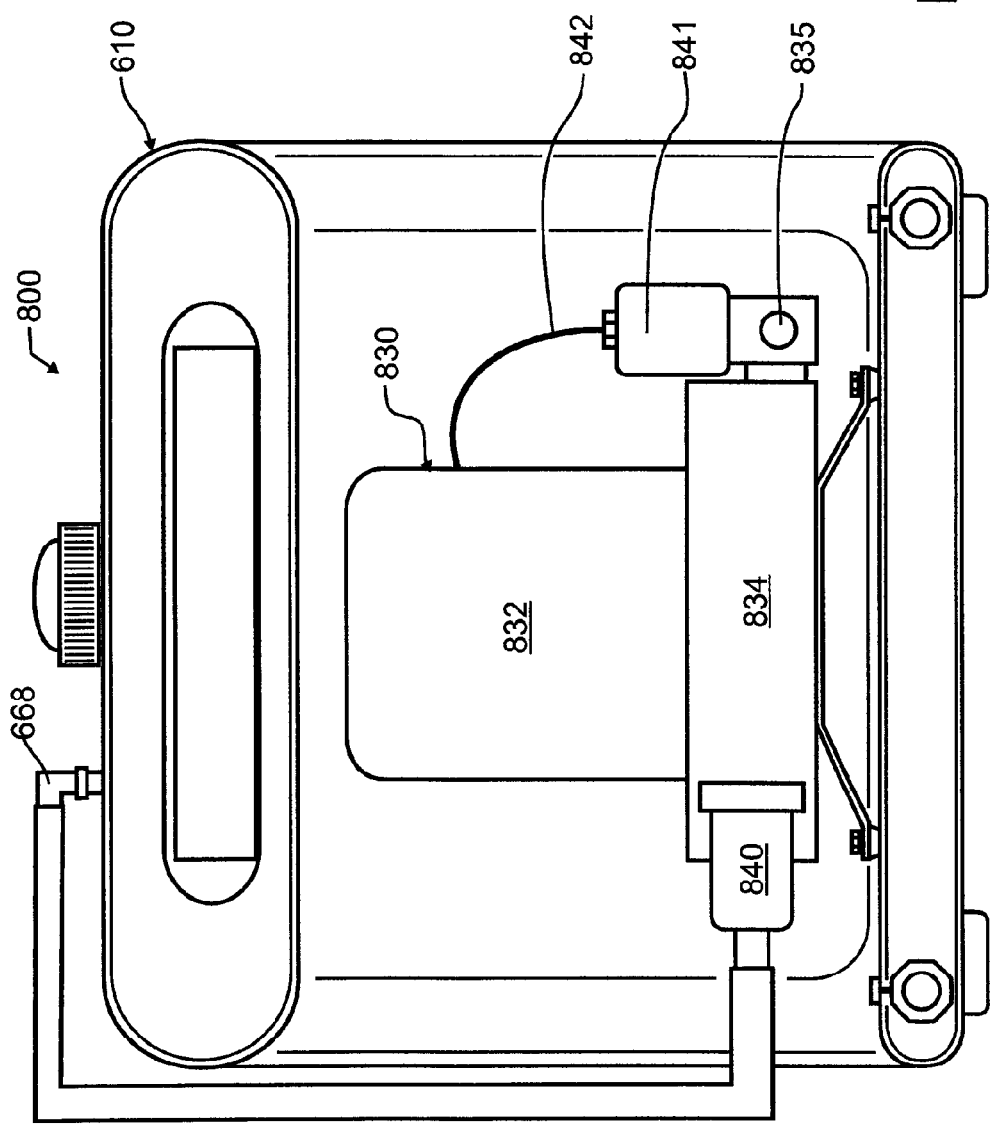
FIG. 31 illustrates a sequential injection module designed in accord with the teachings of the present invention from a front view.
Figure 32:
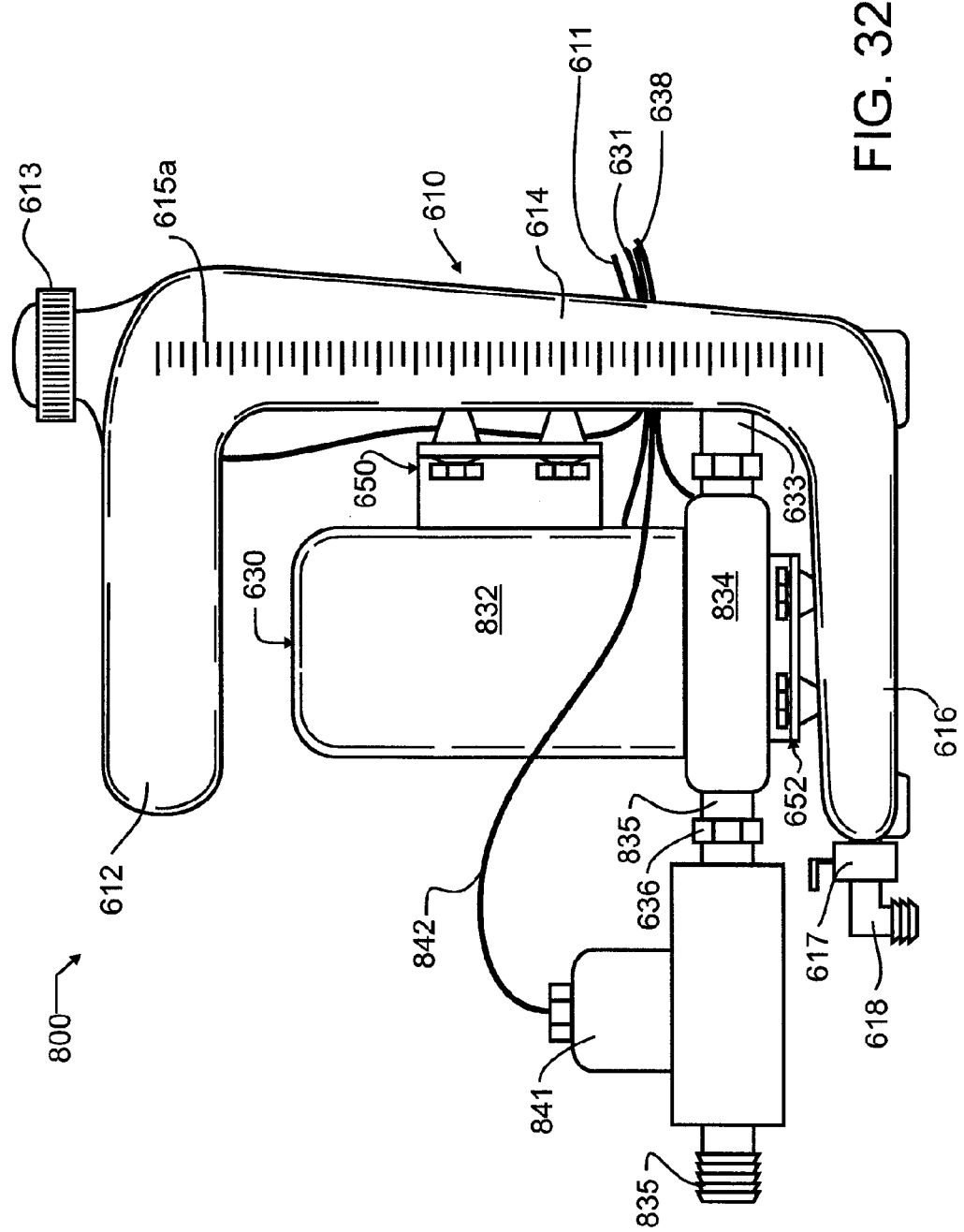
FIG. 32 illustrates the sequential injection module of FIG. 31 from a right side view.
Figure 33:
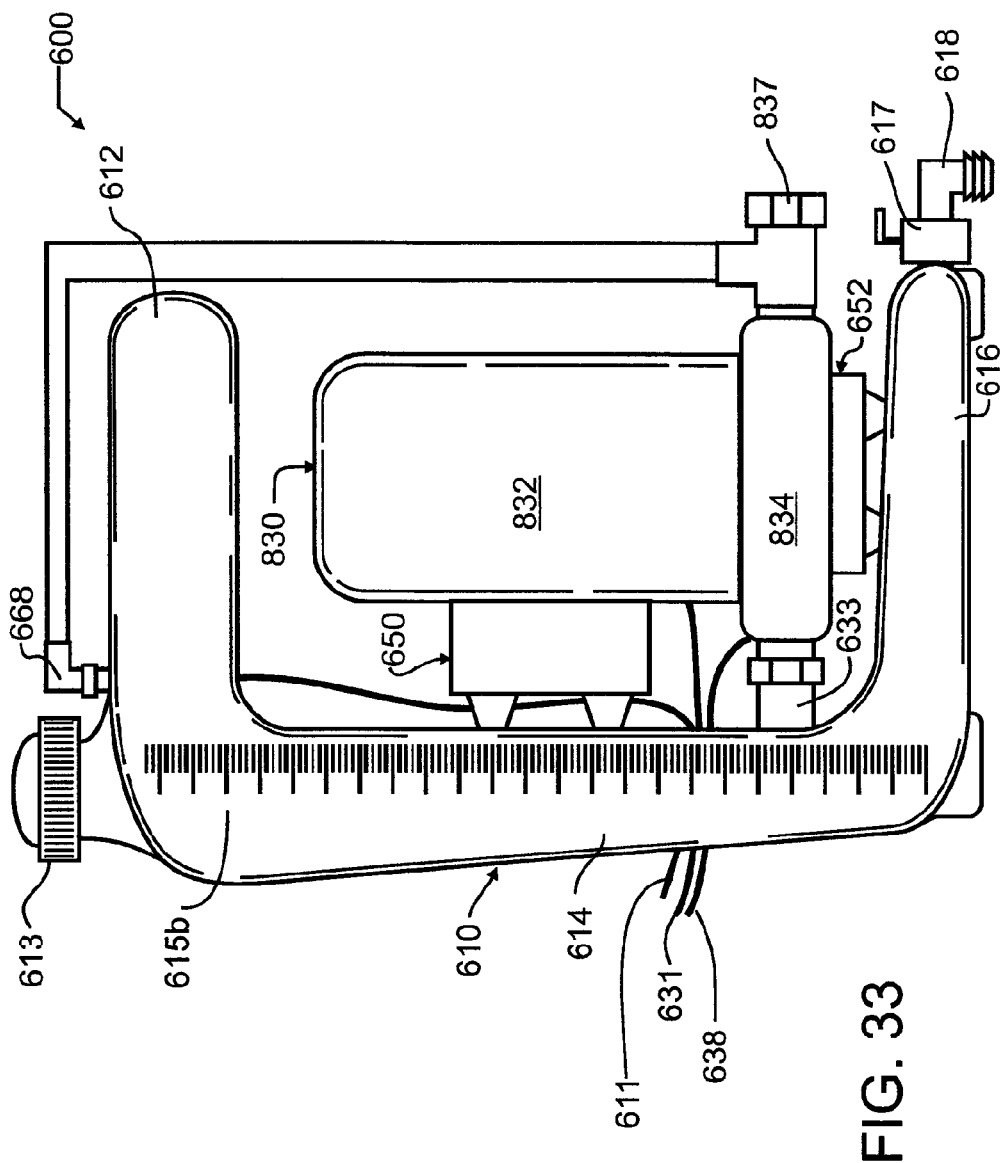
FIG. 33 illustrates the sequential injection module of FIG. 31 from a left side view.
Figure 34:
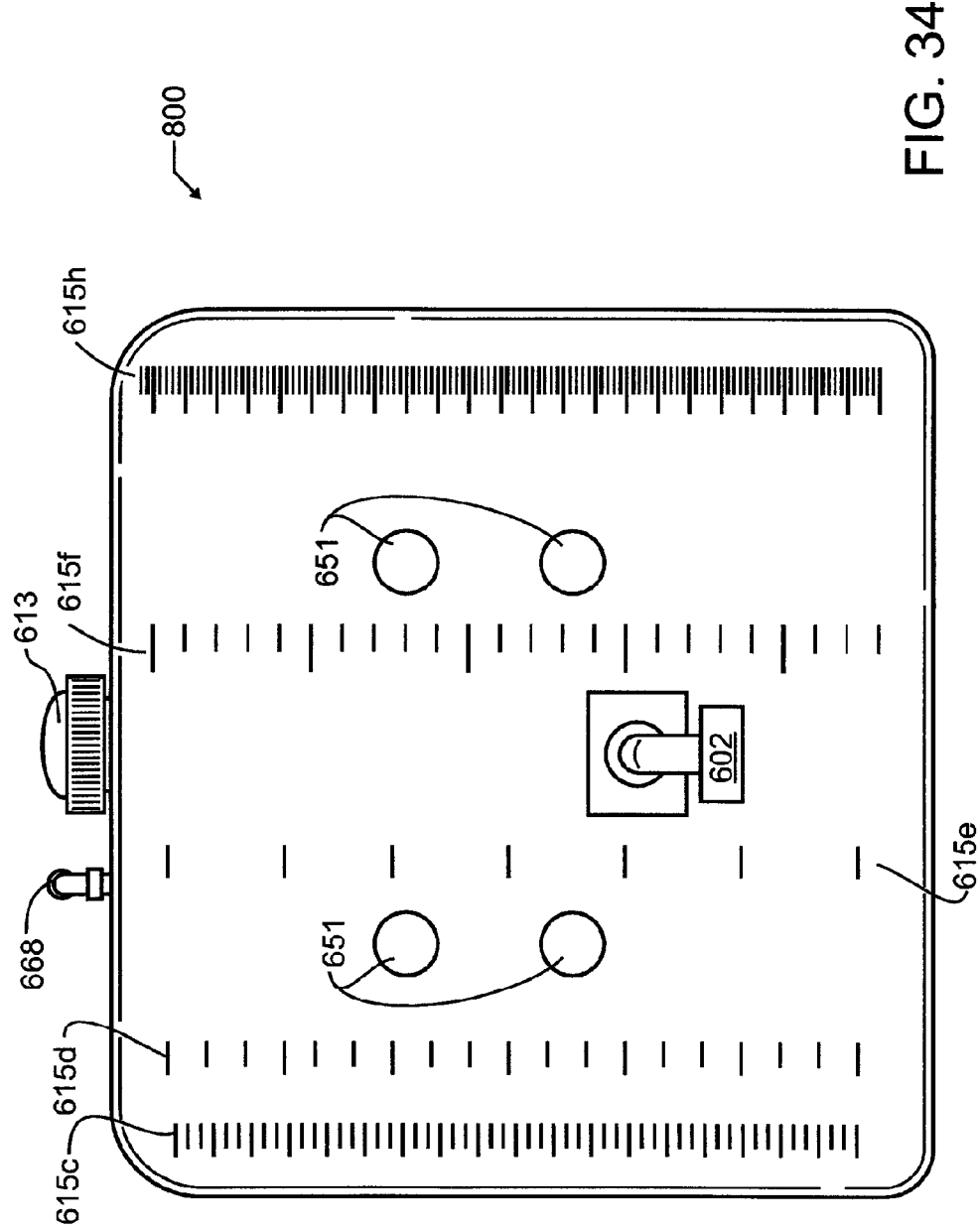
FIG. 34 illustrates the sequential injection module of FIG. 31 from a rear or back view.

In another embodiment, a split pump APP system 700 may preferably operate at a fixed ratio between technical material 511 and diluent 521 such as water. This split pump APP 700 is illustrated for exemplary purposes in FIGS. 29 and 30. APP 700 uses two liquid tanks 610 just as described in reference to FIGS. 25-28, but uses a single motor 732 and a split inlet and outlet pump manifold 734*a*, 734*b* to produce two independent and decoupled pumping actions. The manifold may be constructed in the manner of manifold 42 of FIG. 7B, where each half of the manifold is ducted fully independently of the other half. By so doing, there are two independent flow paths. Consequently, two tanks 610 may be provided, one for each flow path.

The outlet from tank 610*b* passes into pump half 734*b* through inlet 733*b*, and, after pumping therein, passes out to pressure regulator valve 740*b*. In the event of excessive pressure, such as where outlet 735*b* is partially restricted or completely blocked, valve 740*b* will bleed liquid back into tank 610*b* through tank inlet 668*b*. In alternative embodiments, between pressure regulator valve 740*b* and tank inlet 668*b* any of the alternative priming components 660-666 described herein above with reference to FIG. 26 may also be provided. Illustrating further alternative embodiments, coupled to outlet 735*a* are optional flow meter 762 and pressure gauge 760, with a subsequent outlet 764. These and other optional gauges and meters may be provided as desired. Outlets 735*a* and 735*b* may also have one-way check valves 738 or other suitable apparatus coupled in line, and other suitable apparatus may also be provided therein. Subsequently, outlet 739 may be coupled to any desired flow destination or pathway. Since pump halves 734*a*, 734*b* are driven by a common motor, the ratio of liquids from the two tanks 610*a*, 610*b* will remain constant, with the ratio between the two liquids determined by the relative volumes of each individual pump. The pump capacity or flow rate can be varied by varying the speed of motor 732, and any speed change will occur without materially changing the ratios between the two pump halves, excepting any hydrodynamic differences between the two liquids and pump halves.

FIGS. 31-34 illustrate a further APP system 800 that may preferably provide at least one pump that is controlled to selectively direct individual pump stroke outputs to vary the pump flow rate as desired, referred to herein as a sequential injection system. APP system 800 uses the same tank 610 as illustrated in APP systems 600, 700. Coupled to tank 610 is motor 832 and pump 834. An outlet 835 passes from pump 834 through one-way check valve 636 to a solenoid valve 841. Solenoid valve 841 is controlled through wiring 842 and a control circuit similar to control system 670 to operate synchronously in time with cycles of pump 834. Synchronization timing may, for exemplary purposes, be detected by the provision of a proximity switch such as switch 677 discussed herein above. In APP 800, motor 832 and pump 834 will run continuously, but one or more pump output cycles may be blocked, causing a pressure build-up sufficient to activate bypass return pressure regulator valve 840, thereby dumping the liquid from a given selected pump cycle back into tank 610 through tank inlet 668. Bypass return pressure regulator valve 840 may be factory set to a specific pressure, or may be adjustable to allow automatic or manual adjustment. If solenoid valve 841 were to be actuated on a repeating cycle, such as closing for one pump cycle out of every 100, then the outlet 835 volume change may be easily calculated, in this example with 99% of the volume being pumped to outlet 835, and one percent (1 out of 100) being recirculated back into tank 610. For maximum output volume flowing to outlet 835, solenoid valve 841 will be held in a continuously open position.

In another embodiment, presented herein as an alternative sequential injection system to the arrangements illustrated in FIGS. 31-34, outlet 835 is instead coupled to tank inlet 668. The outlet from bypass return pressure regulator valve 840, in this alternative embodiment, is then used as the injection pump output which will be coupled into a downstream pump, mixer or flow line for mixing with other metered liquids. When solenoid valve 841 is closed, all liquid will pass through bypass return pressure regulator valve 840. However, when solenoid valve 841 is opened, again most preferably in synchronization with pump 834, liquid will be recirculated back into tank 610 through tank inlet 668. In this embodiment, there is very minimal pressure required to recirculate liquid back into tank 610, and instead additional pressure is required to move liquid out of tank 610 and downstream. Consequently, opening solenoid valve 841 one pump cycle out of every 100 will result in 99% of the volume being pumped through bypass return pressure regulator valve 840 and downstream for mixing with other liquids.

Each of these APP systems 600, 700, 800 use a common tank 610, which might for exemplary purposes be rotationally or blow molded. Only one tank needs to be fabricated and inventoried to accommodate a number of very diverse pump applications. Further, tank 610 offers a plethora of features, while encompassing a pump and providing complete mounting and support therefore. By using APP systems 600, 700, 800 modularly, two or more to a virtually unlimited number of liquids may be mixed together. These compounds may be chemicals to be applied in a water stream, liquids or solvents that require precision ratios, or more basic ingredients such as various paint ingredients and pigments or various beverage mixes. The ability to monitor position, time, pressure, volume, flow rate, and other variables, and to track and store these into a control system such as 280 or 670 or to communicate such as through wireless communications back to a base station addresses a number of concerns that have heretofore existed in such industries as termite control.

In the event of a continuous over-pressure condition, which would otherwise result in on-going pumping and bypass back into the inlet tank, control systems 280, 670 may preferably be set to stop the pump motor when over-pressure has been detected for a predetermined time period. This can substantially extend battery life in portable applications.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

The invention claimed is:

1. A system for pumping a first fluid and a second fluid in a desired proportion, the system comprising:
    an electric motor assembly having a first drive shaft and a second drive shaft, wherein during operation, the electric motor assembly drives the first drive shaft at a first rotational rate and the second drive shaft at a second rotational rate;
    a first pump driven at a first rate by the first drive shaft;
    a second pump driven at a second rate by the second drive shaft;

a first container for containing a first liquid, the first container in fluid communication with an inlet of the first pump;

a second container for containing a second liquid, the second container in fluid communication with an inlet of the second pump;

a first pressure regulating check valve having an inlet in fluid communication with and configured to operatively maintain a minimum pressure at an outlet of said first pump and having an outlet in fluid communication with said inlet of the second pump; and a proportioned output in fluid communication with an outlet of the second pump.

2. The system of claim 1, wherein the electric motor assembly includes a gear reduction assembly that drives the second drive shaft.

3. The system of claim 2, wherein the first drive shaft extends from a first end to a second opposite end of an electric motor of the electric motor assembly, and the gear reduction assembly is fixed relative to the second end of the electric motor and is driven by or relative to the first drive shaft.

4. The system of claim 3, wherein the second drive shaft is driven by the gear reduction assembly.

5. The system of claim 1, wherein the first pump is a positive displacement plunger pump that includes a plunger situated in a cylinder for pumping the first fluid, the plunger of the first pump having a diameter and a stroke length; wherein the second pump is a positive displacement plunger pump that includes a plunger situated in a cylinder for pumping the second fluid, the plunger of the second pump having a diameter and a stroke length.

6. The system of claim 5, wherein the diameter and stroke length of the second pump are the same as the first pump.

7. The system of claim 5, wherein the diameter and stroke length of the second pump are different from the first pump.

8. The system of claim 1, wherein the first pump includes a double acting simplex positive displacement pump, and the second pump includes a double acting simplex positive displacement pump.

9. The system of claim 1, wherein the first pump and the second pump are configured to have substantially the same pumping capacity if the first pump and the second pump were driven at a common rate.

10. The system of claim 1, wherein the first pump and the second pump are configured to have substantially different pumping capacities if the first pump and the second pump were driven at a common rate.

11. A system for pumping a first fluid and a second fluid in a desired proportion, the system comprising:

a first pump having an inlet in fluid communication with a first container for holding a quantity of the first fluid, and an outlet;

a second pump having an inlet in fluid communication with a second container for holding a quantity of the second fluid, and an outlet;

an electric motor assembly for driving the first pump at a first cycling rate and the second pump at a second cycling rate;

a first pressure regulating check valve having an inlet in fluid communication with and configured to operatively maintain a minimum pressure at an outlet of said first pump and having an outlet in fluid communication with said inlet of the second pump; and wherein the outlet of the second pump is in fluid communication with an outlet of the system through a check valve to prevent backflow.

12. The system of claim 11, wherein the first pump and the second pump have substantially the same pumping capacity if the first pump and the second pump were driven at a common cycling rate.

13. The system of claim 11, wherein the first pump and the second pump are configured to have substantially different pumping capacities if the first pump and the second pump were driven at a common cycling rate.

14. The system of claim 11, wherein the desired proportion of the first fluid and the second fluid is not adjustable except by removing and then replacing one or more components of the system.

15. The system of claim 11, wherein the first pump is a positive displacement plunger pump that includes a plunger situated in a cylinder for pumping the first fluid, and the second pump is a positive displacement plunger pump that includes a plunger situated in a cylinder for pumping the second fluid.

16. A method of providing an accurately proportioned liquid mixture of a first liquid and a second liquid to an applicator, the method comprising:

providing a first pump having a first displacement;

providing a second pump having a second displacement;

actuating the first pump at a first cyclic rate by a motor, the first pump pumping the first liquid at a first fluid flow rate through a first pressure regulating check valve having an inlet in fluid communication with and configured to operatively maintain a minimum pressure at an outlet of said first pump and having an outlet in fluid communication with an inlet of the second pump;

actuating the second pump at a second cyclic rate by the motor, the second pump pumping the second liquid at a second fluid flow rate and simultaneously mixing said first liquid from said first pressure regulating check valve with said second liquid;

the second pump pumping the second liquid to a first fluid output line; and mixing the first liquid pumped from the first pump with the second liquid pumped within the second pump to thereby generate a proportioned output, the proportioned output having a desired ratio of the first liquid to the second liquid, wherein the proportioned output is in fluid communication with the applicator.

* * * * *